United States Patent [19]

Batchelor et al.

[11] 4,181,429

[45] Jan. 1, 1980

[54] SAMPLE COPY SYSTEM FOR XEROGRAPHIC REPRODUCTION MACHINE

[75] Inventors: Phillip J. Batchelor; Kenneth W. Laskowski; Gerald A. Gray, Jr.; Stephen P. Wilczek, all of Fairport; Henry E. Mannella, Webster; Edward L. Steiner, Macedon, all of N.Y.

[73] Assignee: Xerox Corporation, Stamford, Conn.

[21] Appl. No.: 829,028

[22] Filed: Aug. 30, 1977

[51] Int. Cl.² .......................... G03B 15/00; G03B 27/32

[52] U.S. Cl. .................................... 355/77; 355/14 R; 355/23; 235/92 SB

[58] Field of Search ........................ 355/77, 14, 23, 24, 355/26, 3 R; 235/92 SB, 92 CT, 92 PE

[56] References Cited

U.S. PATENT DOCUMENTS

| | | | |
|---|---|---|---|
| 3,936,180 | 2/1976 | Willard et al. | 355/14 |
| 3,974,363 | 8/1976 | Malinich | 355/14 X |

OTHER PUBLICATIONS

*Research Disclosure*, 14927, Sep. 1976.

*Primary Examiner*—L. T. Hix
*Assistant Examiner*—W. J. Brady

[57] ABSTRACT

A reproduction machine for making either single sided or duplex copies, and incorporating automatic document handler and sorter for handling original documents being copied and copies made. To enable copy quality to be checked, either when the machine is stopped or in the midst of a copy run, a sample copy is provided for. Where the sample copy is selected during a copy run, an accommodation in copy billing rate is made.

2 Claims, 54 Drawing Figures

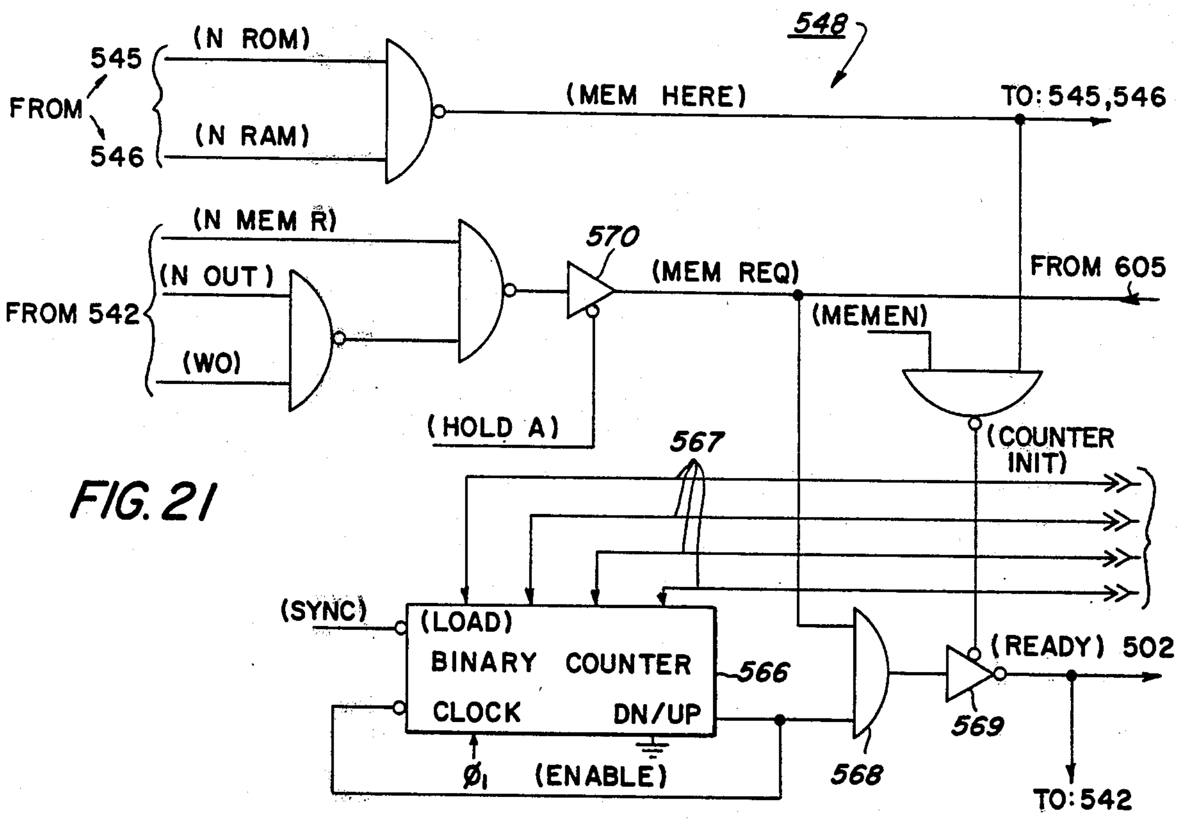
FIG. 21
MEMORY READY
FIG. 24
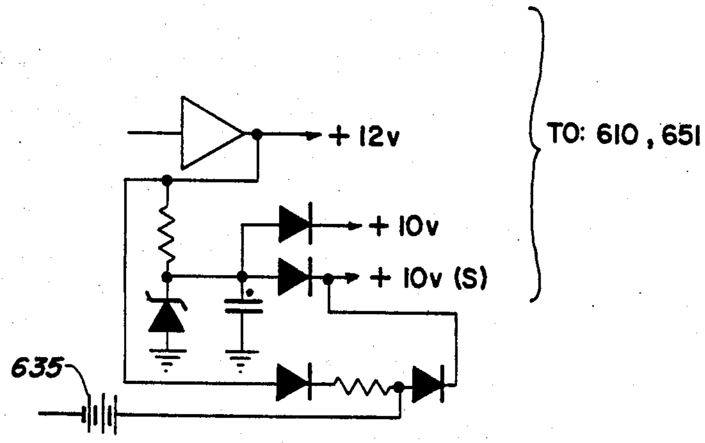

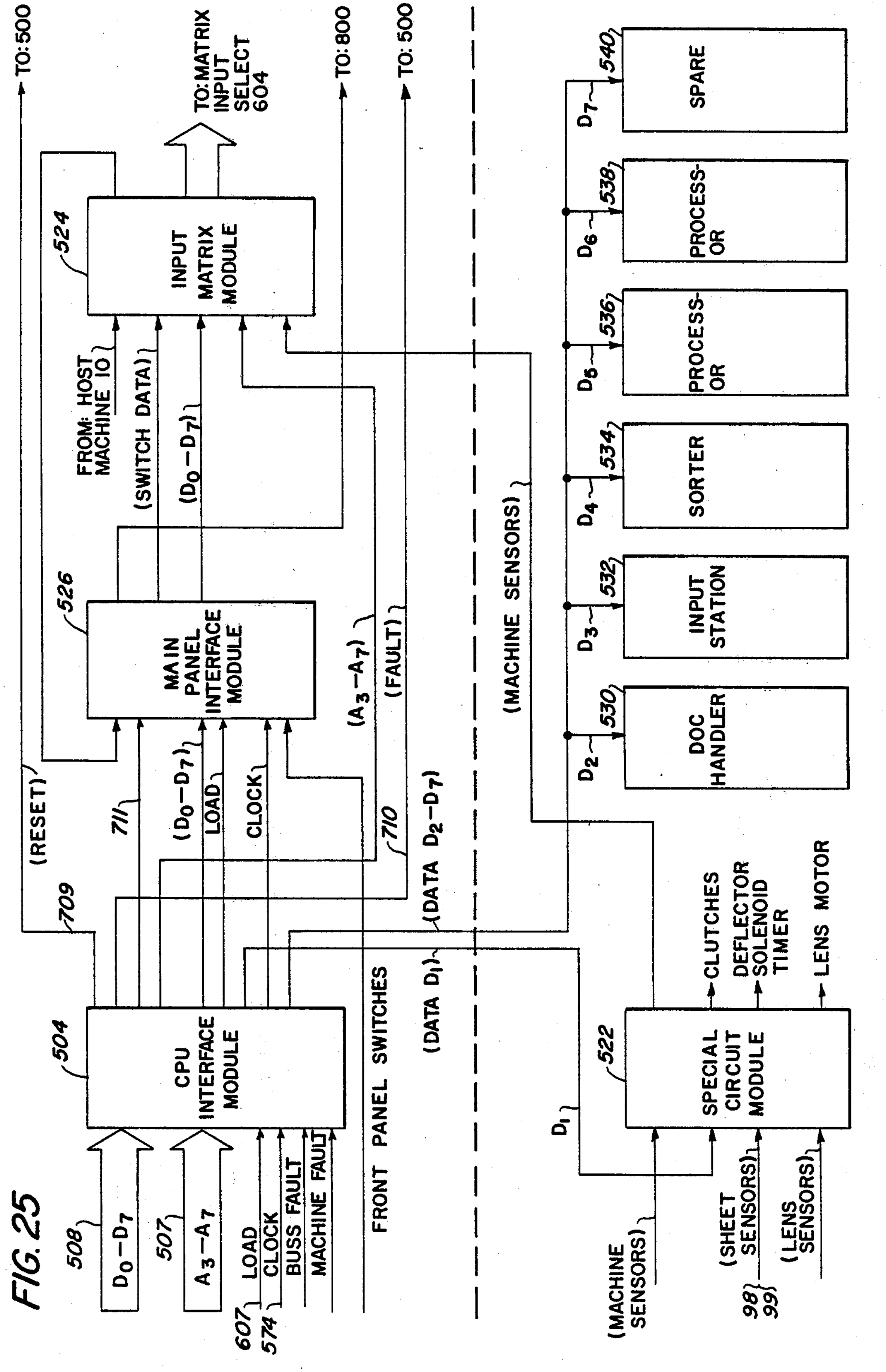
FIG. 25
CPU INTERFACE MODULE
504
MAIN PANEL INTERFACE MODULE
526
INPUT MATRIX MODULE
524
SPECIAL CIRCUIT MODULE
522
DOC HANDLER
530
INPUT STATION
532
SORTER
534
PROCESS-OR
536
PROCESS-OR
538
SPARE
540
TO: 500
TO: MATRIX INPUT SELECT 604
TO: 800
TO: 500
FROM: HOST MACHINE IO
(SWITCH DATA)
(D0 – D7)
(RESET)
709
711
(D0 – D7)
LOAD
CLOCK
(A3 – A7)
(FAULT)
710
(DATA D2 – D7)
(DATA D1)
(MACHINE SENSORS)
FRONT PANEL SWITCHES
508
D0 – D7
507
A3 – A7
LOAD
CLOCK
BUSS FAULT
MACHINE FAULT
607
574
D1
D2
D3
D4
D5
D6
D7
CLUTCHES
DEFLECTOR SOLENOID TIMER
LENS MOTOR
(MACHINE SENSORS)
(SHEET SENSORS)
(LENS SENSORS)
98
99

MACHINE INTERRUPT ROUTINE

LEGEND:
PNTR- POINTER
INCRM-INCREMENT
REL-RELATIVE
ADDR-ADDRESS
SR-SHIFT REGISTER
REG-REGISTER
SUBR-SUBROUTINE

SAMPLE COPY SYSTEM FOR XEROGRAPHIC REPRODUCTION MACHINE

This invention relates to electrostatographic xerographic type reproduction machine, and more particularly, to an improved method of checking machine copy quality.

The advent of higher speed and more complex copiers and reproduction machines has brought with it an increasing awareness of and significance to copy quality. Inherent in this theme is the desire to provide machines which not only are capable of producing a high copy volume, and which also offer to the user a variety of selective options designed to permit the user to obtain the copies packaged in the manner desired by the user, but machines which produce copies of the highest quality and accuracy. While, in checking copy quality, the user may run a trial copy before the main copy run, this leaves uncertainty as to whether or not the copy quality is being maintained throughout the copy run, particularly if the copy run is long. On the other hand, loss of production time and possible confusion may attend efforts to interrupt the copy run in midstream while a sample or trial copy is run, particularly where the copy program calls for duplex or doubled sided copies.

It is, therefore, a principal object of the present invention to provide a new and improved reproduction machine.

It is an object of the present invention to provide an improved method for intervening in a copy run to make a sample coy with minimum disruption in the copy program in progress.

It is a further object of the present invention to provide a reproduction system incorporating a selector for making either simplex or duplex sample copies irrespective of the type of copy run being processed by the system.

It is an object of the present invention to provide an improved system for making sample copies during a copy run without affecting the copy billing rate attending that copy run adversely.

This invention relates to a method of processing a copy run wherein one or more originals are copied a preselected number of times while permitting copy quality to be checked during the copy run, the steps which comprise transporting the first original into copying position; retaining the original in copying position while copies are made; removing the original from copying position when copying thereof is completed; repeating the foregoing steps for succeeding originals until copying of the last original is completed and the copy run processed; interrupting the processing of copies to make an extra copy of the original in copying position as a sample of the copies being produced; and resuming processing of copies at the point of interruption to continue the copy run.

BRIEF DESCRIPTION OF THE DRAWINGS

Other objects and advantages will be apparent from the ensuing description and drawings in which.

Figure 1:
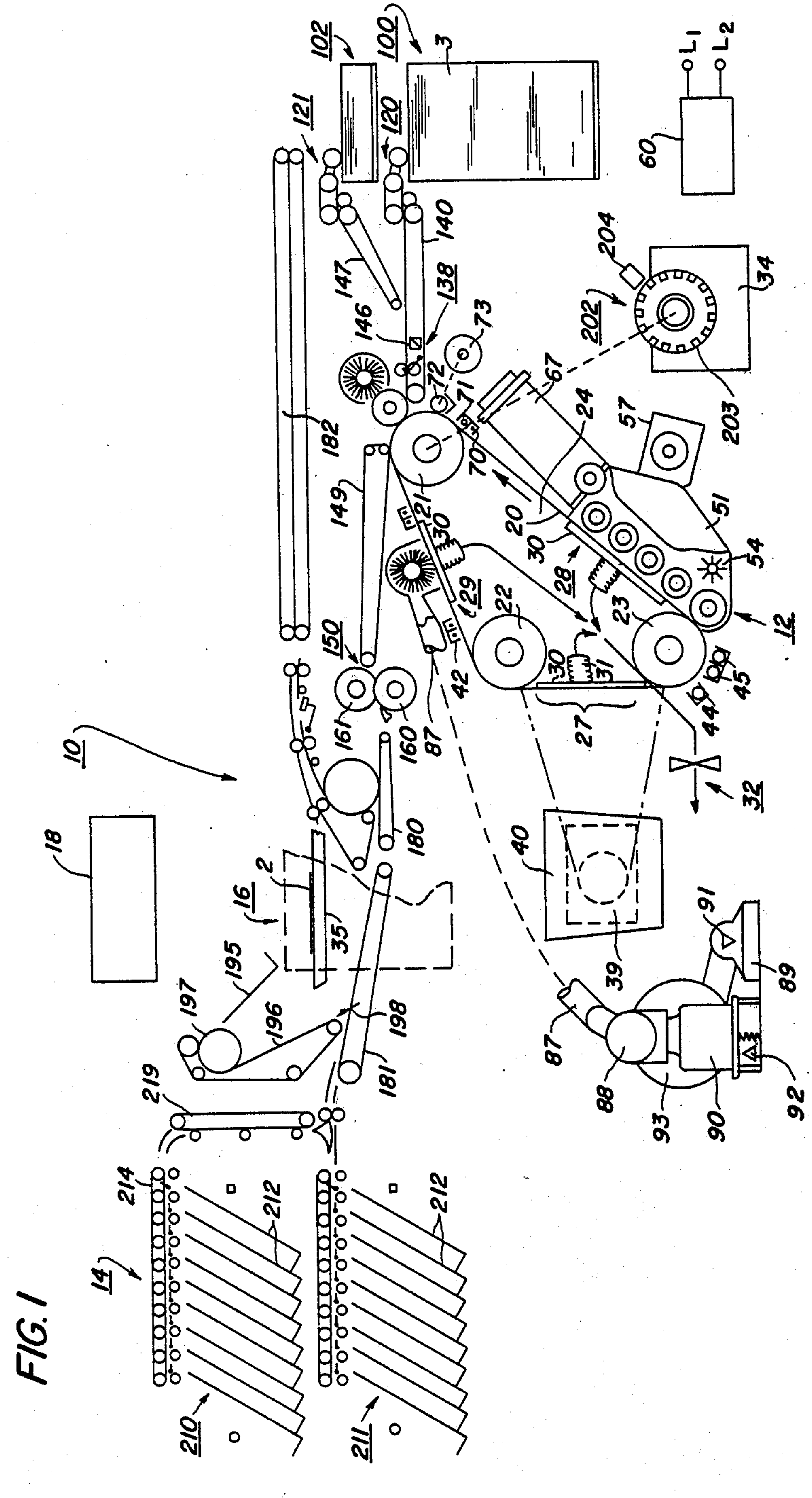
FIG. 1 is a schematic representation of an exemplary reproduction apparatus incorporating the control system of the present invention.
Figure 19A:
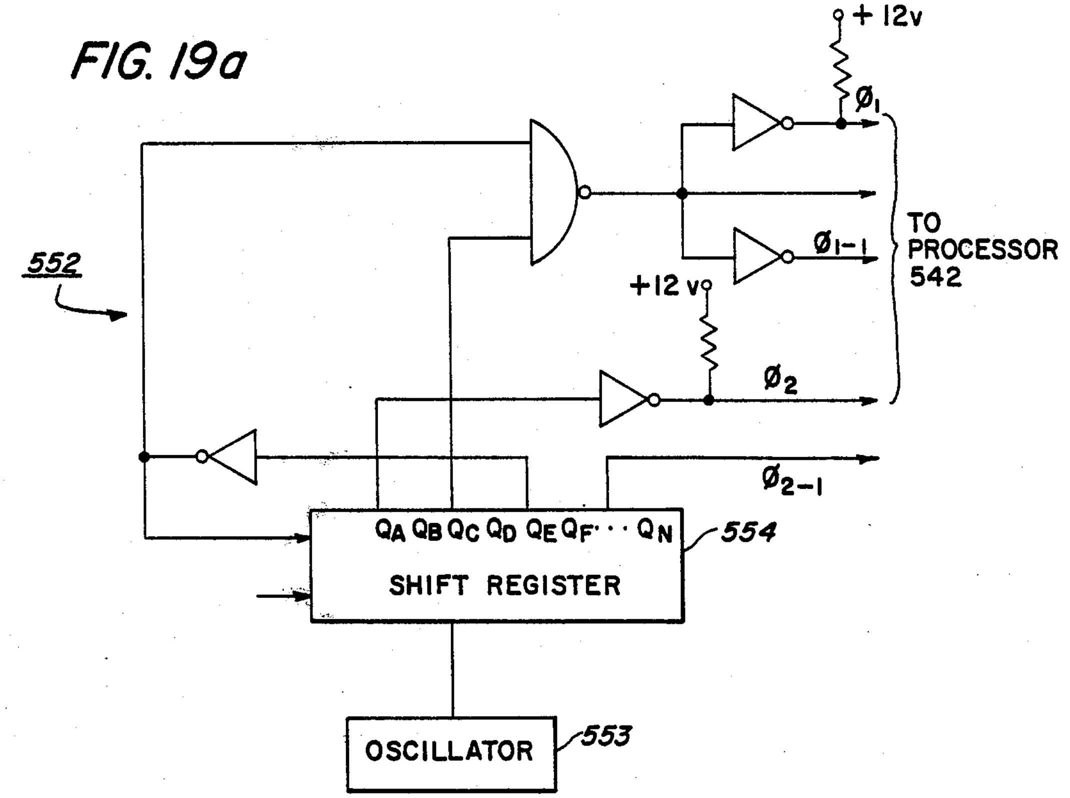
Figure 20:
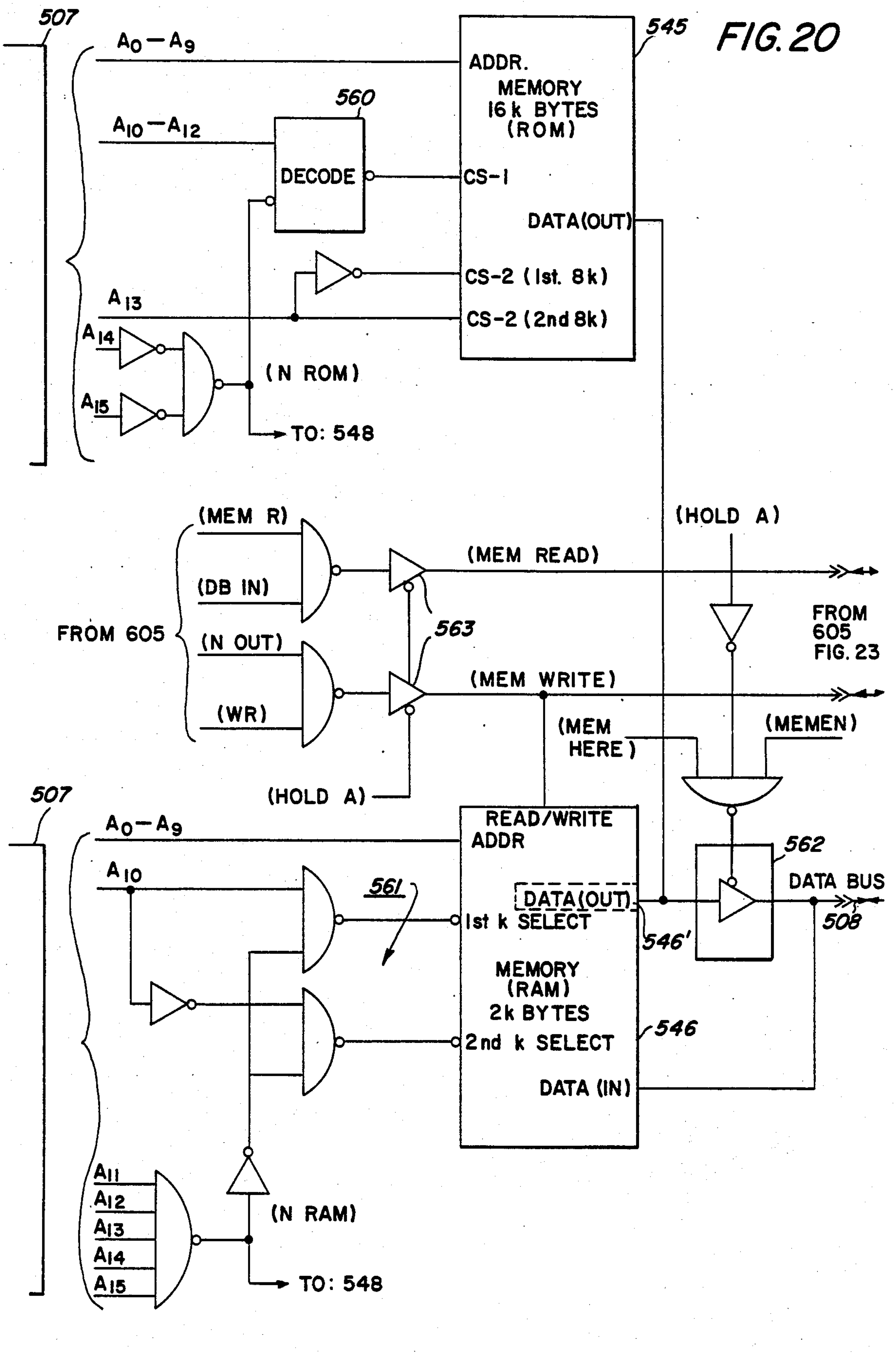
Figure 26:
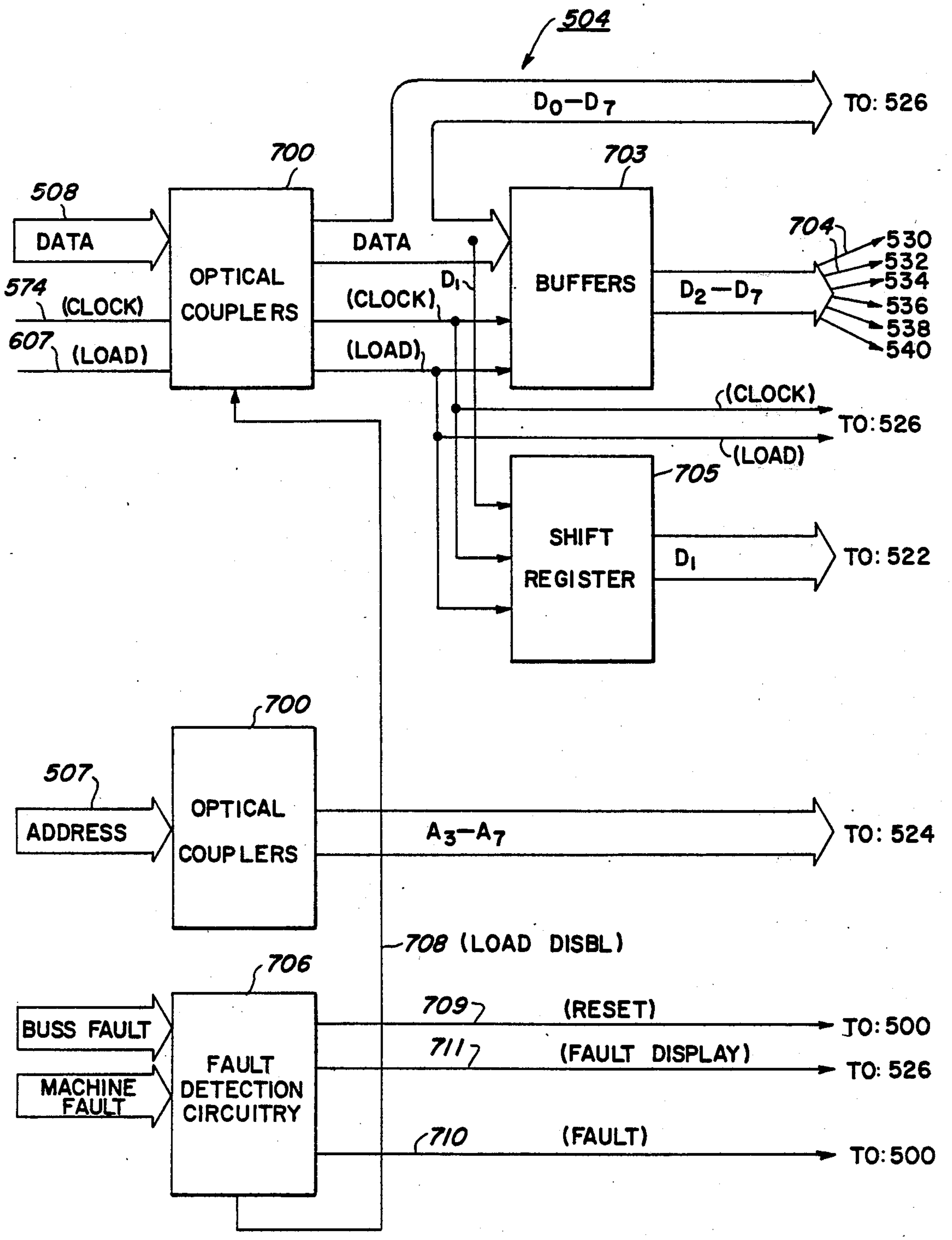
Figure 27:
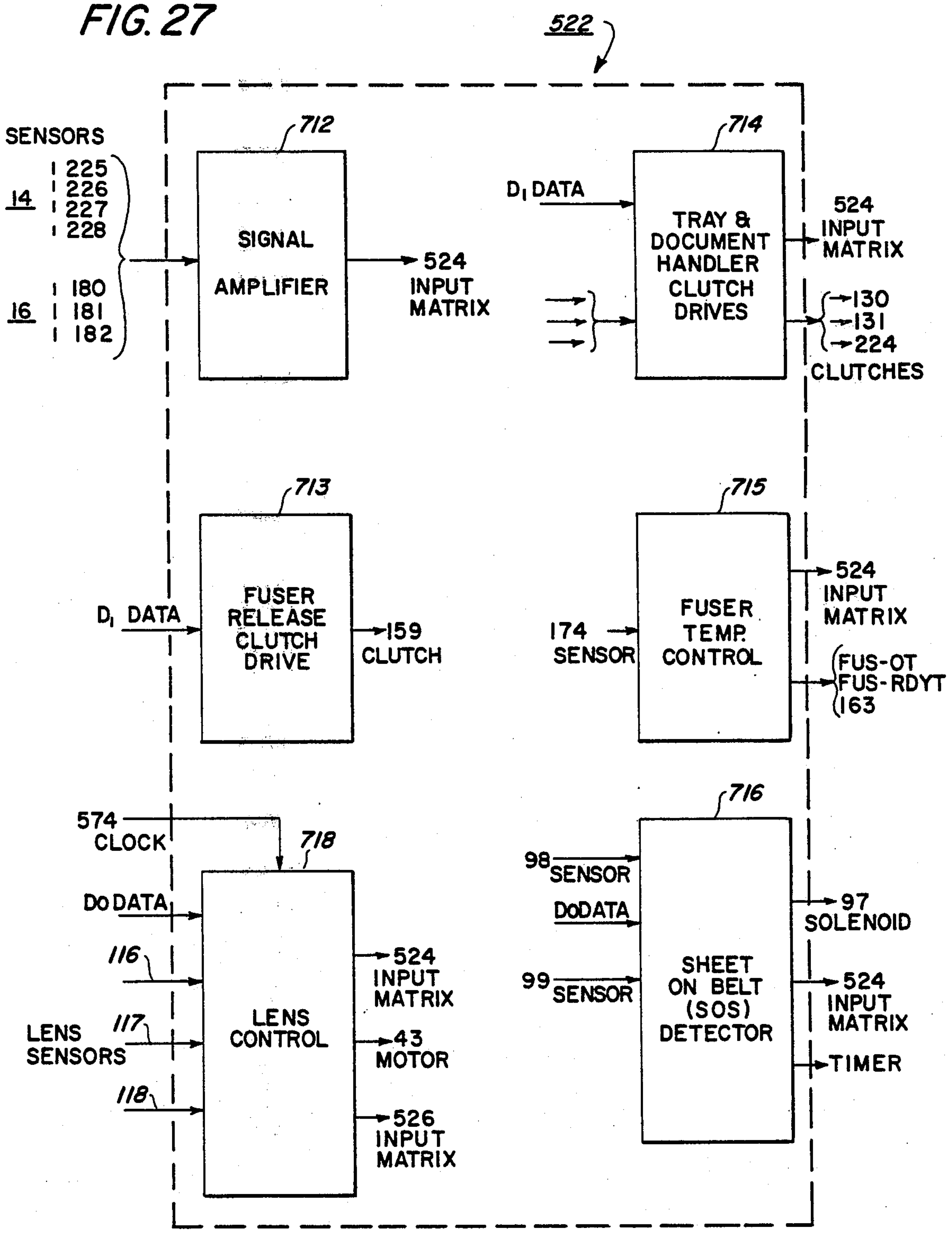
Figure 28:
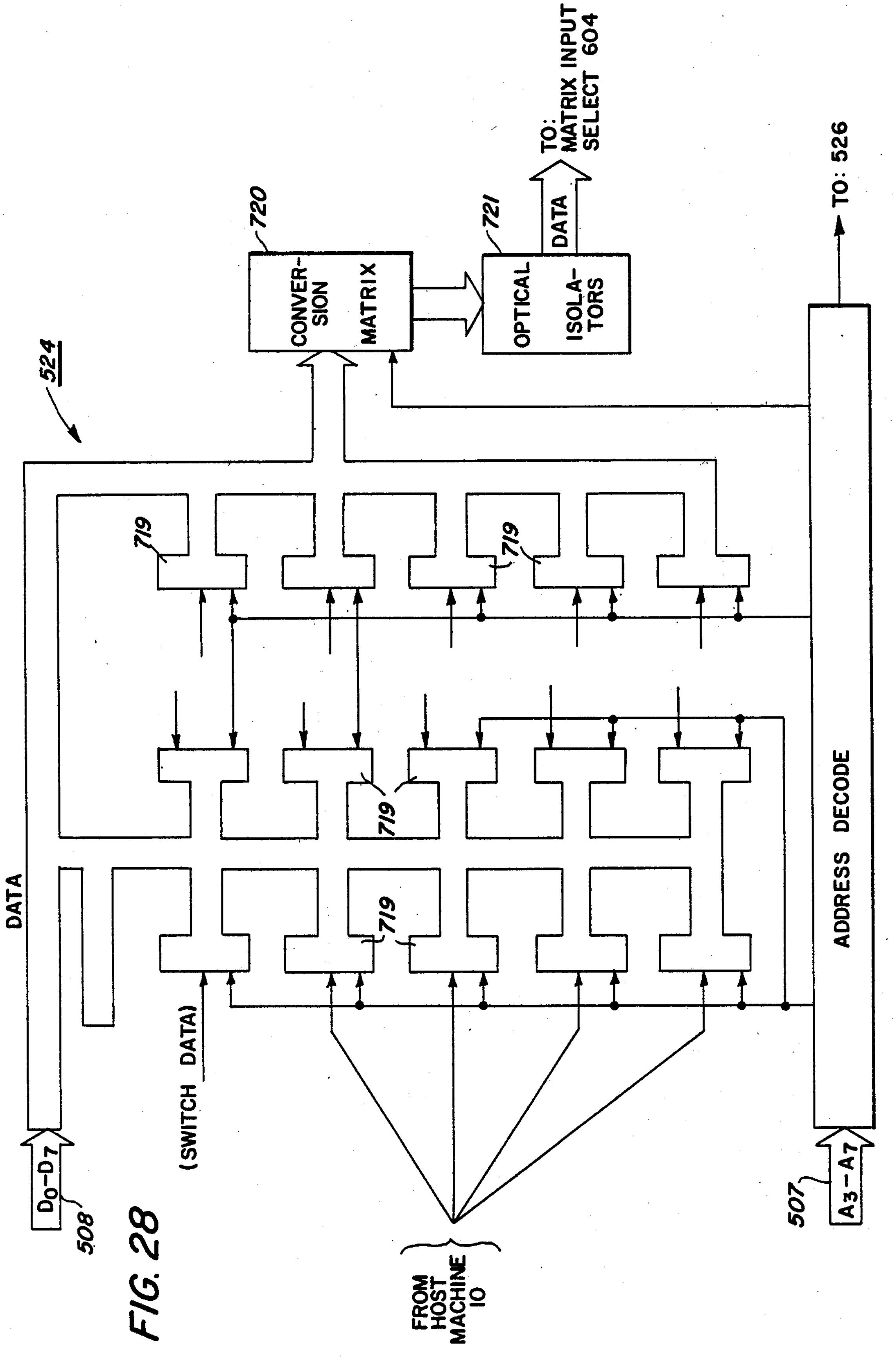
Figure 29:
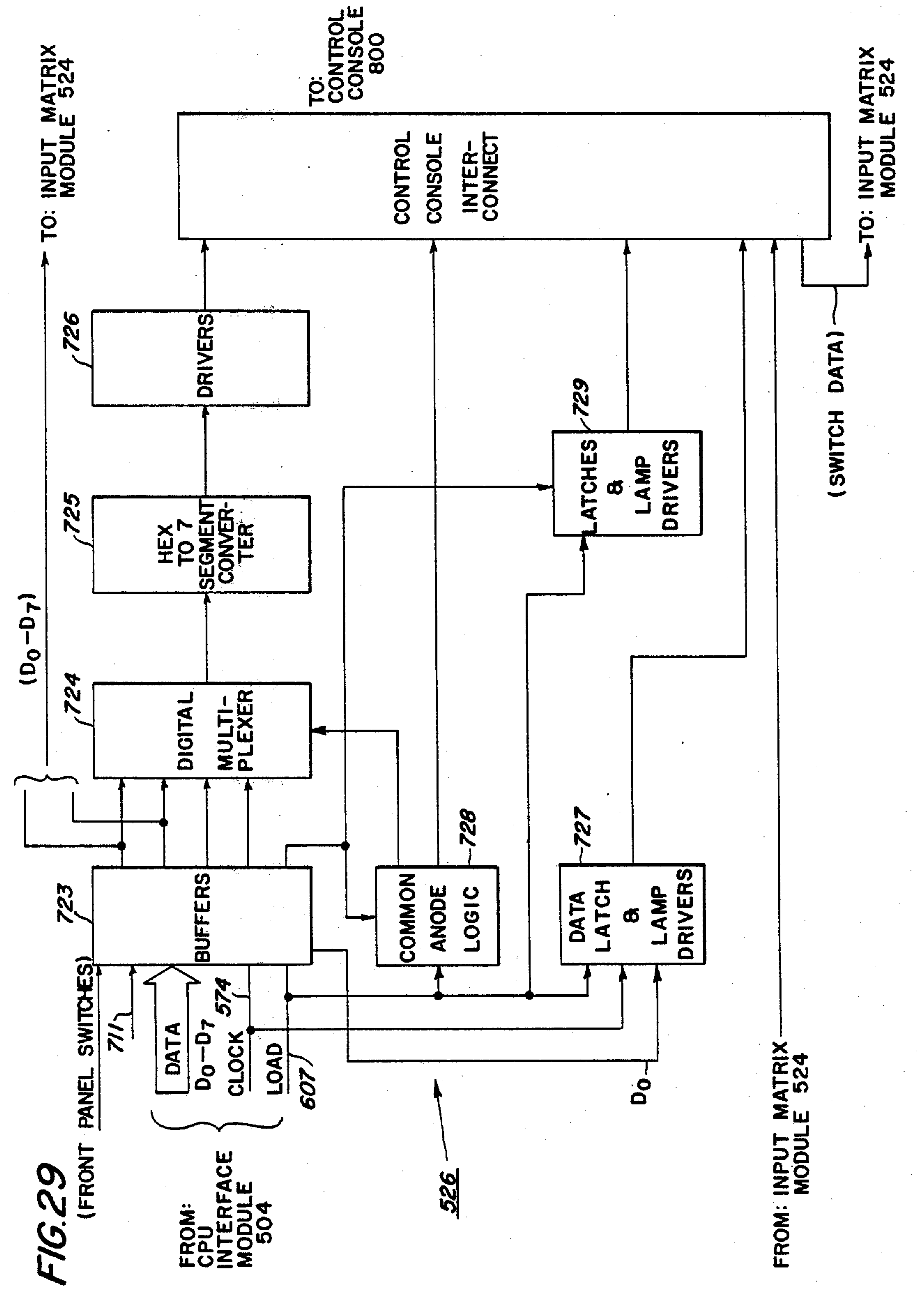
Figure 30:
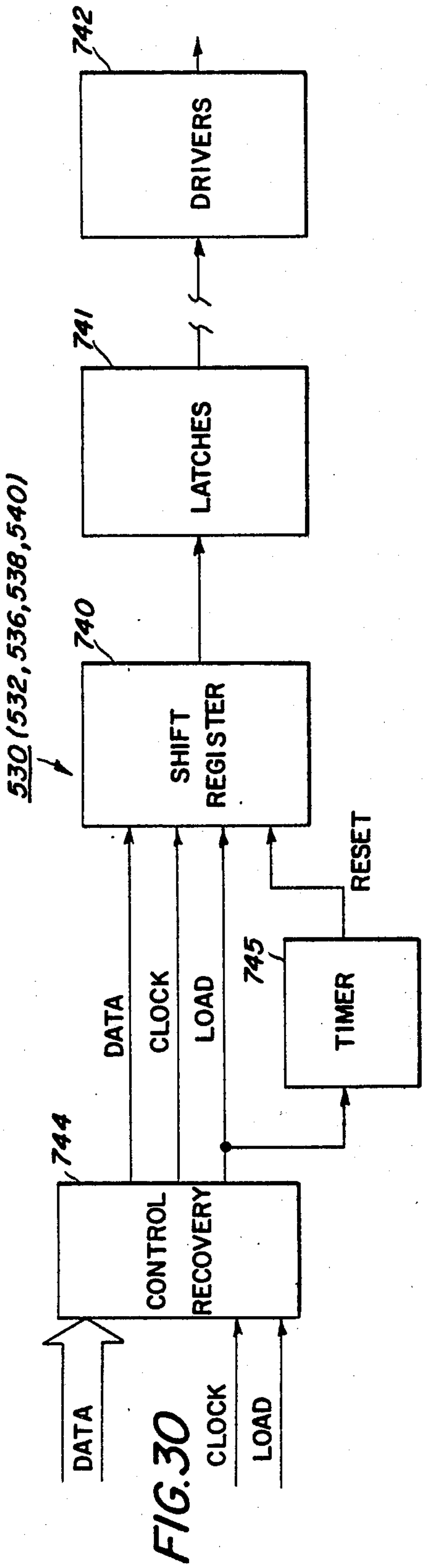
Figure 31:
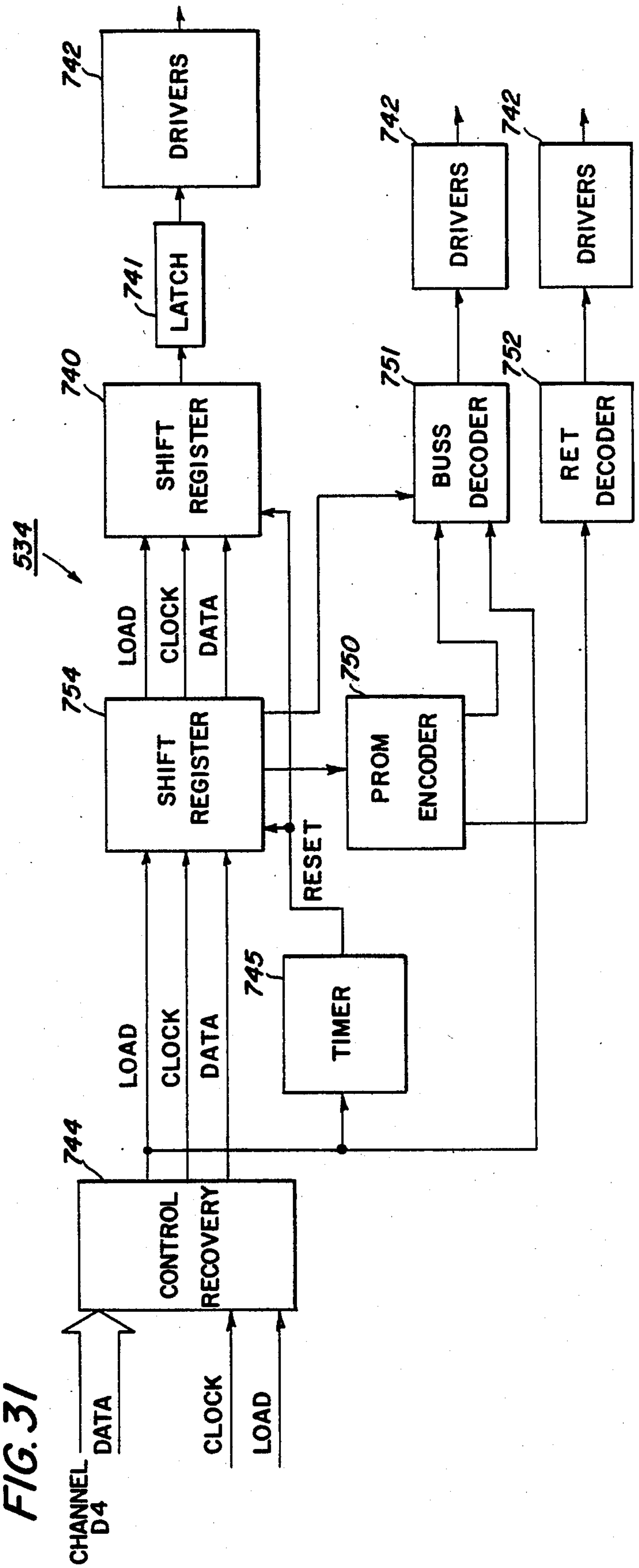
Figure 32:
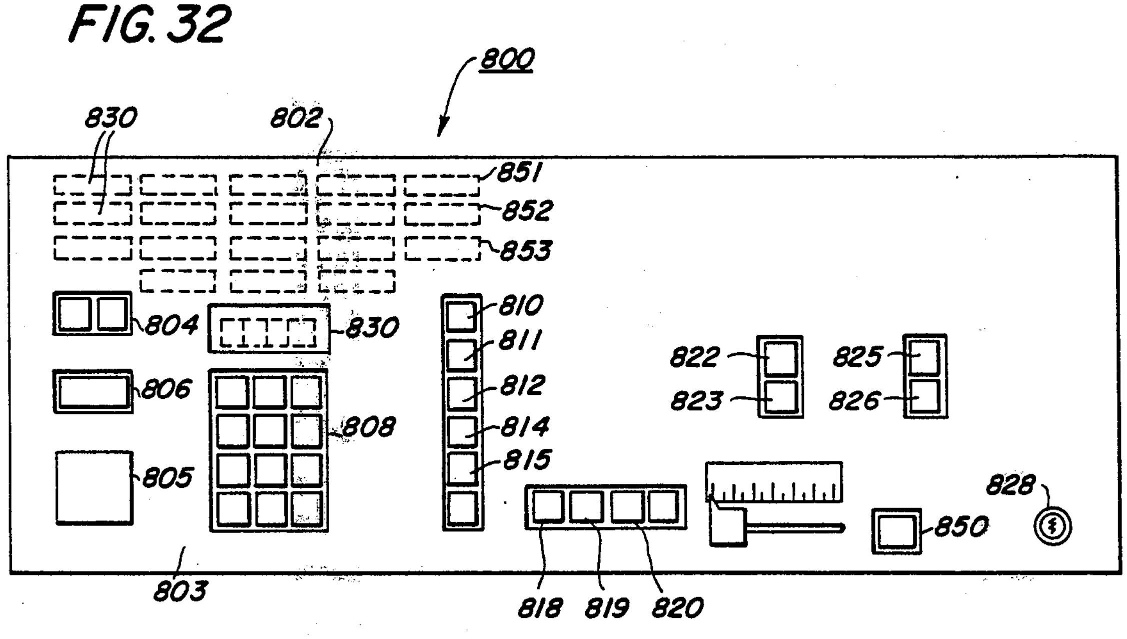
Figure 33:
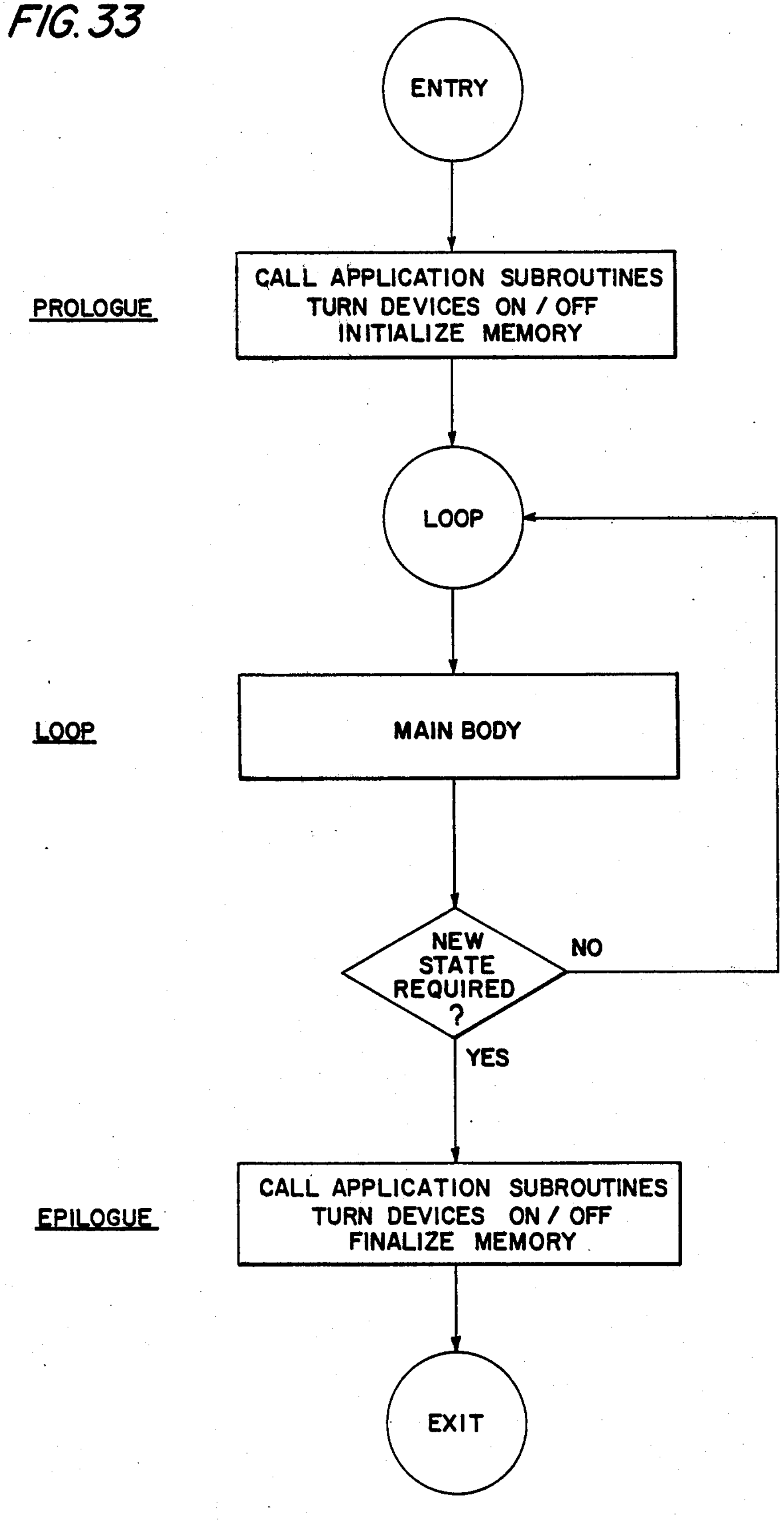
Figure 34:
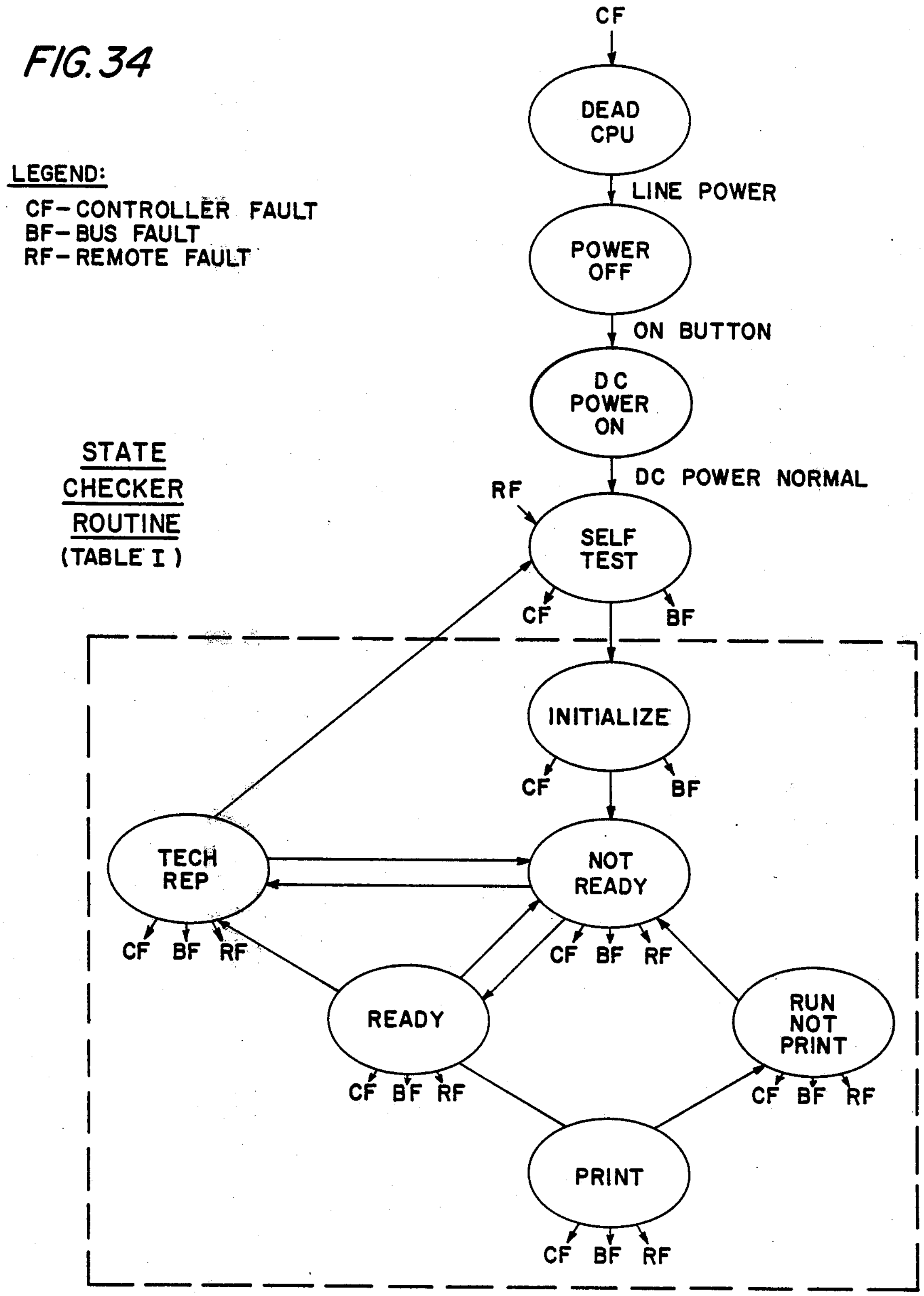
Figure 35:
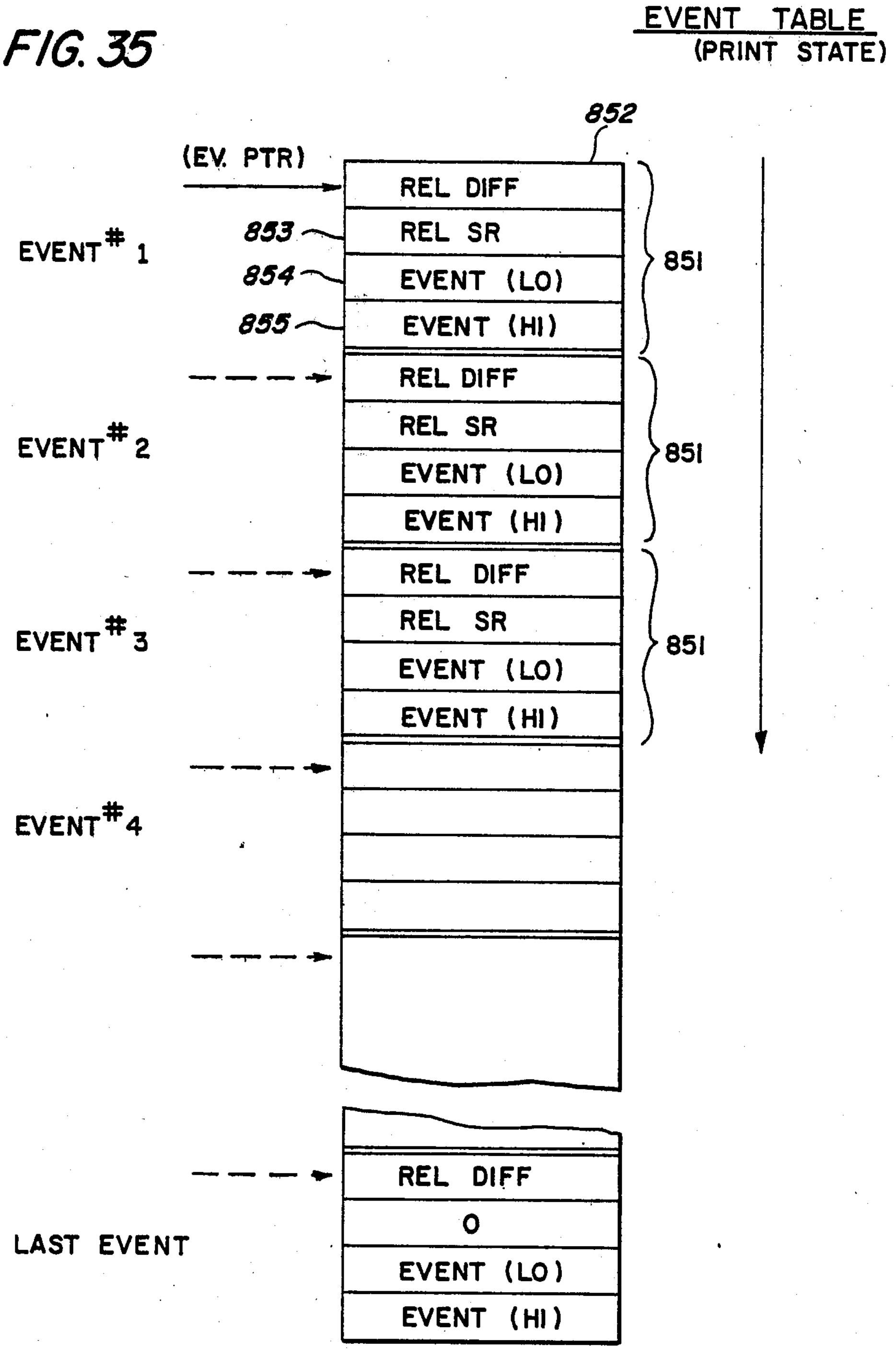
Figure 36:
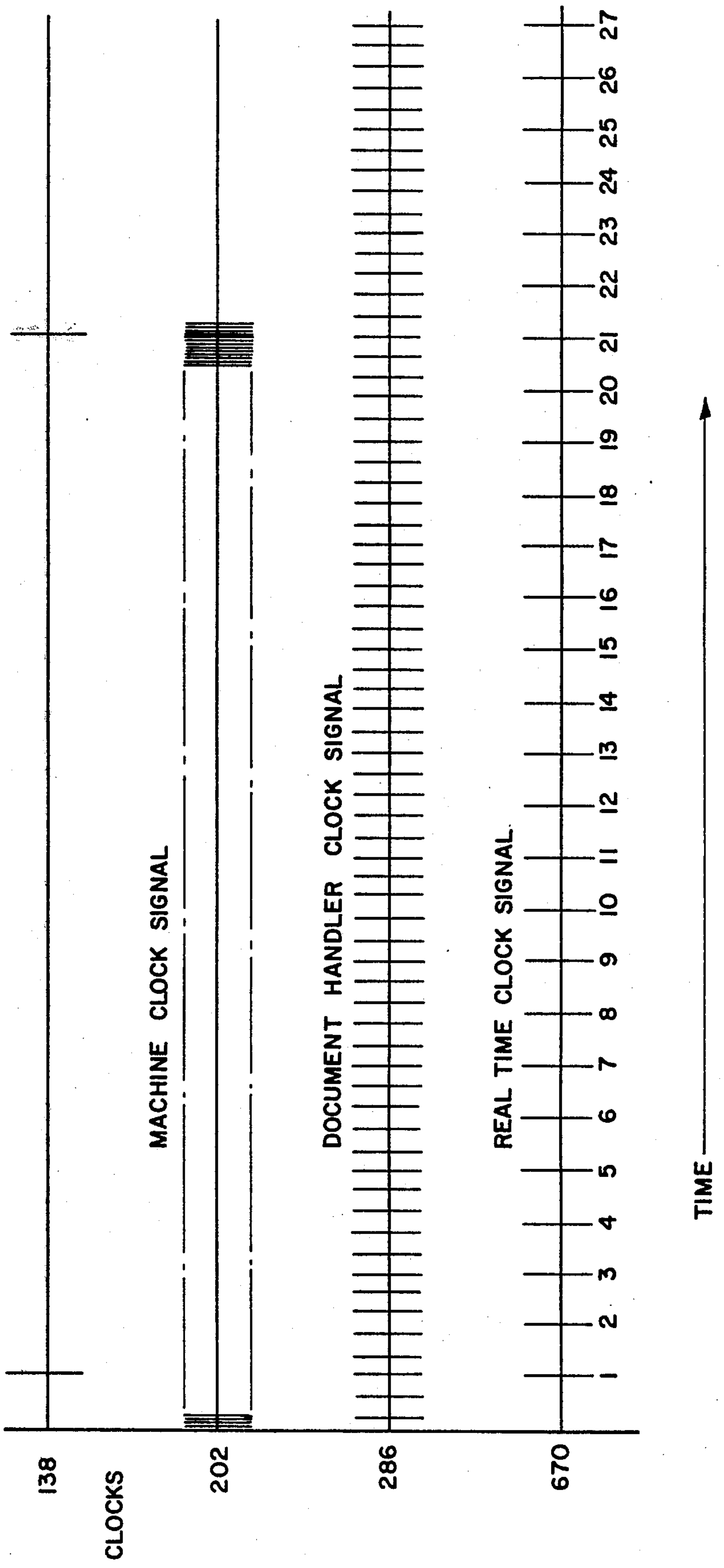
Figure 37:
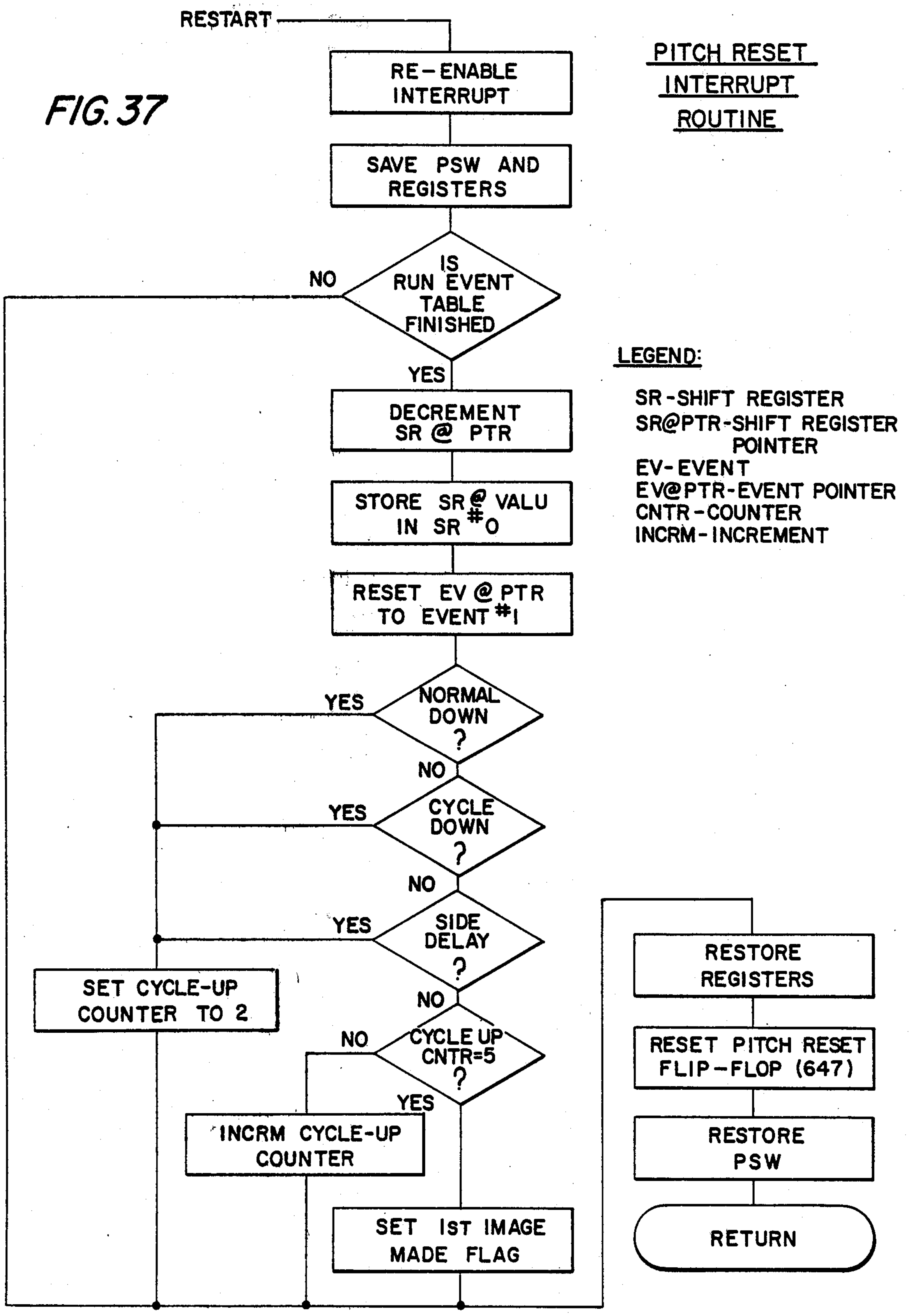
Figure 38:
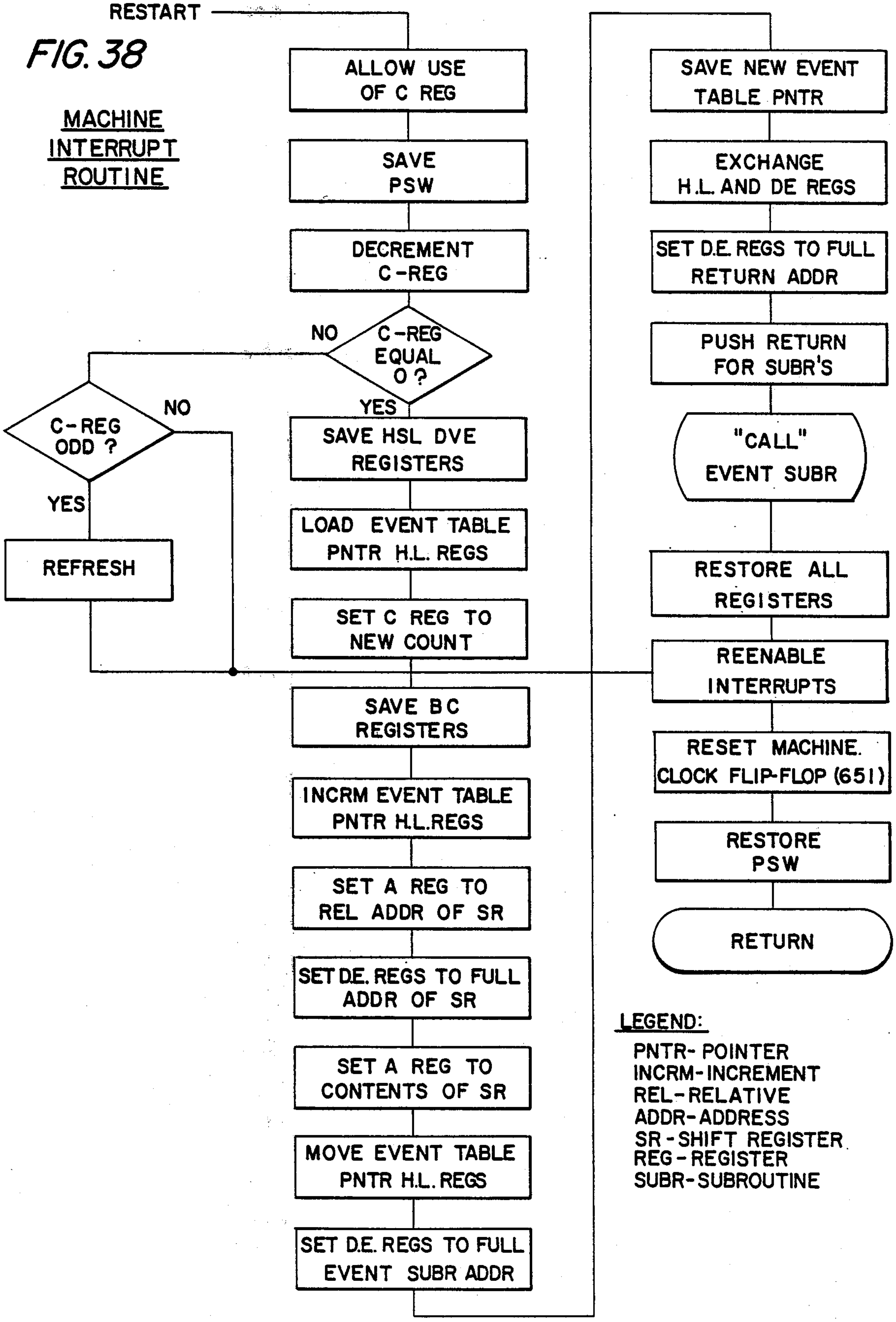
Figure 39A:
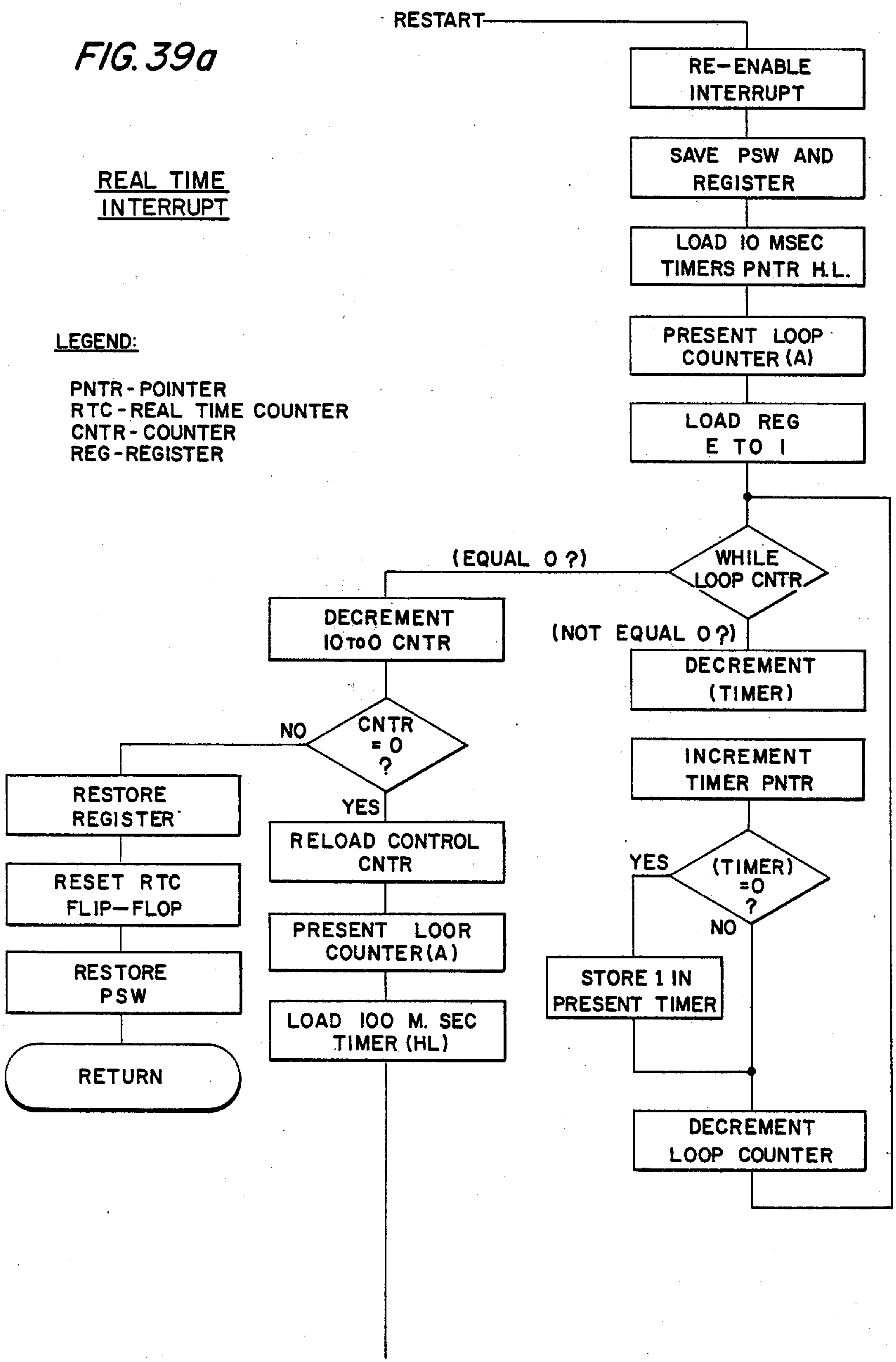
Figure 39B:
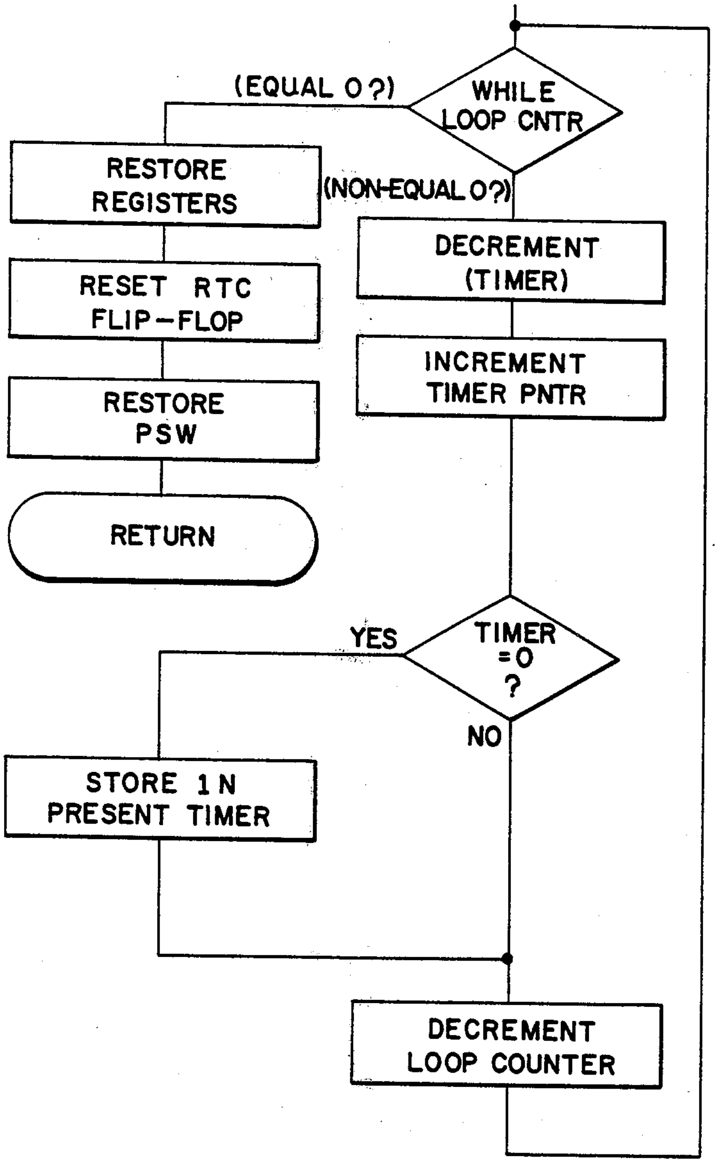
Figure 40A:
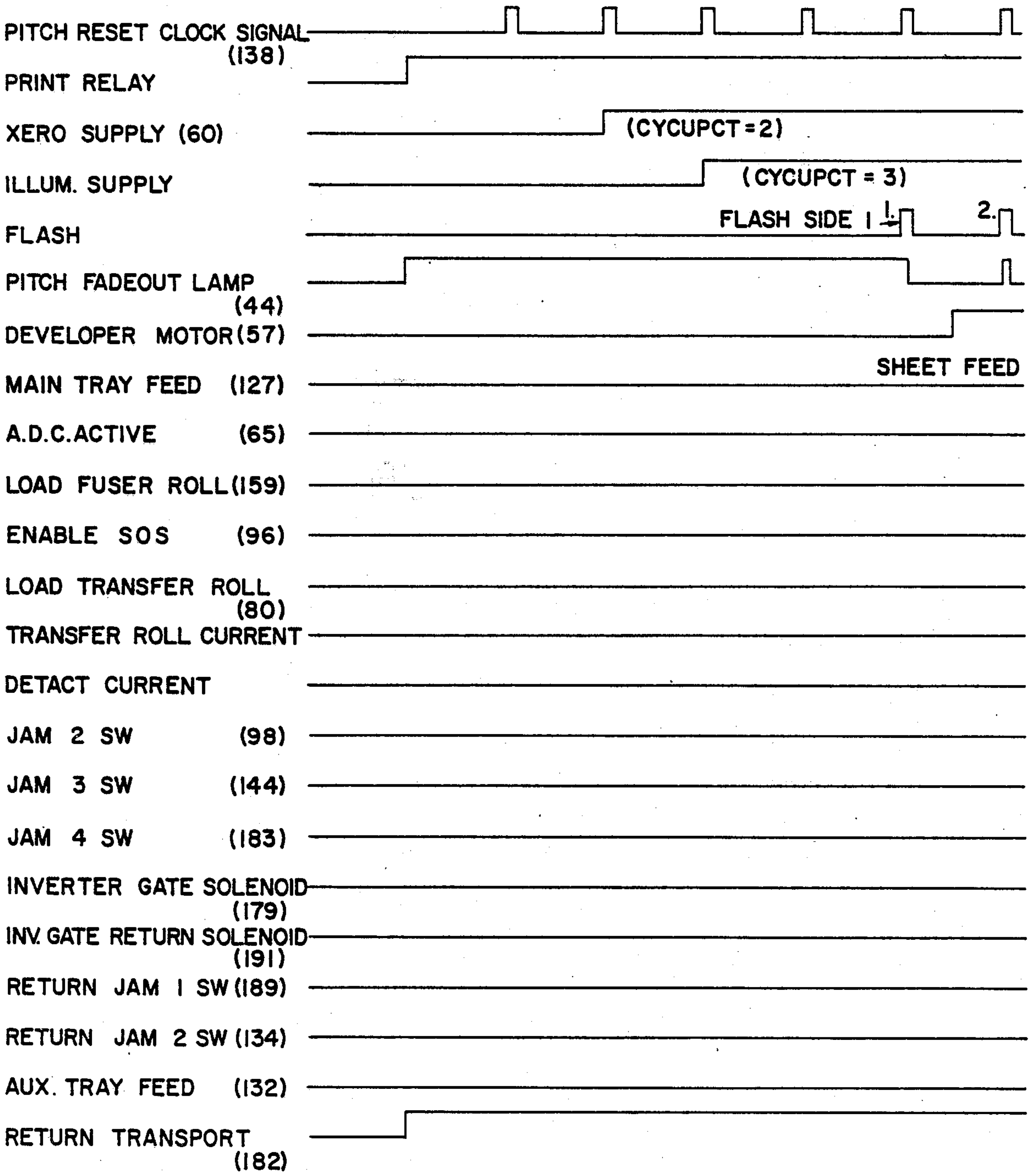
Figure 40B:
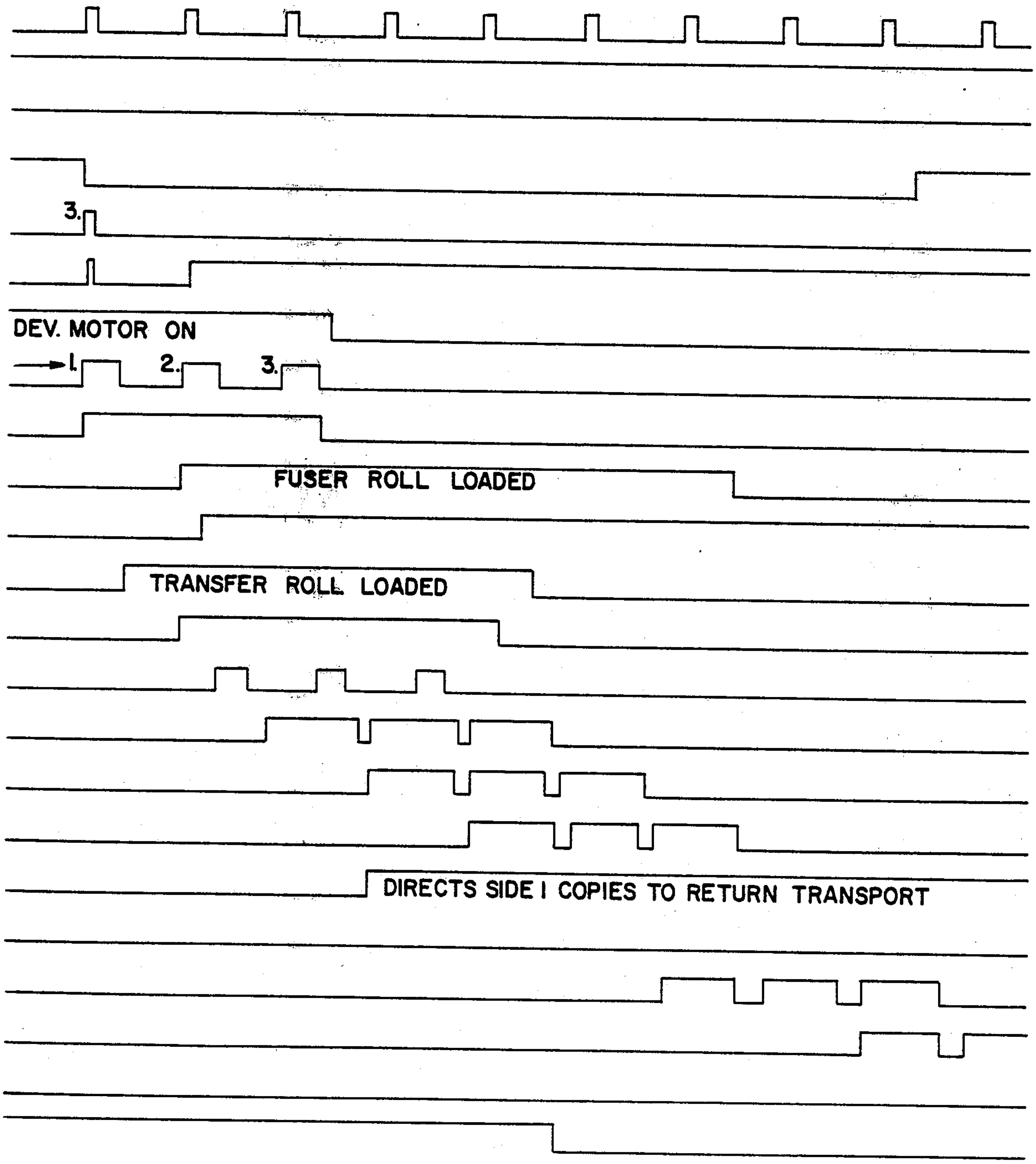
Figure 40C:
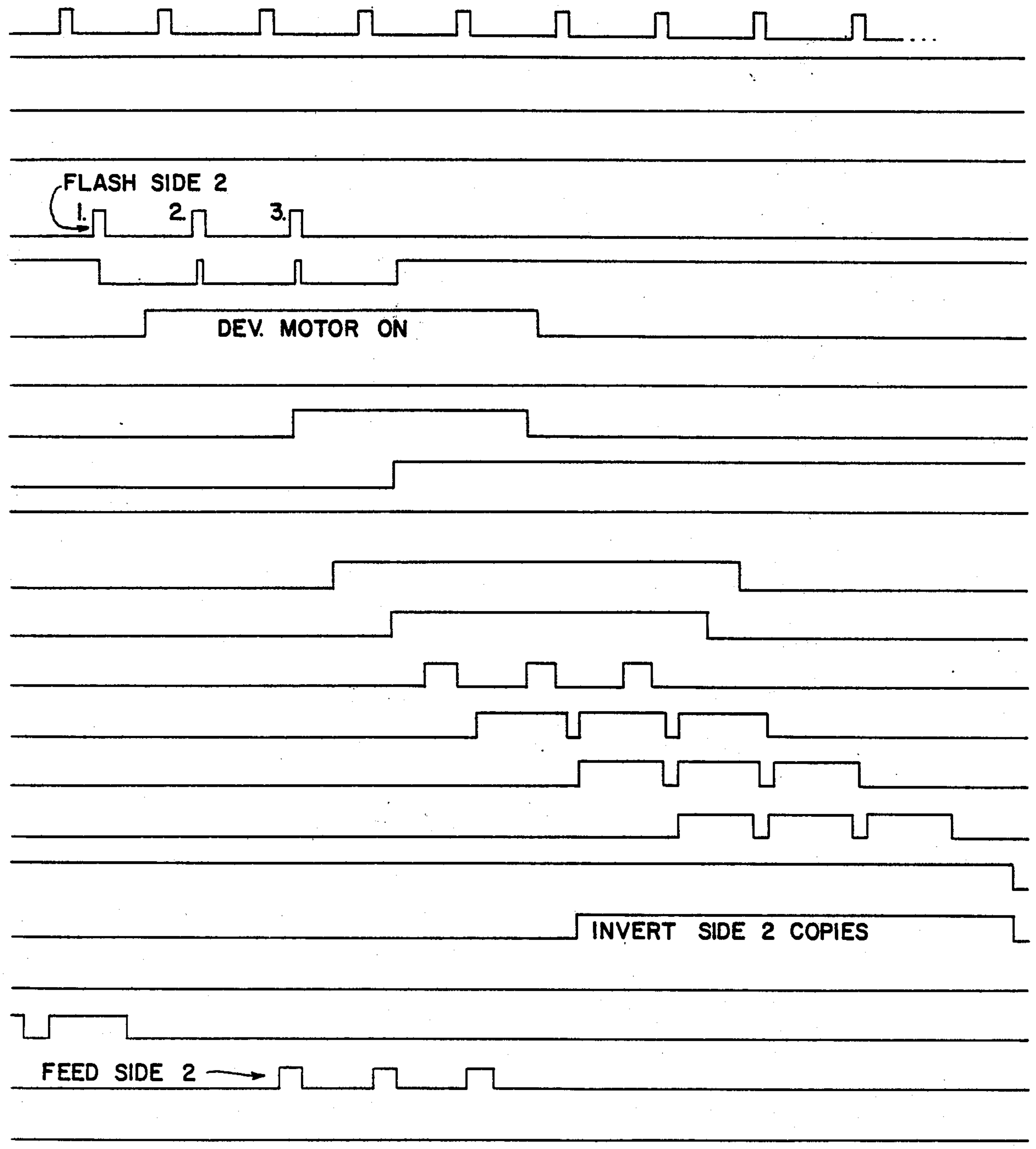
Figure 41A:
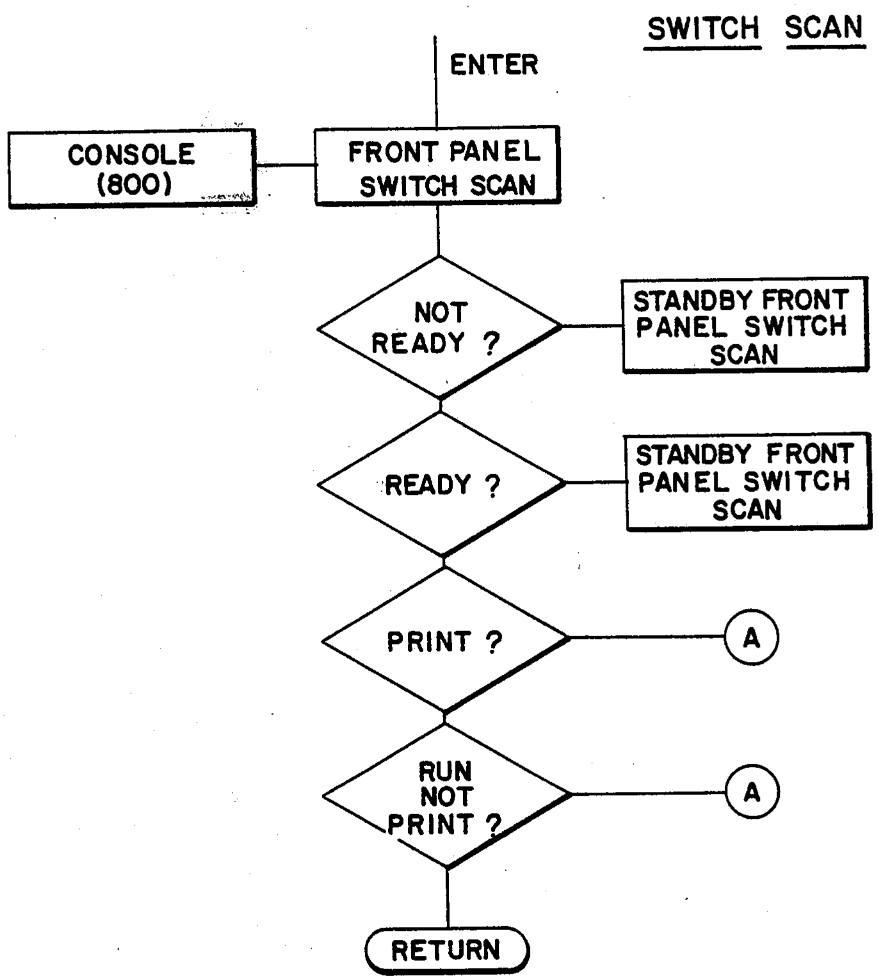
Figure 41B:
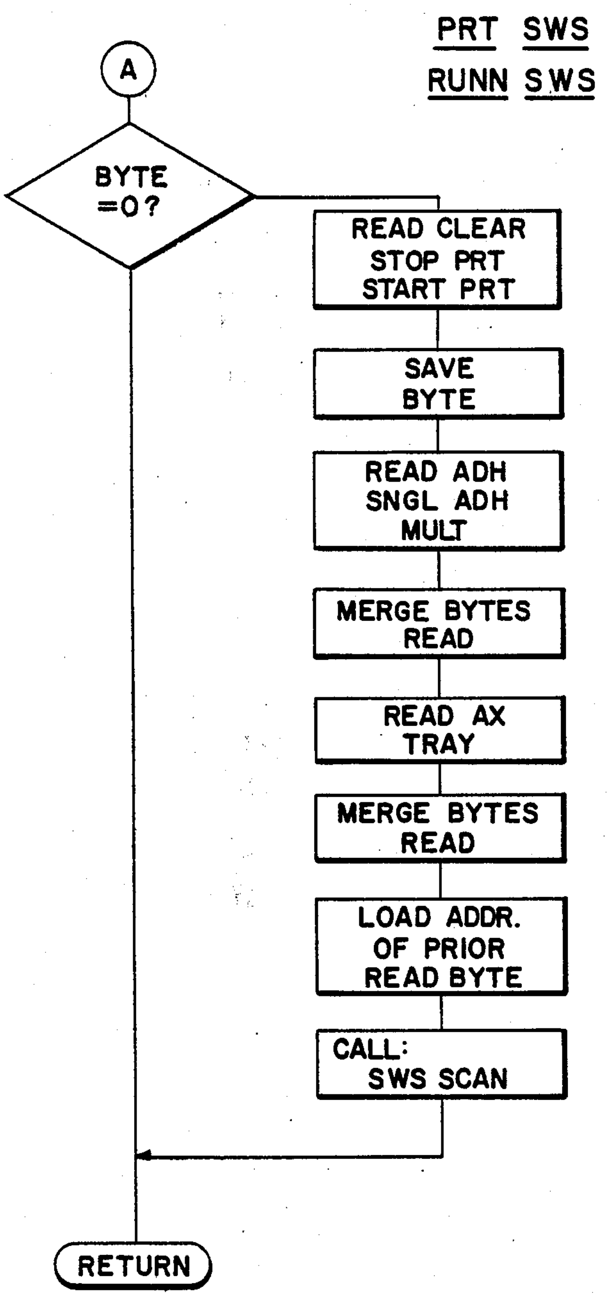
Figure 42:
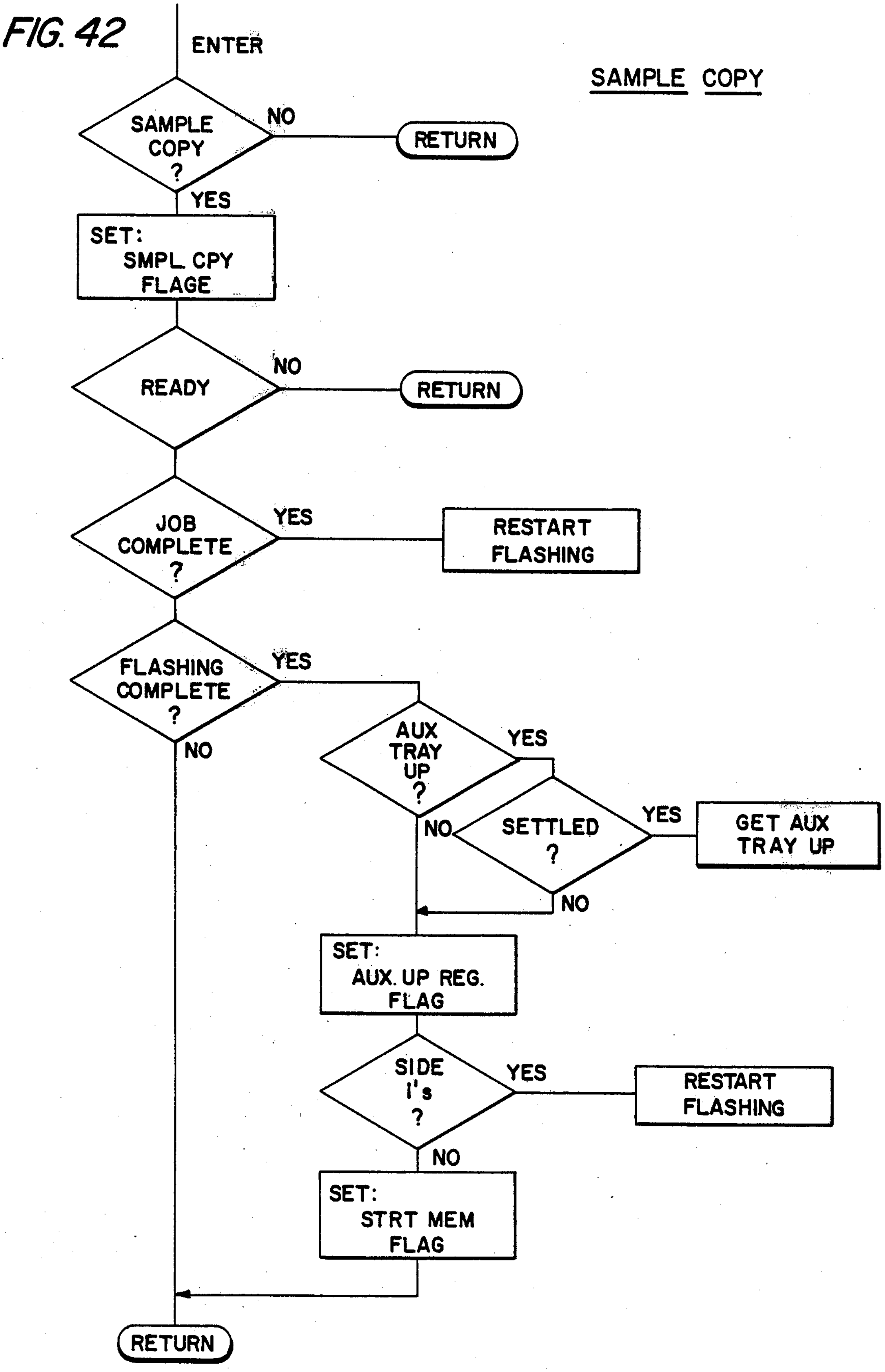
Figure 43A:
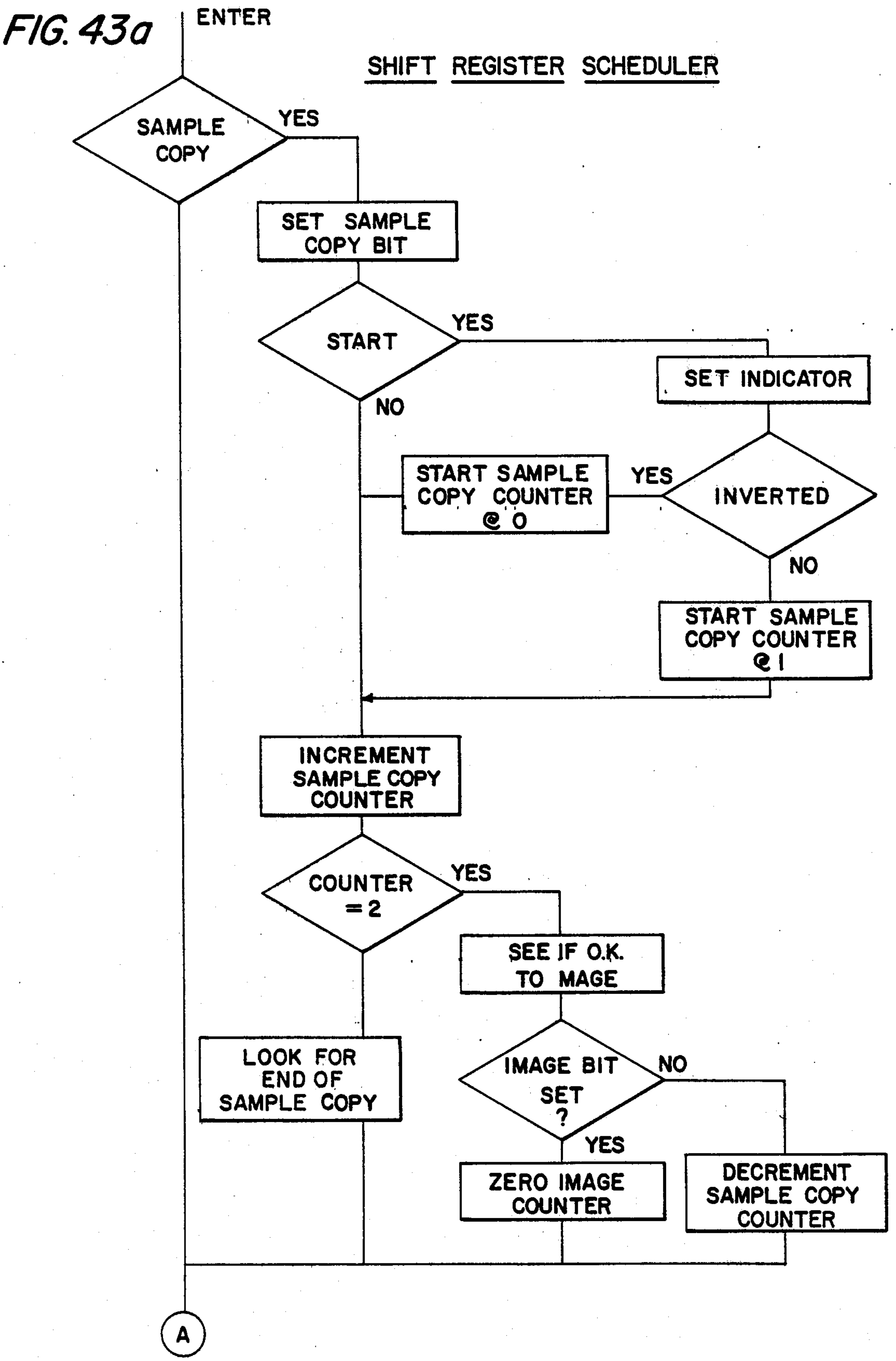
Figure 43B:
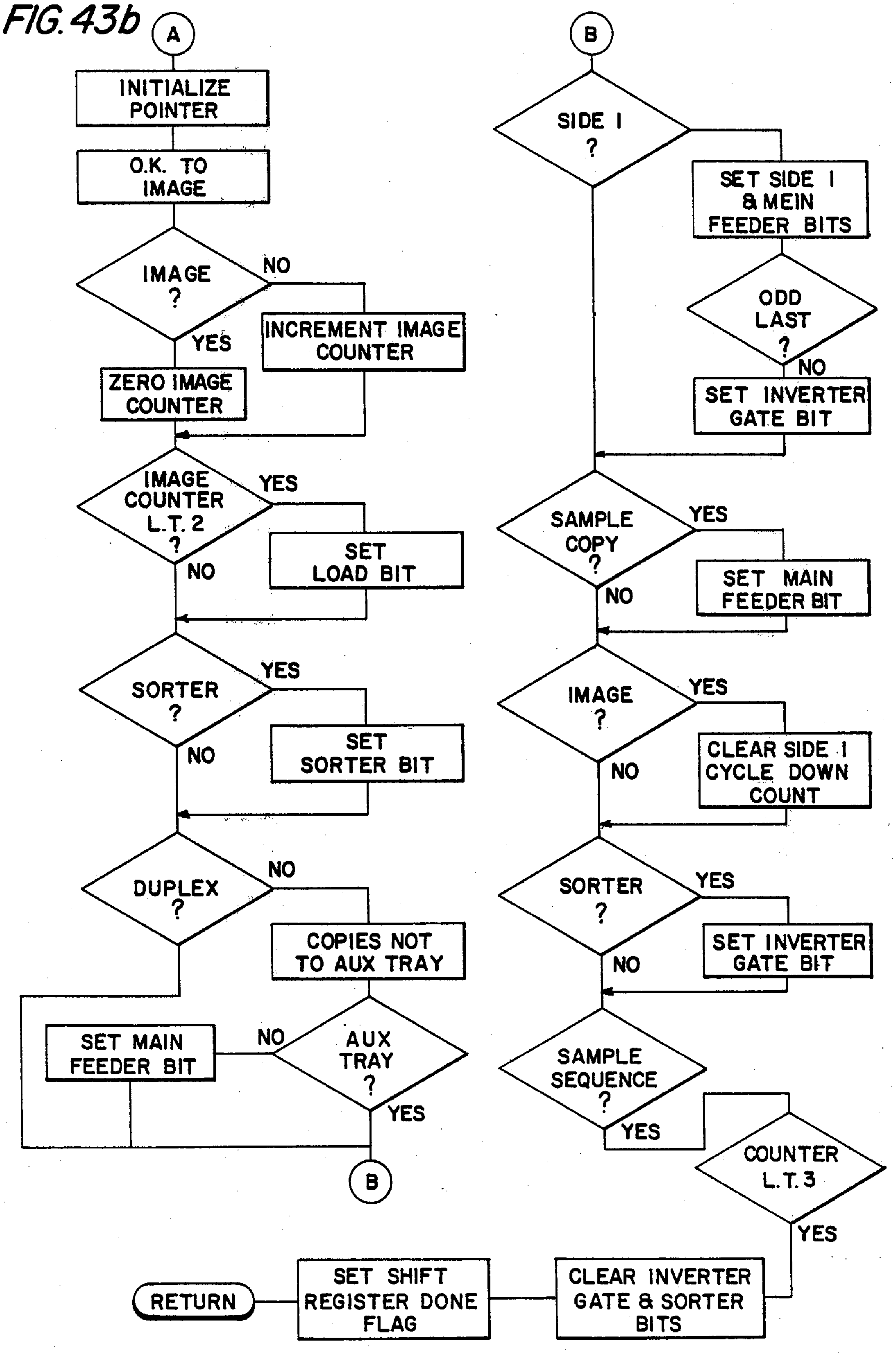

FIG. **18*a*** is a block diagram showing the CPU microprocessor input/output connections;

FIG. **18*b*** is a timing chart of Direct Memory access (DMA) Read and Write cycles;

FIG. **19*a*** is a logic schematic of the CPU clock;

FIG. **19*b* is a chart illustrating the output wave form of the clock shown in FIG. 19*a***;

FIG. 20 is a logic schematic of the CPU memory;

FIG. 21 is a logic schematic of the CPU memory ready;

FIGS. **22*a*, 22*b*, 22*c*** are logic schematics of the CPU power supply stages;

FIGS. **23*a* and 23*b*** comprise a block diagram of the controller I/O module;

FIG. 24 is a logic schematic of the nonvolatile memory power supply;

FIG. 25 is a block diagram of the apparatus interface and remote output connections;

FIG. 26 is a block diagram of the CPU interface module;

FIG. 27 is a block diagram of the apparatus special circuits module;

FIG. 28 is a block diagram of the main panel interface module;

FIG. 29 is a block diagram of the input matrix module;

FIG. 30 is a block diagram of a typical remote;

FIG. 31 is a block diagram of the sorter remote;

FIG. 32 is a view of the control console for imputting copy run instructions to the apparatus shown in FIG. 1;

FIG. 33 is a flow chart illustrating a typical machine state;

FIG. 34 is a flow chart of the machine state routine;

FIG. 35 is a view showing the event table layout;

FIG. 36 is a chart illustrating the relative timing sequences of the clock interrupt pulses;

FIG. 37 is a flow charge of the pitch interrupt routine;

FIG. 38 is a flow chart of the machine clock interrupt routine;

FIGS. 39*a* and 39*b* comprise a flow chart of the real time interrupt routines;

FIG. 40*a*, 40*b*, 40*c* are a timing chart of the principal operating components of the host machine in an exemplary copy run;

FIG. 41 is a flow chart of the routine for enabling sample copies to be made, the routine including a subroutine for checking whether or not an image is allowed;

FIG. 42 is a flow chart of the sample copy subroutine;

FIG. 43 is a flow chart of the shift register scheduler routine; and

Figure 44:
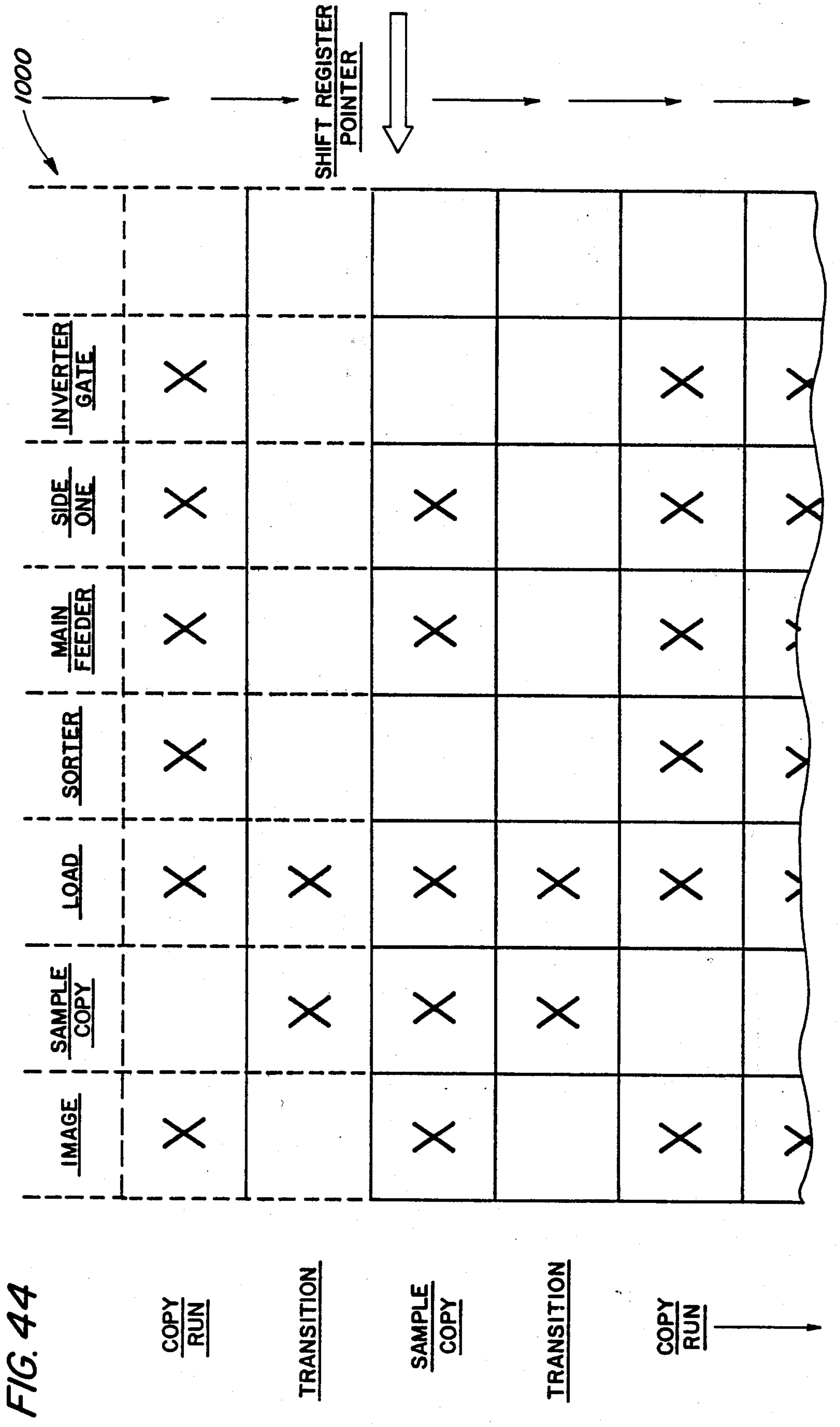

FIG. 44 is a schematic view of the shift register scheduler arrangement.

DETAILED DESCRIPTION OF THE PREFERRED EMBODIMENT OF THE INVENTION

Figure 2:
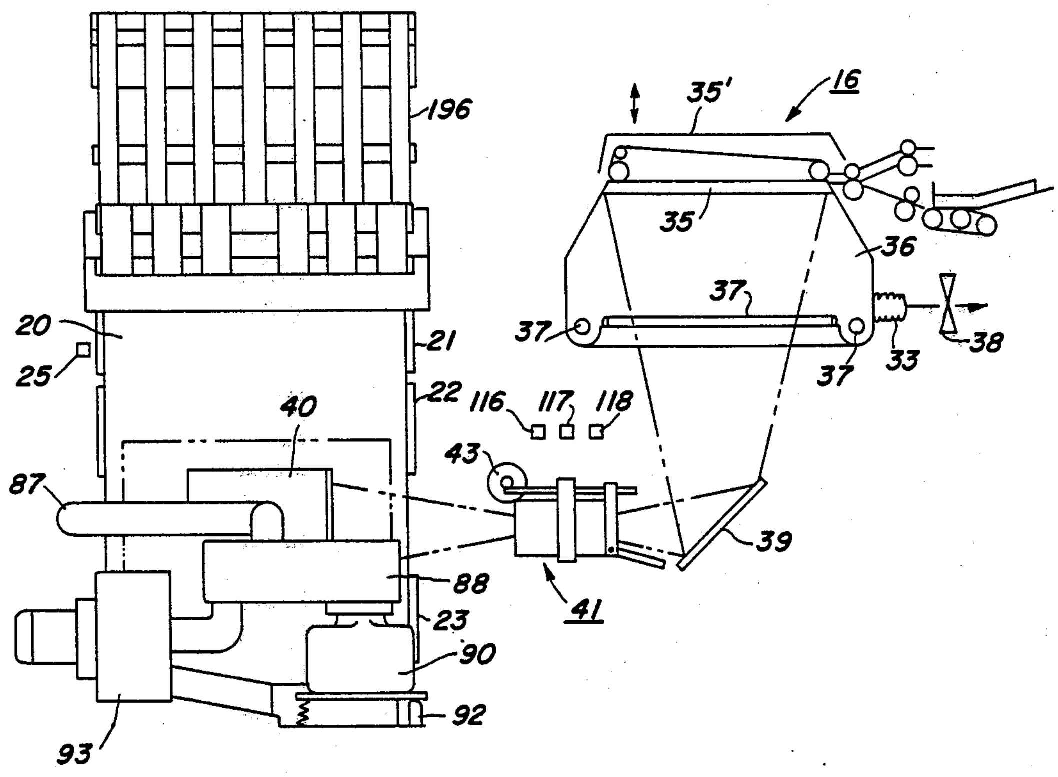
FIG. 2 is a vertical section view of the apparatus shown in FIG. 1 along the image plane.
Figure 3:
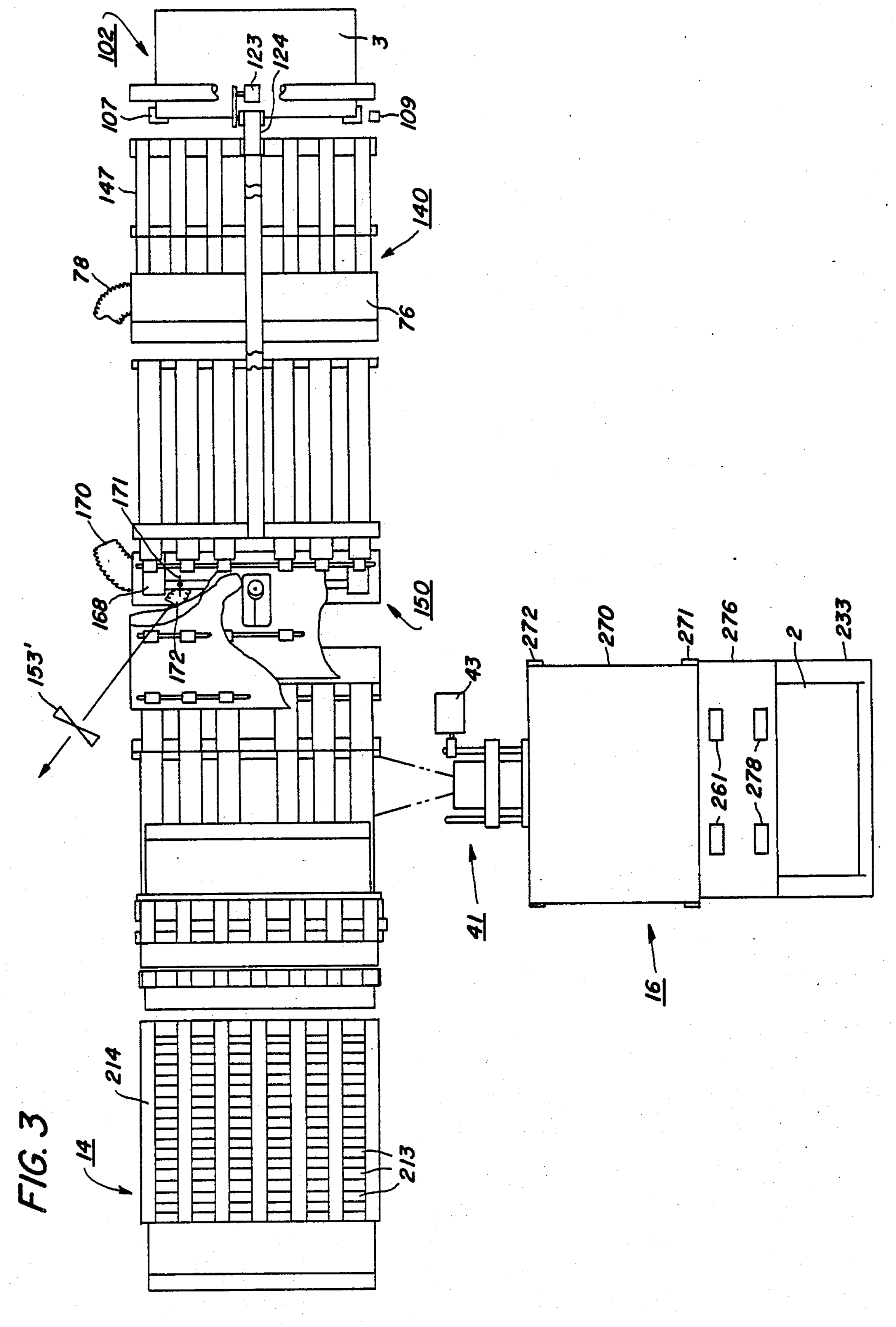
FIG. 3 is a top plane view of the apparatus shown in FIG. 1.

Referring particularly to FIGS. 1–3 of the drawings, there is shown, in schematic outline, an electrostatic reproduction system or host machine, identified by numeral 10, incorporating the control arrangement of the present invention. To facilitate description, the reproduction system 10 is divided into a main electrostatic xerographic processor 12, sorter 14, decument handler 16, and controller 18. Other processor, sorter and/or document handler types and constructions, and different combinations thereof may instead by envisioned.

PROCESSOR

Processor 12 utilizes a photoreceptor in the form of an endless photoconductive belt 20 supported in generally triangular configuration by rolls 21, 22, 23. Belt supporting rolls 21, 22, 23 are in turn rotatably journaled on subframe 24.

In the exemplary processor illustrated, belt 20 comprises a photoconductive layer of selenium, which is the light receiving surface and imaging medium, on a conductive substrate. Other photoreceptor types and forms, such as comprising organic materials or of multilayer or a drum may instead be envisioned. Still other forms may comprise scroll type arrangements wherein webs of photoconductive material may be played in and out of the interior of supporting cylinders.

Figure 4:
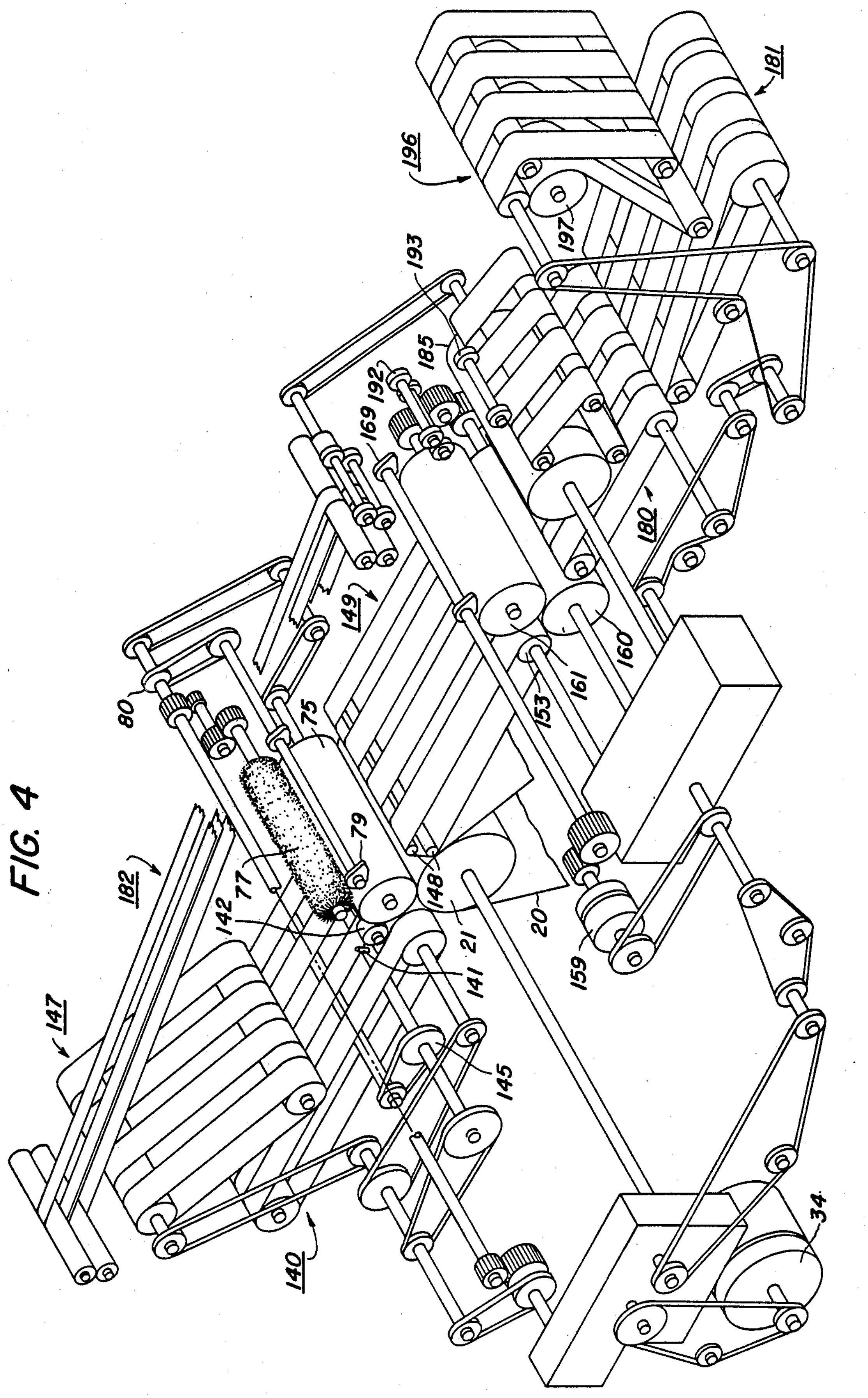
FIG. 4 is an isometric view showing the drive train for the apparatus shown in FIG. 1.

Suitable biasing means (not shown) are provided on subframe 24 to tension the photoreceptor belt 20 and insure movement of belt 20 along a prescribed operating path. Belt tracking switch 25 (shown in FIG. 2) monitors movement of belt 20 from side to side. Belt 20 is supported so as to provide a trio of substantially flat belt runs opposite exposure, developing, and cleaning stations 27, 28, 29 respectfully. To enhance belt flatness at these stations, vacuum platens 30 are provided under belt 20 at each belt run. Conduits 31 communicate vacuum platens 30 with a vacuum pump 32. Photoconductive belt 20 moves in the direction indicated by the solid line arrow, drive thereto being effected through roll 21, which in turn is driven by main drive motor 34, as seen in FIG. 4.

Processor 12 includes a generally rectangular, horizontal transparent platen 35 on which each original 2 to be copied is disposed. A two or four sided illumination assembly, consisting of internal reflectors 36 and flash lamps 37 (shown in FIG. 2) disposed below and along at least two sides of platen 35, is provided for illuminating the original 2 on platen 35. To control temperatures within the illumination space, the assembly is coupled through conduit 33 with a vacuum pump 38 which is adapted to withdraw overly heated air from the space. To retain the original 2 in place on platen 35 and prevent escape of extraneous light from the illumination assembly, a platen cover 35′ may be provided.

The light image generated by the illumination system is projected via mirrors 39, 40 and a variable magnification lens assembly 41 onto the photoreceptive belt 20 at the exposure station 27. Reversible motor 43 is provided to move the main lens and add on lens elements that comprise the lens assembly 41 to different predetermined positions and combinations to provide the preselected image sizes corresponding to push button selectors 818, 819, 820 on operator module 800. (See FIG. 32) Sensors 116, 117, 118 signal the present disposition of lens assembly 41. Exposure of the previously charged belt 20 selectively discharges the photoconductive belt to produce on belt 20 an electrostatic latent image of the original 2. To prepare belt 20 for imaging, belt 20 is uniformly charged to a preselected level by charge corotron 42 upstream of the exposure station 27.

Figure 5:
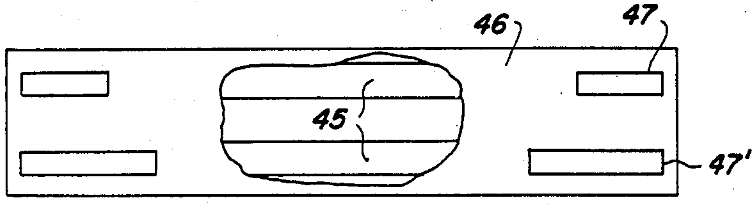
FIG. 5 is an enlarged view showing details of the photoreceptor edge fade-out mechanism for the apparatus shown in FIG. 1.

To prevent development of charged but unwanted image areas, erase lamps 44, 45 are provided. Lamp 44, which is referred to herein as the pitch fadeout lamp, is supported in transverse relationship to belt 20, lamp 44 extending across substantially the entire width of belt 20 to erase (i.e. discharge) areas of belt 20 before the first image, between successive images, and after the last image. Lamps 45, which are referred to herein as edge fadeout lamps, serve to erase areas bordering each side of the images. Referring particularly to FIG. 5, edge fadeout lamps 45, which extend transversely to belt 20, are disposed within a housing 46 having a pair of transversely extending openings 47, 47′ of differing length adjacent each edge of belt 20. By selectively actuating one or the other of the lamps 45, the width of the area bordering the sides of the image that is erased can be controlled.

Figure 6:
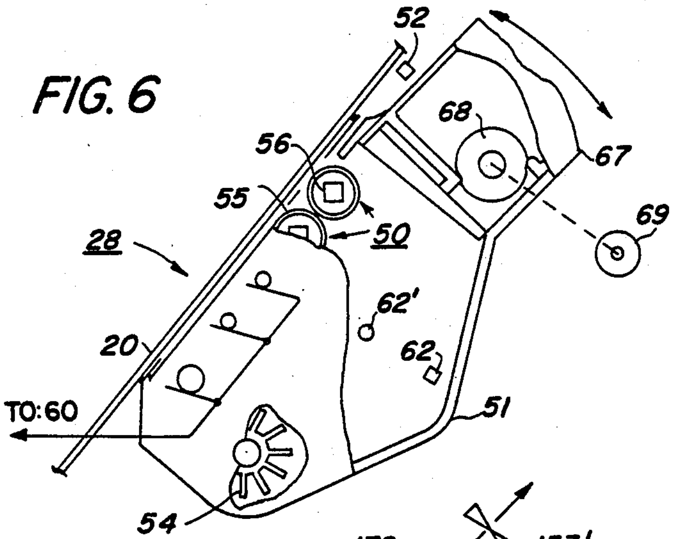
FIG. 6 is an enlarged view showing details of the developing mechanism for the apparatus shown in FIG. 1.
Figure 7:
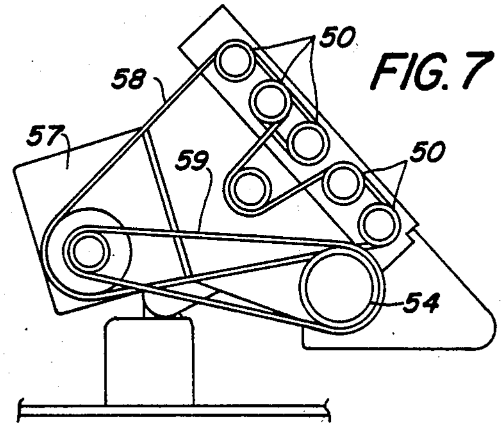
FIG. 7 is an enlarged view showing details of the developing mechanism drive.

Referring to FIGS. 1, 6 and 7, magnetic brush rolls 50 are provided in a developer housing 51 at developing station 28. Housing 51 is pivotally supported adjacent the lower end thereof with interlock switch 52 to sense disposition of housing 51 in operative position adjacent belt 20. The bottom of housing 51 forms a sump within which a supply of developing material is contained. A rotatable auger 54 in the sump area serves to mix the developing material and bring the material into operative relationship with the lowermost of the magnetic brush rolls 50.

As will be understood by those skilled in the art, the electrostatically attractable developing material commonly used in magnetic brush developing apparatus of the type shown comprises a pigmented rsinous powder, referred to as toner, and larger granular beads referred to as carrier. To provide the necessary magnetic properties, the carrier is comprised of a magnetizable material such as steel. By virtue of the magnetic fields extablished by developing rolls 50 and the interrelationship therebetween, a blanket of developing material is formed along the surfaces of developing rolls 50 adjacent the belt 20 and extending from one roll to another. Toner is attracted to the electrostatic latent image from the carrier bristles to produce a visible powder image on the surface of belt 20.

Magnetic brush rolls 50 each comprise a rotatable exterior sleeve 55 with relatively stationary magnet 56 inside. Sleeves 55 are rotated in unison and at substantially the same speed as belt 20 by a developer drive motor 57 through a belt and pulley arrangement 58. A second belt an pulley arrangement 59 drives auger 54.

To regulate development of the latent electrostatic images on belt 20, magnetic brush sleeves 55 are electrically biased. A suitable power supply 60 is provided for this purpose with the amount of bias being regulated by controller 18.

Figure 8:
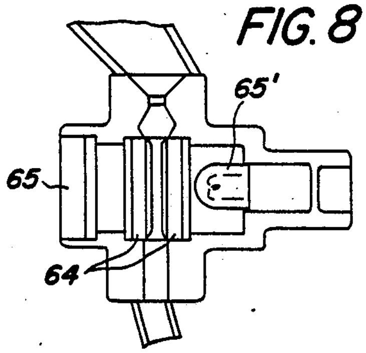
FIG. 8 is an enlarged view showing details of the developability control for the apparatus shown in FIG. 1.
Figure 11:
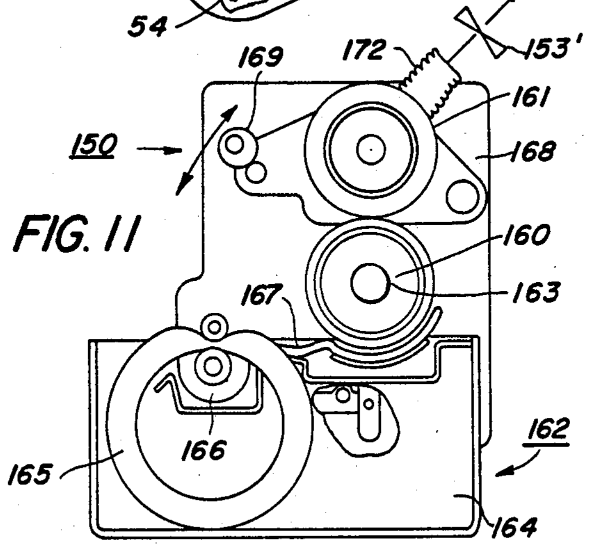
FIG. 11 is an enlarged view showing details of the fuser for the apparatus shown in FIG. 1.

Developing material is returned to the upper portion of developer housing 51 for reuse and is accomplished by utilzing a photocell 62 which monitors the level of developing material in housing 51 and a photocell lamp 62' spaced opposite to the photocell 62 in cooperative relationship therewith. The disclosed machine is also provieed with automatic developability control which maintains an optimum proportion of toner-to-carrier material by sensing toner concentration and replenishing toner, as needed. As shown in FIG. 8, the automatic developability control comprises a pair of transparent plates 64 mounted in spaced, parrellel arrangement in developer housing 51 such that a portion of the returning developing material passes therebetween. A suitable circuit, not shown, alternately places a charge on the plates 64 to attract toner thereto. Photocell 65 on one side of the plate pair senses the developer material as the material passes therebetween. Lamp 65' on the opposite side of plate pair 64 provides reference illumination. In this arrangement, the returning developing material is alternately attracted and repelled to and from plate 64. The accumulation of toner, i.e. density determines the amount of light transmitted from lamp 65' to photocell 65. Photocell 65 monitors the density of the returning developing material with the signal output therefrom being used by controller 18 to control the amount of fresh or make-up toner to be added to developer housing 51 from toner supply container 67.

To discharge toner from container 67, rotatable dispensing roll 68 is provided in the inlet to developer housing 51. Motor 69 drives roll 68. When fresh toner is required, as determined by the signal from photocell 65, controller 18 actuates motor 69 to turn roll 68 for a timed interval. The rotating roll 68, which is comprised of a relatively porous sponge-like material, carries toner particles thereon into developer housing 51 where it is discharged. Pre-transfer corotron 70 and lamp 71 are provided downstream of magnetic brush rolls 50 to regulate developed image charges before transfer.

A magnetic pick-off roll 72 is rotatably supported opposite belt 20 downstream of pre-transfer lamp 71, roll 72 serving to scavenge leftover carrier from belt 20 preparatory to transfer of the developed image to the copy sheet 3. Motor 73 turns roll 72 in the same direction and at substantially the same speed as belt 20 to prevent scoring or scratching of belt 20. One type of magnetic pick-off roll is shown in U.S. Pat. No. 3,834,804, issued Oct. 10, 1974 to Bhagat et al.

Figure 9:
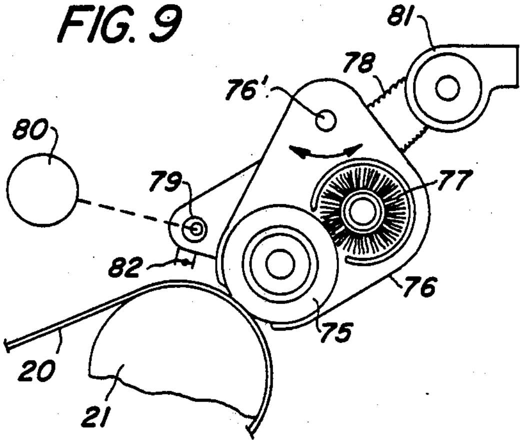
FIG. 9 is an enlarged view showing details of the transfer roll support mechanism for the apparatus shown in FIG. 1.
Figure 12:
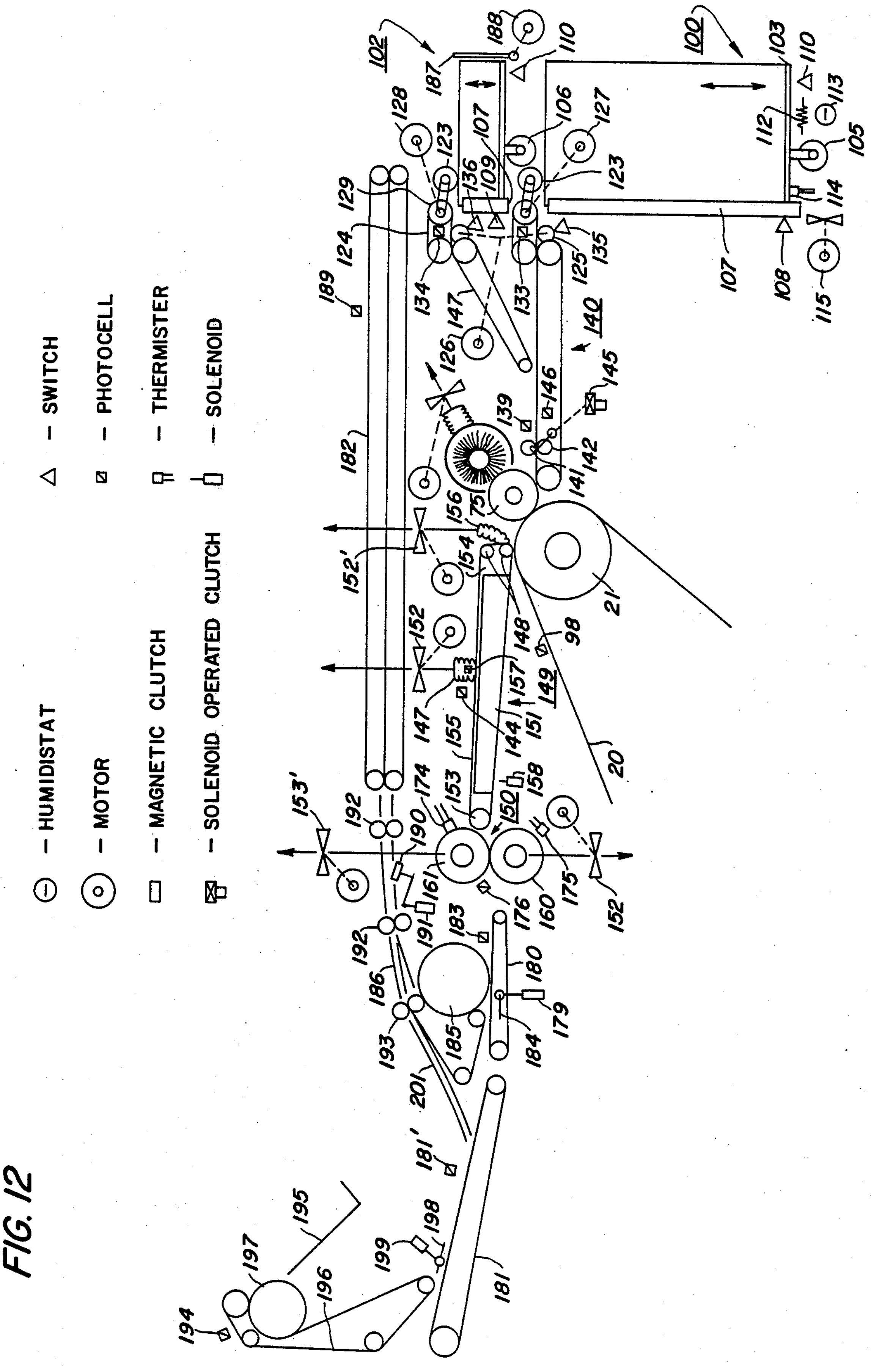
FIG. 12 is a schematic view showing the paper path and sensors of the apparatus shown in FIG. 1.

Referring to FIGS. 4, 9 and 12, to transfer developed images from belt 20 to the copy sheets 3, a transfer roll 75 is provided. Transfer roll 75, which forms part of the copy sheet feed path, is rotatably supported within a transfer roll housing opposite belt support roll 21. Housing 76 is pivotally mounted at 76' to permit the transfer roll assembly to be moved into and out of operative relationship with belt 20. A transfer roll cleaning brush 77 is rotatably journalled in transfer roll housing 76 with the brush periphery in contact with transfer roll 90. Transfer roll 75 is driven through contact with belt 20 while cleaning brush 77 is coupled to main drive motor 34. To remove toner, housing 76 is connected through conduit 78 with vacuum pump 81. To facilitate and control transfer of the developed images from belt 20 to the copy sheets 3, a suitable electrical bias is applied to transfer roll 75.

To permit transfer roll 75 to be moved into and out of operative relationship with belt 20, cam 79 is provided in driving contact with transfer roll housing 76. Cam 79 is driven from motor 34 through an electromagnetically operated one revolution clutch 80. Spring means (not shown) serves to maintain housing 76 in driving engagement with cam 79.

To facilitate separation of the copy sheets 3 from belt 20 following transfer of developed images, a detack corotron 82 is provided. Corotron 82 generates a charge designed to neutralize or reduce the charges tending to retain the copy sheet on belt 20. Corotron 82 is supported on transfer roll housing 76 opposite belt 20 and downstream of transfer roll 75.

Figure 10:
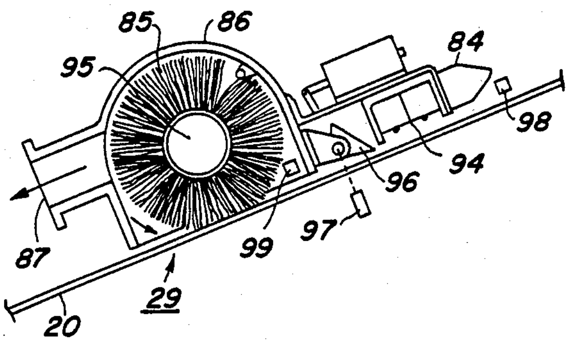
FIG. 10 is an enlarged view showing details of the photoreceptor cleaning mechanism for the apparatus shown in FIG. 1.

Referring to FIGS. 1, 2 and 10, to prepare belt 20 for cleaning, residual charges on belt 20 are removed by discharge lamp 84 and preclean corotron 94. A cleaning brush 85, rotatably supported within an evacuated semicircular shaped brush housing 86 at cleaning station 29, serves to remove residual developer from belt 20. Motor 95 drives brush 85, brush 85 turning in a direction opposite that of belt 20.

Vacuum conduit 87 couples brush housing 86 through a centrifugal type separator 88 with the suction side of vacuum pump 93. A final filter 89 on the outlet of motor 93 traps particles that pass through separator 88. The heavier toner particles separated by separator 88 drop into and are collected in one or more collecting bottles 90. Pressure sensor 91 monitors the condition of final filter 89 while a sensor 92 monitors the level of toner particles in collecting bottles 90.

To obviate the danger of copy sheets remaining on belt 20 and becoming entangled with the belt cleaning mechanism, a deflector 96 is provided upstream of cleaning brush 85. Deflector 96, which is pivotally supported on the brush housing 86, is operated by solenoid 97. In the normal or off position, deflector 96 is spaced from belt 20 (the solid line position shown in the drawings). Energization of solenoid 97 pivots deflector 96 downwardly to bring the deflector leading edge into close proximity to belt 20.

Sensors 98, 99 are provided on each side of deflector 96 for sensing the presence of copy material on belt 20. A signal output from upstream sensor 98 triggers solenoid 97 to pivot deflector 96 into position to intercept the copy sheet on belt 20. The signal from sensor 98 also initiates a system shutdown cycle (mis-strip jam) wherein the various operating components are, within a prescribed interval, brought to a stop. The interval permits any copy sheet present in fuser 150 to be removed, sheet trap solenoid 158 (FIG. 12) having been actuated to prevent the next copy sheet from entering fuser 150 and becoming trapped therein. The signal from sensor 99, indicating failure of deflector 96 to intercept or remove the copy sheet from belt 20, triggers an immediate or hard stop (sheet on selenium jam) of the processor. In such instances the power to drive motor 34 is interrupted to bring belt 20 and the other components driven therefrom to an immediate stop.

Referring particularly to FIGS. 1 and 12, copy sheets 3 comprise precut paper sheets supplied from either main or auxiliary paper trays 100, 102. Each paper tray has a platform or base 103 for supporting in stack-like fashion a quantity of sheets. The tray platforms 103 are supported for vertical up and down movement by motors 105, 106. Side guide pairs 107, in each tray 100, 102 delimit the tray side boundaries, the guide pairs being adjustable toward and away from one another in accommodation of different size sheets. Sensors 108, 109 respond to the position of each side guide pair 107, the output of sensors 108, 109 serving to regulate operation of edge fadeout lamps 45 and fuser cooling valve 171 (FIG. 3). Lower limit switches 110 on each tray prevent overtravel of the tray platform in a downward direction.

A heater 112 is provided below the platform 103 of main tray 100 to warm the tray area and enhance feeding of sheets therefrom. Humidstat 113 and thermostat 114 control operation of heater 112 in response to the temperature/humidity conditions of main tray 100. Fan 115 is provided to circulate air within tray 100.

To advance the sheets 3 from either main or auxiliary tray 100, 102, main and auxiliary sheet feeders 120, 121 are provided. Feeders 120, 121 each include a nudger roll 123 to engage and advance the topmost sheet in the paper tray forward into the nip formed by a feed belt 124 and retard roll 125. Retard rolls 125, which are driven at an extremely low speed by motor 126, cooperate with feed belts 124 to restrict feeding of sheets from trays 100, 102 to one sheet at a time.

Feed belts 124 are driven by main and auxiliary sheet feed motors 127, 128 respectively. Nudger rolls 123 are supported for pivotal movement about the axis of feed belt drive shaft 129 with drive to the nudger rolls taken from drive shaft 129. Stack height sensors 133, 134 are provided for the main and auxiliary trays, the pivoting nudger rolls 123 serving to operate sensors 133, 134 in response to the sheet stack height. Main and auxiliary tray misfeed sensors 135, 136 are provided at the tray outlets.

Main transport 140 extends from main paper tray 100 to a point slightly upstream of the nip formed by photoconductive belt 20 and transfer roll 75. Transport 140 is driven from main motor 34. To register sheets 3 with the images developed on belt 20, sheet register fingers 141 are provided, fingers 141 being arranged to move into and out of the path of the sheets on transport 140 once each revolution (see also FIG. 4). Registration fingers 141 are driven from main motor 34 through electromagnetic clutch 145. A timing or reset switch 146 is set once on each revolution of sheet register fingers 141. Sensor 139 monitors transport 140 for jams. Further amplification of sheet register system may be found in U.S. Pat. No. 3,781,004, issued Dec. 25, 1973 to Buddendeck et al.

Pinch roll pair 142 is interspaced between transport belts that comprise main transport 140 on the downstream side of register fingers 141. Pinch roll pair 142 are driven from main motor 34.

Auxiliary transport 147 extends from auxiliary tray 102 to main transport 140 at a point upstream of sheet register fingers 141. Transport 147 is driven from motor 34.

To maintain the sheets in driving contact with the belts of transports 140, 147, suitable guides or retainers (not shown) may be provided along the belt runs.

The image bearing sheets leaving the nip formed by photoconductive belt 20 and transfer roll 75 are picked off by belts 155 of the leading edge of vacuum transport 149. Belts 155, which are perforated for the admission of vacuum therethrough, ride on forward roller pair 148 and rear roll 153. A pair of internal vacuum plenums 151, 154 are provided, the leading plenum 154 cooperating with belts 155 to pick up the sheets leaving the belt/transfer roll nip. Transport 149 conveys the image bearing sheets to fuser 150. Vacuum conduits 147, 156 communicate plenums 151, 154 which vacuum pumps 152, 153'. A pressure sensor 157 monitors operation of vacuum pump 152. Sensor 144 monitors transport 149 for jams.

To prevent the sheet on transport 149 from being carried into fuser 150 in the event of a jam or malfunction, a trap solenoid 158 is provided below transport 149. Energization of solenoid 158 raises the armature thereof into contact with the lower face of plenum 154 to intercept and stop the sheet moving therepast.

Referring particularly to FIGS. 4, 10 and 12, fuser 150 comprises a lower heated fusing roll 160 and upper pressure roll 161. Rolls 160, 161 are supported for rotation in fuser housing 162. The core of fusing roll 160 is hollow for receipt of heating rod 163 therewithin.

Housing 162 includes a sump 164 for holding a quantity of liquid release agent, herein termed oil. Dispensing belt 165, moves through sump 164 to pick up the oil, belt 165 being driven by motor 166. A blanket-like wick 167 carries the oil from belt 165 to the surface of fusing roll 160.

Pressure roll 161 is supported within an upper pivotal section 168 of housing 162. This enables pressure roll 161 to be moved into and out of operative contact fusing roll 160. Cam shaft 169 in the lower portion of fuser housing 162 serves to move housing section 168 and pressure roll 161 into operative relationship with fusing roll 160 against a suitable bias (not shown). Cam shaft 169 is coupled to main motor 34 through an electromagnetically operated one revolution clutch 159.

Fuser section 168 is evacuated, conduit 170 coupling housing section 168 with vacuum pump 152. The ends of housing section 168 are separated into vacuum compartments opposite the ends of pressure roll 161 thereunder to cool the roll ends where smaller size copy sheets 3 are being processed. Vacuum valve 171 (FIG. 3) in conduit 172 regulates communication of the vacuum compartments with vacuum pump 153' in response to the size sheets as sensed by side guide sensors 108, 109 in paper trays 100, 102.

Fuser roll 160 is driven from main motor 34. Pressure roll 161 is drivingly coupled to fuser roll 160 for rotation therewith.

Thermostat 174 (FIG. 12) in fuser housing 162 controls operation of heating rod 163 in response to temperature. Sensor 175 protects against fuser over-temperature. To protect against trapping of a sheet in fuser 150 in the event of a jam, sensor 176 is provided.

Following fuser 150, the sheet is carried by post fuser transport 180 to either discharge transport 181 or, where duplex or two sided copies are desired, to return transport 182. Sheet sensor 183 monitors passage of the sheets from fuser 150. Transports 180, 181 are driven from main motor 34. Sensor 181' monitors transport 181 for jams. Suitable retaining means may be provided to retain the sheets on transports 180, 181.

A deflector 184, when extended, directs sheets on transport 180 onto conveyor roll 185 and into chute 186 leading to return transport 182. Solenoid 179, when energized raises deflector 184 into the sheet path. Return transport 182 carries the sheets back to auxiliary tray 102. Sensor 189 monitors transport 182 for jams. The forward stop 187 of tray 102 is supported for oscillating movement. Motor 188 drives stop 187 back and forth tap sheets returned to auxiliary tray 102 into alignment for refeeding.

To invert duplex copy sheets following fusing of the second or duplex image, a displaceable sheet stop 190 is provided adjacent the discharge end of chute 186. Stop 190 is pivotally supported for swinging movement into and out of chute 186. Solenoid 191 is provided to move stop 190 selectively into or out of chute 186. Pinch roll pairs 192, 193 serve to draw the sheet trapped in chute 186 by stop 190 and carry the sheet forward onto discharge transport 181. Further description of the inverter mechanism may be found in U.S. Pat. No. 3,856,295, issued Dec. 24, 1974, to John H. Looney.

Output tray 195 receives unsorted copies. Transport 196 a portion of which is wrapped around a turn around roll 197, serves to carry the finished copies to tray 195. Sensor 194 monitors transport 196 for jams. To route copies into output tray 195, a deflector 198 is provided. Deflector solenoid 199, when energized, turns deflector 198 to intercept sheets on conveyor 181 and route the sheets onto conveyor 196.

When output tray 195 is not used, the sheets are carried by conveyor 181 to sorter 14.

SORTER

Figure 13:
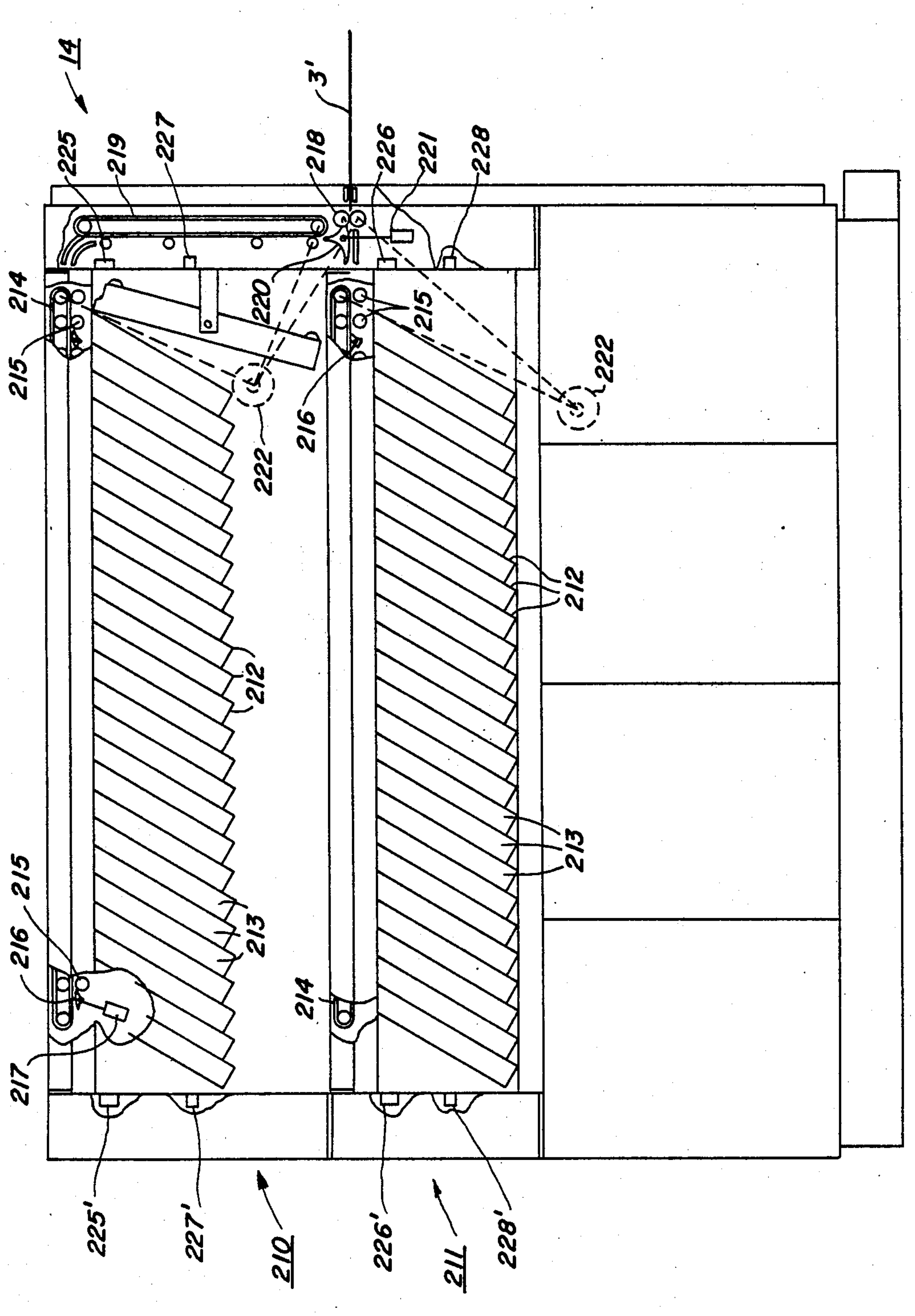
FIG. 13 is an enlarged view showing details of the copy sorter for the apparatus shown in FIG. 1.

Referring particularly to FIG. 13, sorter 14 comprises upper and lower bin arrays 210, 211. Each bin array 210, 211 consists of series of spaced downwardly inclined trays 212, forming a series of individual bins 213 for receipt of finished copies 3'. Conveyors 214 along the top of each bin array, cooperate with idler rolls 215 adjacent the inlet to each bin to transport the copies into juxtaposition with the bins. Individual deflectors 216 at each bin cooperate, when depressed, with the adjoining idler roll 215 to turn the copies into the bin associated therewith. An operating solenoid 217 is provided for each deflector.

A driven roll pair 218 is provided at the inlet to sorter 14. A generally vertical conveyor 219 serves to bring copies 3' to the upper bin array 210. Entrance deflector 220 routes the copies selectively to either the upper or lower bin array 210, 211 respectively. Solenoid 221 operates deflector 220.

Motor 222 is provided for each bin array to drive the conveyors 214 and 219 of upper bin array 210 and conveyor 214 of lower bin array 211. Roll pair 218 is drivingly coupled to both motors.

To detect entry of copies 3' in the individual bins 213, a photoelectric type sensor 225, 226 is provided at one end of each bin array 210, 211 respectively. Sensor lamps 225', 226' are disposed adjacent the other end of the bin array. To detect the presence of copies in the bins 213, a second set of photoelectric type sensors 227, 228 is provided for each bin array, on a level with a tray cutout (not shown). Reference lamps 227', 228' are disposed opposite sensors 227, 228.

DOCUMENT HANDLER

Figure 14:
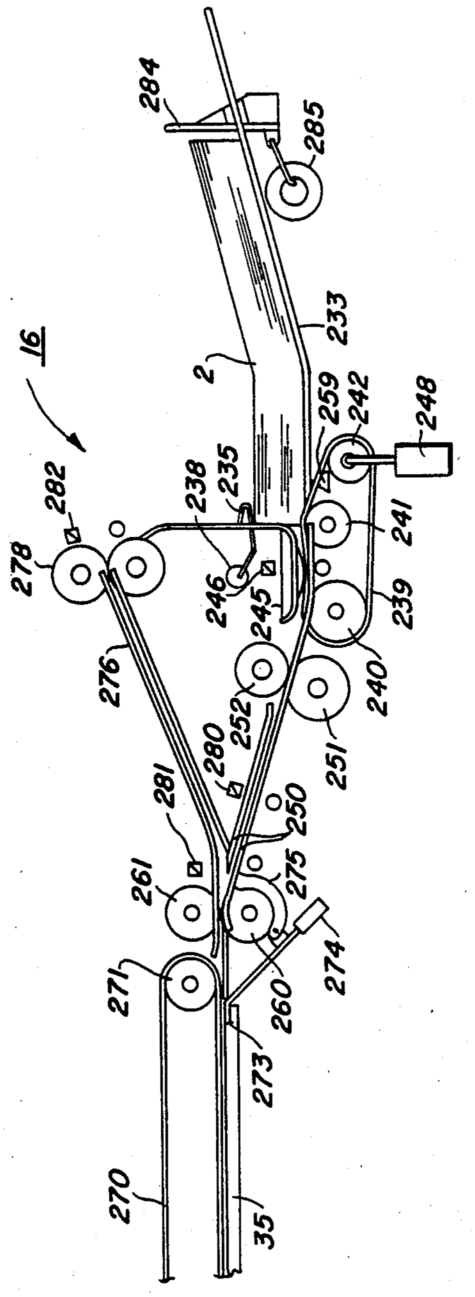
FIG. 14 is a schematic view showing details of the document handler for the apparatus shown in FIG. 1.
Figure 15:
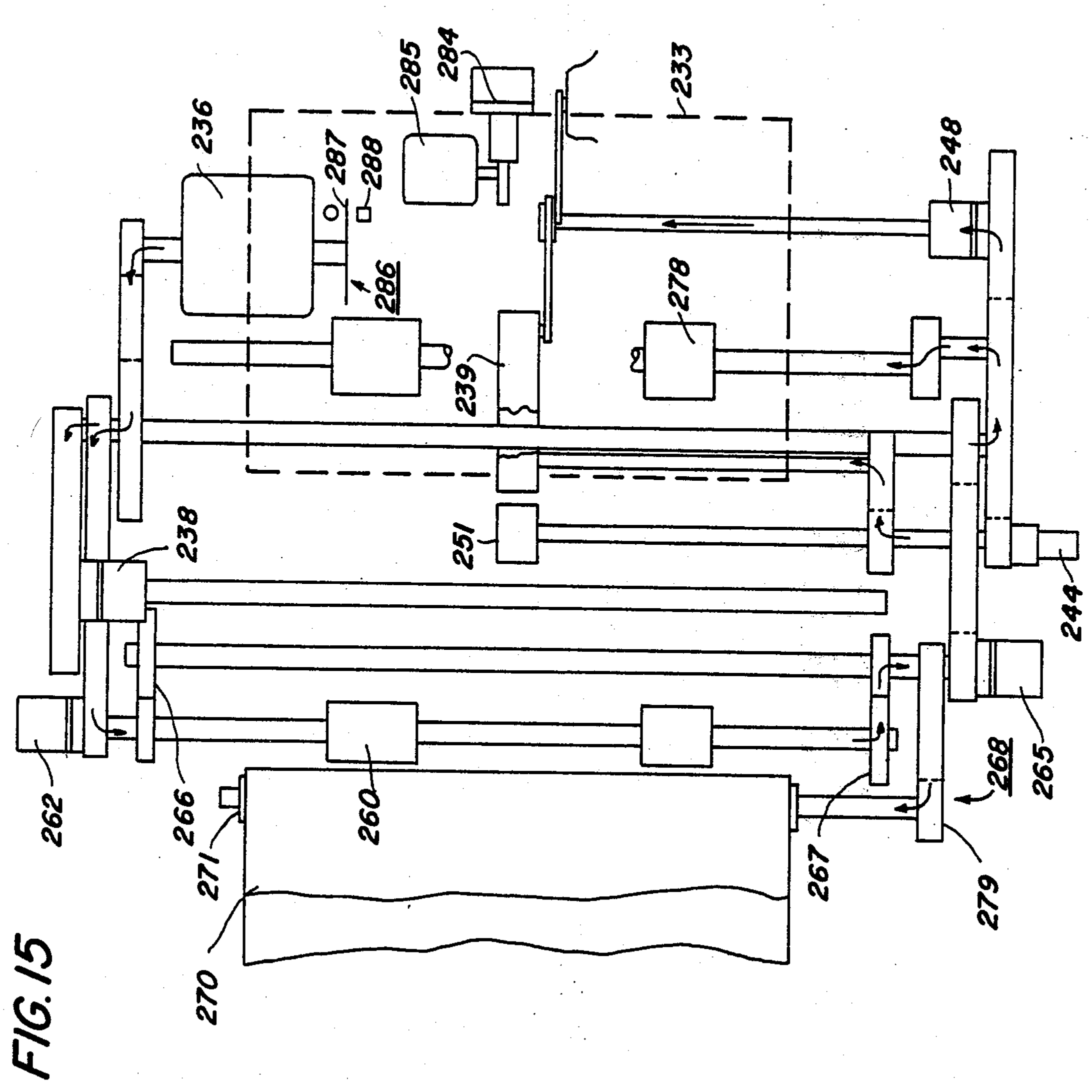
FIG. 15 is a view showing details of the drive mechanism for the document handler shown in FIG. 14.

Referring particularly to FIGS. 14 and 15, document handler 16 includes a tray 233 into which originals or documents 2 to be copied are placed by the operator following which a cover (not shown) is closed. A movable bail or separator 235, driven in an oscillatory path from monitor 236 through a solenoid operated one revolution clutch 238, is provided to maintain document separation.

A document feed belt 239 is supported on drive and idler rolls 240, 241 and kicker roll 242 under tray 233, tray 233 being suitably apertured to permit the belt surface to project therewithin. Feedbelt 239 is driven by motor 236 through electromagnetic clutch 244. Guide 245, disposed near the discharge end of feed belt 239, cooperates with belt 239 to form a nip between which the documents pass.

A photoelectric type sensor 246 is disposed adjacent the discharge end of belt 239. Sensor 246 responds on failure of a document to feed within a predetermined interval to actuate solenoid operated clutch 248 which raises kicker roll 242 and increases the surface area of feed belt 239 in contact with the documents. Another sensor 259 located underneath tray 233 provides an output signal when the last document 2 of each set has left the tray 233.

Document guides 250 route the document fed from tray 233 via roll pair 251, 252 to platen 35. Roll 251 is drivingly coupled to motor 236 through electromagnetic clutch 244. Contact of roll 251 with roll 252 turns roll 252.

Roll pair 260, 261 at the entrance to platen 35 advance the document onto platen 35, roll 260 being driven through electromagnetic clutch 262 in the forward direction. Contact of roll 260 with roll 261 turns roll 261 in the document feeding direction. Roll 260 is selectively coupled through gearset 268 with motor 236 through electromagnetic clutch 265 so that on engagement of clutch 265 and disengagement of clutch 262, roll 260 and roll 261 therewith turn in the reverse direction to carry the document back to tray 233 via return chute 276. One way clutches 266, 267 permit free wheeling of the roll drive shafts.

The document leaving roll pair 260, 261 is carried by platen feed belt 270 onto platen 35, belt 270 being comprised of a suitable flexible material having an exterior surface of xerographic white. Belt 270 is carried about drive and idler rolls 271, 272. Roll 271 is drivingly coupled to motor 236 for rotation in either a forward or reverse direction through clutches 262, 265. Engagement of clutch 262 operates through belt and pulley drive 279 to drive belt in the forward direction, engagement of clutch 265 operates through drive 279 to drive belt 270 in the reverse direction.

To locate the document in predetermined position on platen 35, a register 273 is provided at the platen inlet for engagement with the document trailing edge. For this purpose, control of platen belt 270 is such that following transporting of the document onto plate 35 and beyond register 273, belt 270 is reversed to carry the document backwards against register 273.

To remove the document from platen 35 following copying, register 273 is retracted to an inoperative position. Solenoid 274 is provided for moving register 273.

A document deflector 275, is provided to route the document leaving platen 35 into return chute 276. For this purpose, platen belt 270 and pinch roll pair 260, 261 are reversed through engagement of clutch 265. Discharge roll pair 278, driven by motor 236, carry the returning document into tray 233.

To monitor movement of the documents in document handler 16 and detect jams and other malfunctions, photoelectric type sensors 246 and 280, 281 and 282 are disposed along the document routes.

To align documents 2 returned to tray 233, a document patter 284 is provided adjacent one end of tray 233. Patter 284 is oscillated by motor 285.

TIMING

To provide the requisite operational synchronization between host machine 10 and controller 18 as will appear, processor or machine clock 202 is provided. Referring particularly to FIG. 1, clock 202 comprises a toothed disc 203 drivingly supported on the output shaft of main drive motor 34. A photoelectric type signal generator 204 is disposed astride the path followed by the toothed rim of disc 203, generator 204 producing, whenever drive motor 34 is energized, a pulse like signal output at a frequency correlated with the speed of motor 34, and the machine components driven therefrom.

As described, a second machine clock, termed a pitch reset clock 138 herein, and comprising timing switch 146 is provided. Switch 146 cooperates with sheet register fingers 141 to generate an output pulse once each revolution of fingers 141. As will appear, the pulse like output of the pitch reset clock is used to reset or resynchronize controller 18 with host machine 10.

Figure 17:
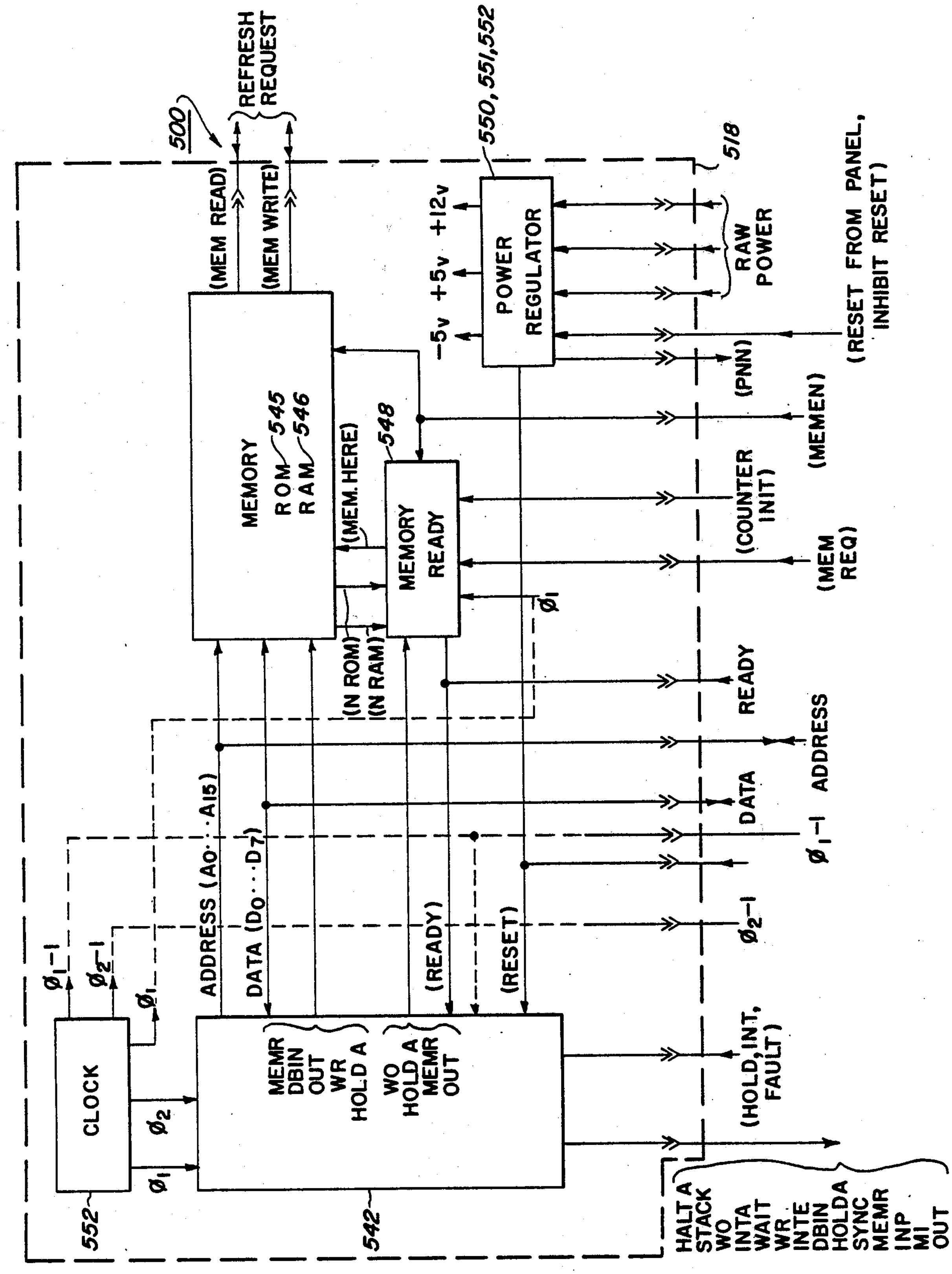
FIG. 17 is a block diagram of the controller CPU.

Referring to FIG. 15, a document handler clock 286 consisting of apertured disc 287 on the output shaft of document handler drive motor 236 and cooperating photoelectric type signal generator 288 is provided. As in the case of machine clock 202, document handler clock 286 produces an output pulse train from which components of the document handler may be synchronized. A real time clock such as clock 552 of FIG. 17, is utilized to control internal operations of the controller 18 as is known in the art.

CONTROLLER

Figure 16:
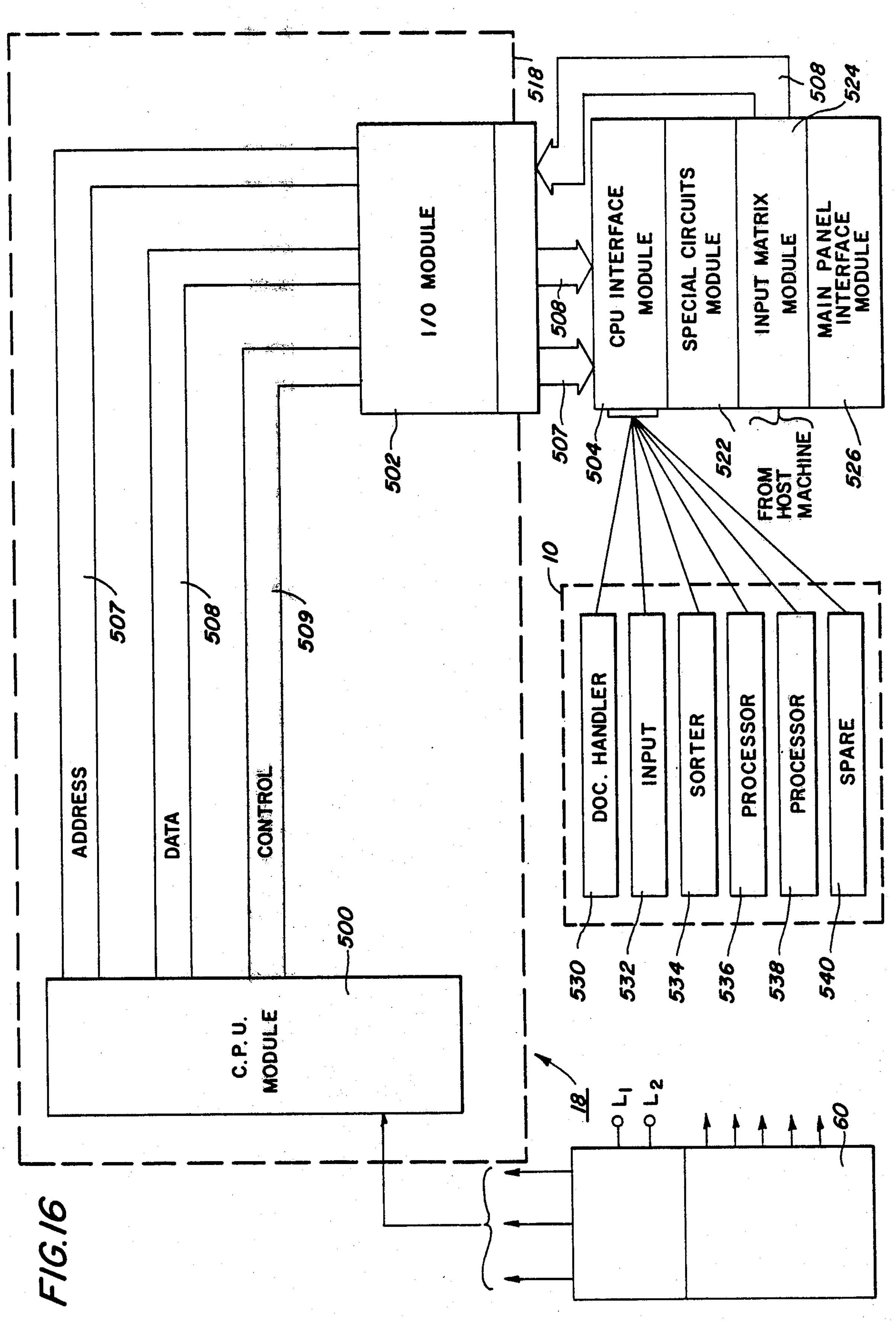
FIG. 16 is a block diagram of the controller for the apparatus shown in FIG. 1.

Referring to FIG. 16, controller 18 includes a Central Processor Unit (CPU) Module 500, Input/Output (I/O) Module 502, Interface 504. Address, Data and Control Buses 507, 508, 509 respectively operatively couple CPU Module 500 and I/O Module 502. CPU Module 500 I/O Module 502 are disposed within a shield 518 to prevent noise interference.

Interface 504 couples I/O Module 502 with special circuits module 522, input matrix module 524, and main panel interface module 526. Module 504 also couples I/O Module 502 to operating sections of the machine, namely, document handler section 530, input section 532, sorter section 534 and processor sections 536, 538. A spare section 540, which may be used for monitoring operation of the host machine, or which may be later utilized to control other devices, is provided.

Figure 18A:
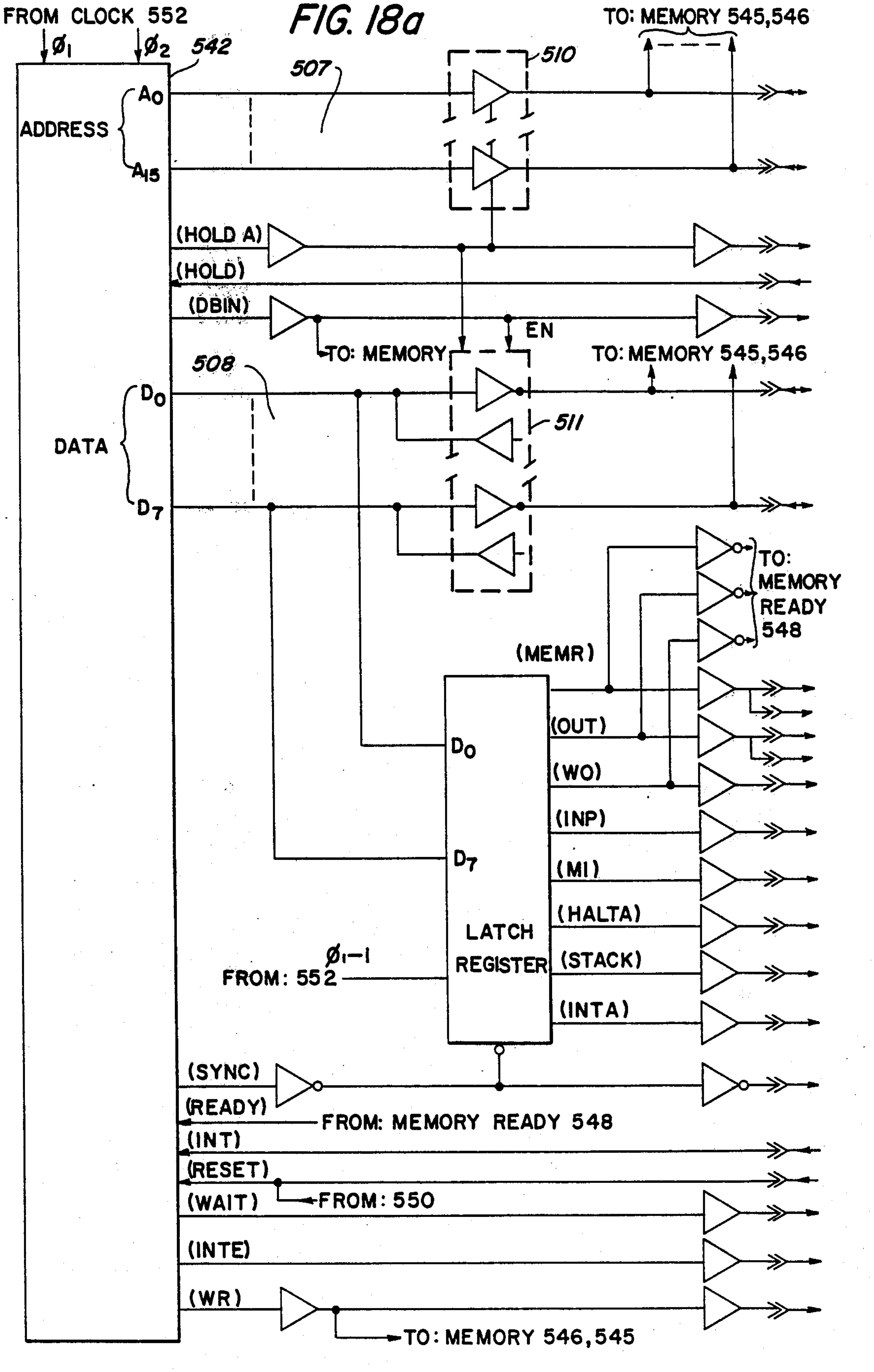
Figure 18B:
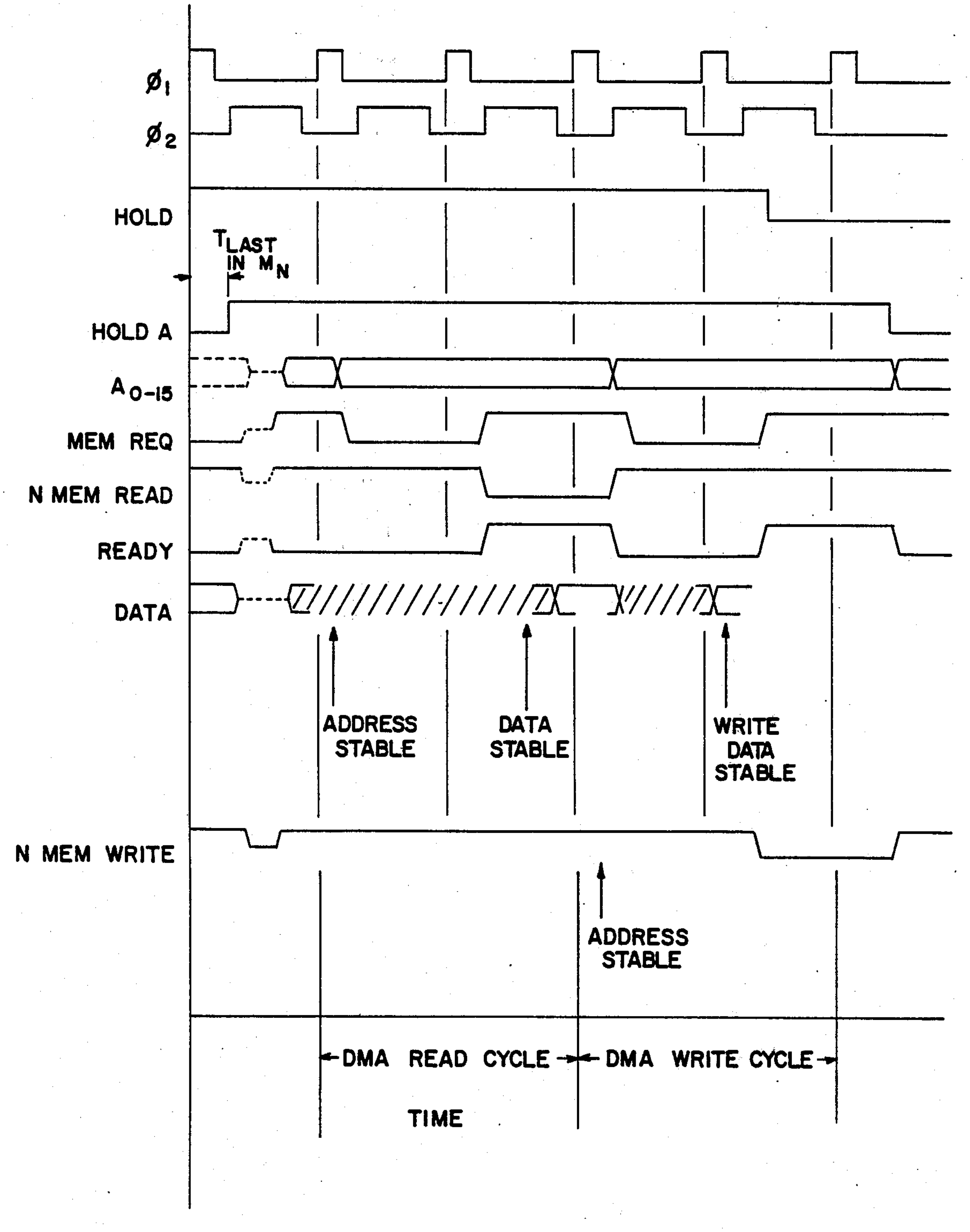

Referring to FIGS. 17, 18, CPU module 500 comprises a processor 542 such as an Intel 8080 microprocessor manufactured by Intel Corporation, Santa Clara, California, 16K Read Only Memory (herein ROM) and 2K Random Access Memory (herein RAM) sections 545, 546, Memory Ready section 548, power regulator section 550, and onboard clock 552. Bipolar tri-state buffers 510, 511 in Address and Data buses 507, 508 disable the bus on a Direct Memory access (DMA) signal (HOLDA) as will appear. While the capacity of memory sections 545, 546 are indicated throughout as being 16K and 2K respectively, other memory sizes may be readily contemplated.

Figure 19B:
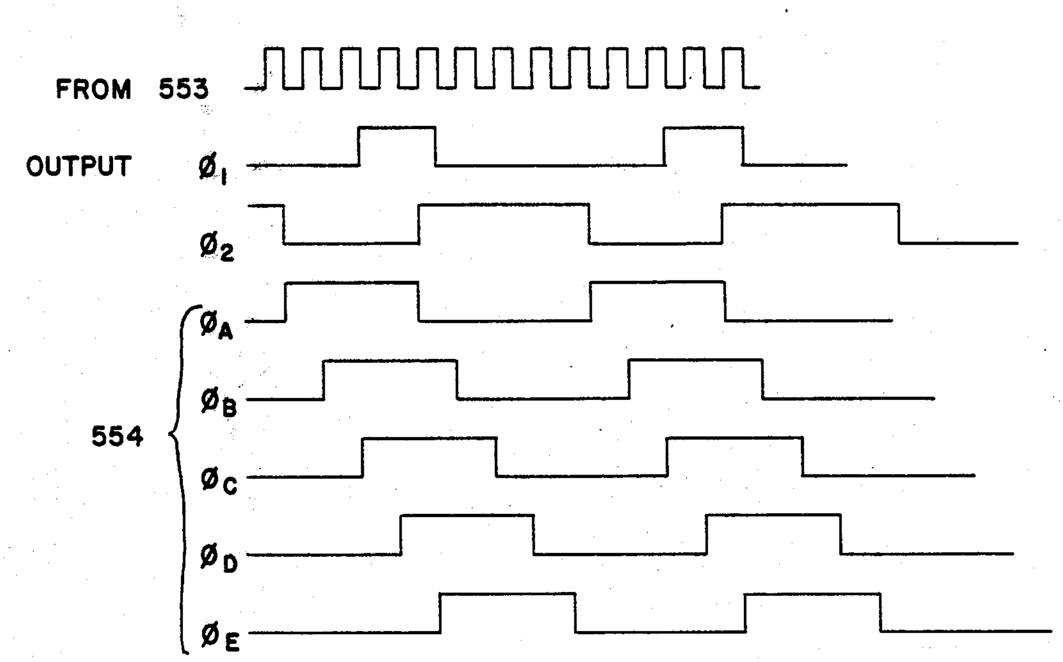

Referring particularly to FIG. 19, clock 552 comprises a suitable clock oscillator 553 feeding a multi-base (Qa–Qn) shift register 554. Register 554 includes an internal feedback path from one bit to the serial input of register 554. Output signal waveforms $\phi_1$, $\phi_2$, $\phi_{1\text{-}1}$ and $\phi_{2\text{-}1}$ are produced for use by the system.

Referring to FIG. 20, the memory bytes in ROM section 545 are implemented by address signals (Ao–A 15) from processor 542, selection being effected by 3 to 8 decode chip 560 controlling chip select 1 (CS-1) and a 1 bit selection (A 13) controlling chip select 2 (CS-2). The most significant address bits (A 14, A 15) select the first 16K of the total 64 bytes of the addressing space. The memory bytes in RAM section 546 are implemented by Address signals (Ao–A 15) through selector circuit 561. Address bit A 10 serves to select the memory bank while the remaining five most significant bits (A 11–A 15) select the last 2K bytes out of the 64K bytes of addressing space. RAM memory section 546 includes a 40 bit output buffer the output of which is tied together with the output from ROM memory section 545 and goes to tri-state buffer 562 to drive DATA bus 508. Buffer 562 is enabled when either memory section 545 or 546 is being addressed and either a (MEM READ) or DMA (HOLD A) memory request exists. An enabling signal (MEMEN) is provided from the machine control or service panel (not shown) which is used to permit disabling of buffer 562 during servicing of CPU Module 500. Write control comes from either processor 542 (MEM WRITE) or from DMA (HOLD A) control. Tri-state buffers 563 permit Refresh Control 605 of I/O Module 502 to access MEM READ and MEM WRITE control channels directly on a DMA signal (HOLD A) from processor 542 as will appear.

Referring to FIG. 21, memory ready section 548 provides a READY signal to processor 542. A binary counter 566, which is initialized by a SYNC signal ($\phi$,) to a prewired count as determined by input circuitry 567, counts up at a predetermined rate. At the maximum count, the output at gate 568 comes true stopping the counter 566. If the cycle is a memory request (MEM REQ) and the memory location is on board as determined by the signal (MEM HERE) to tri-state buffer 569, a READY signal is sent to processor 542. Tri-state buffer 570 in MEM REQ line permits Refresh Control 605 of I/O Module 502 to access the MEM REQ channel directly on a DMA signal (HOLD A) from processor 542 as will appear.

Figure 22A:
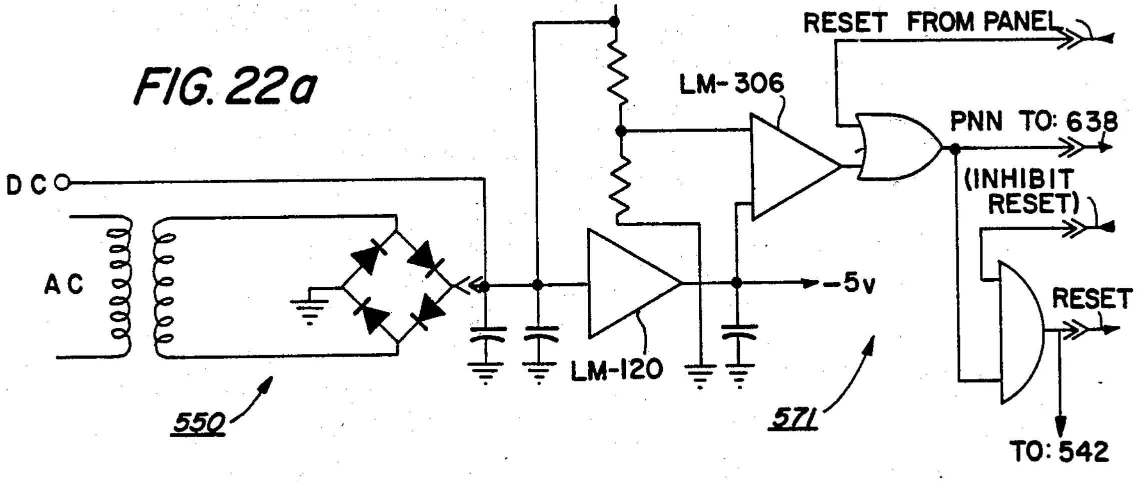
Figure 22B:
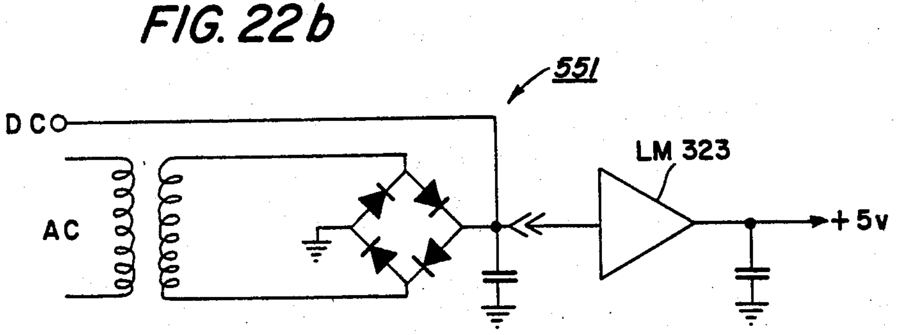
Figure 22C:
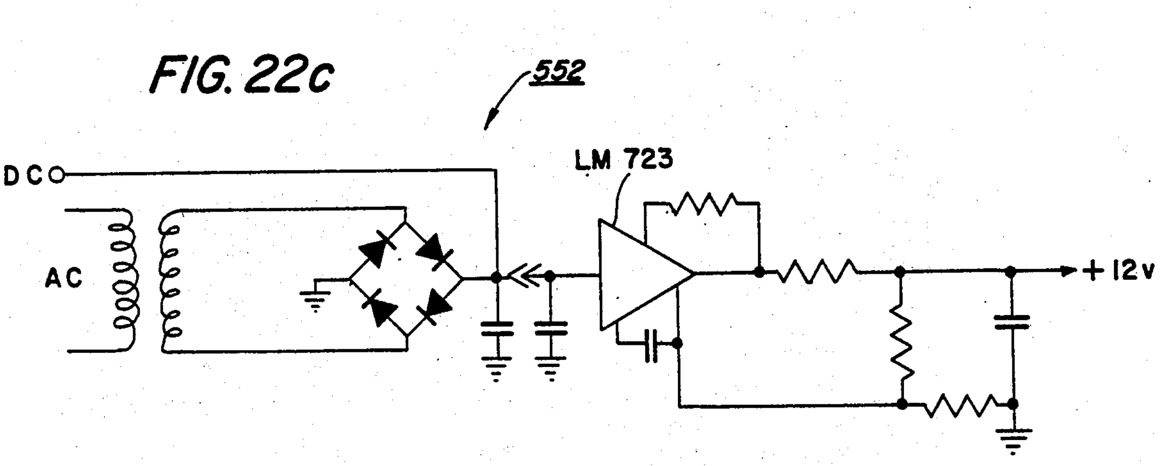

Referring to FIG. 22, power regulators 550, 551, 552 provide the various voltage levels, i.e. +5v, +12v, and −5v D.C. required by the module 500. Each of the three on board regulators 550, 551, 552 employ filtered D.C. inputs. Power Not Normal (PNN) detection circuitry 571 is provided to reset processor 542 during the power up time. Panel reset is also provided via PNN. An enabling signal (INHIBIT RESET) allows completion of a write cycle in Non Volatile (N.V.) Memory 610 of I/O Module 502.

Figure 23A:
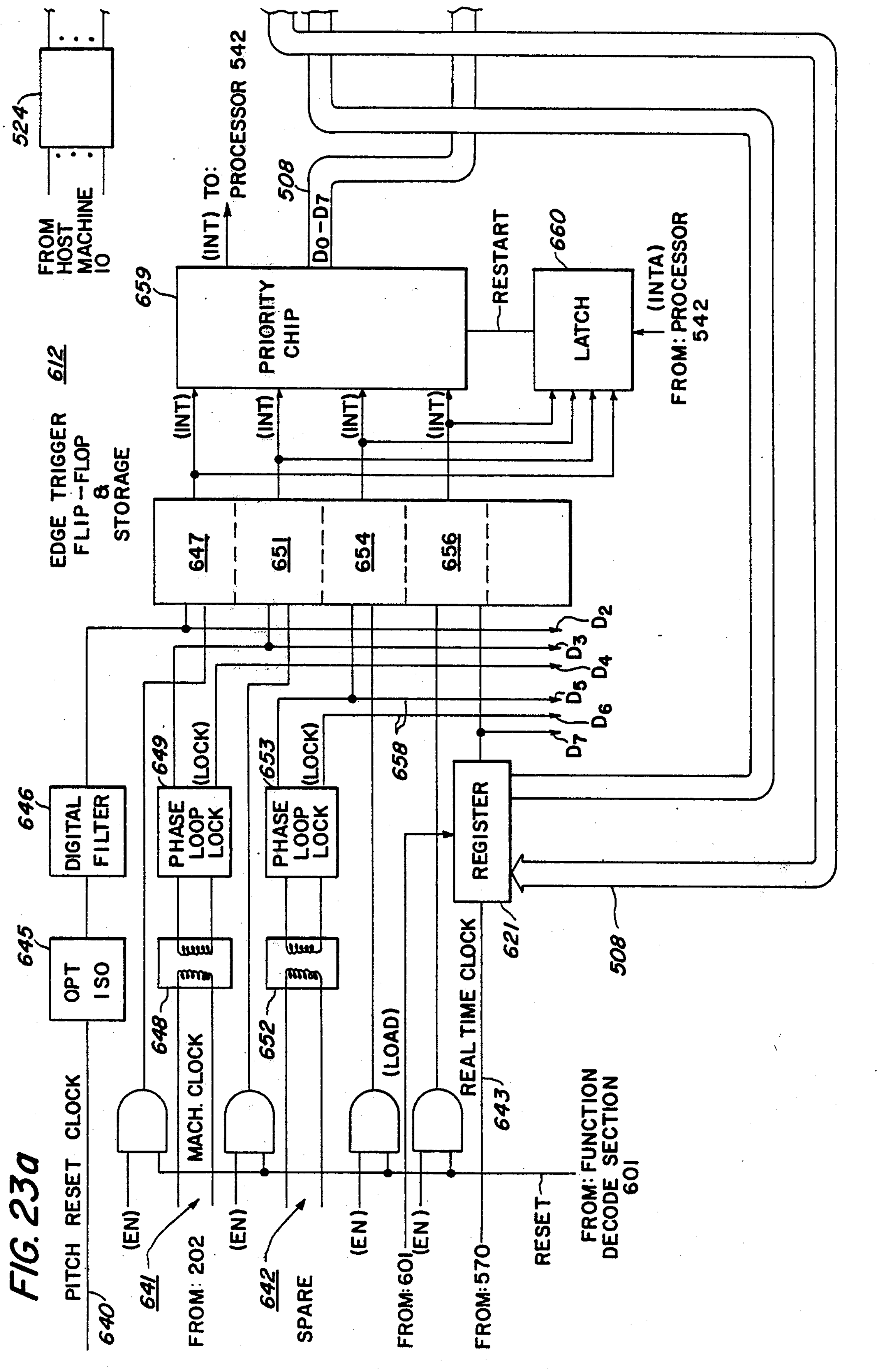

Referring to FIGS. 18, 20, 21, and the DMA timing chart (FIG. 18*a*) data transfer from RAM section 546 to host machine 10 is effected through Direct Memory Access (DMA), as will appear. To initiate DMA, a signal (HOLD) is generated by Refresh Control 605 (FIG. 23*a*). On acceptance, processor 542 generates a signal HOLD ACKNOWLEDGE (HOLD A) which works through tri-state buffers 510, 511 and through buffers 563 and 570 to release Address bus 507, Data bus 508 and MEM READ, MEM WRITE, and MEM REQ channels (FIGS. 20, 21) to Refresh Control 605 of I/O Module 502.

Figure 23B:
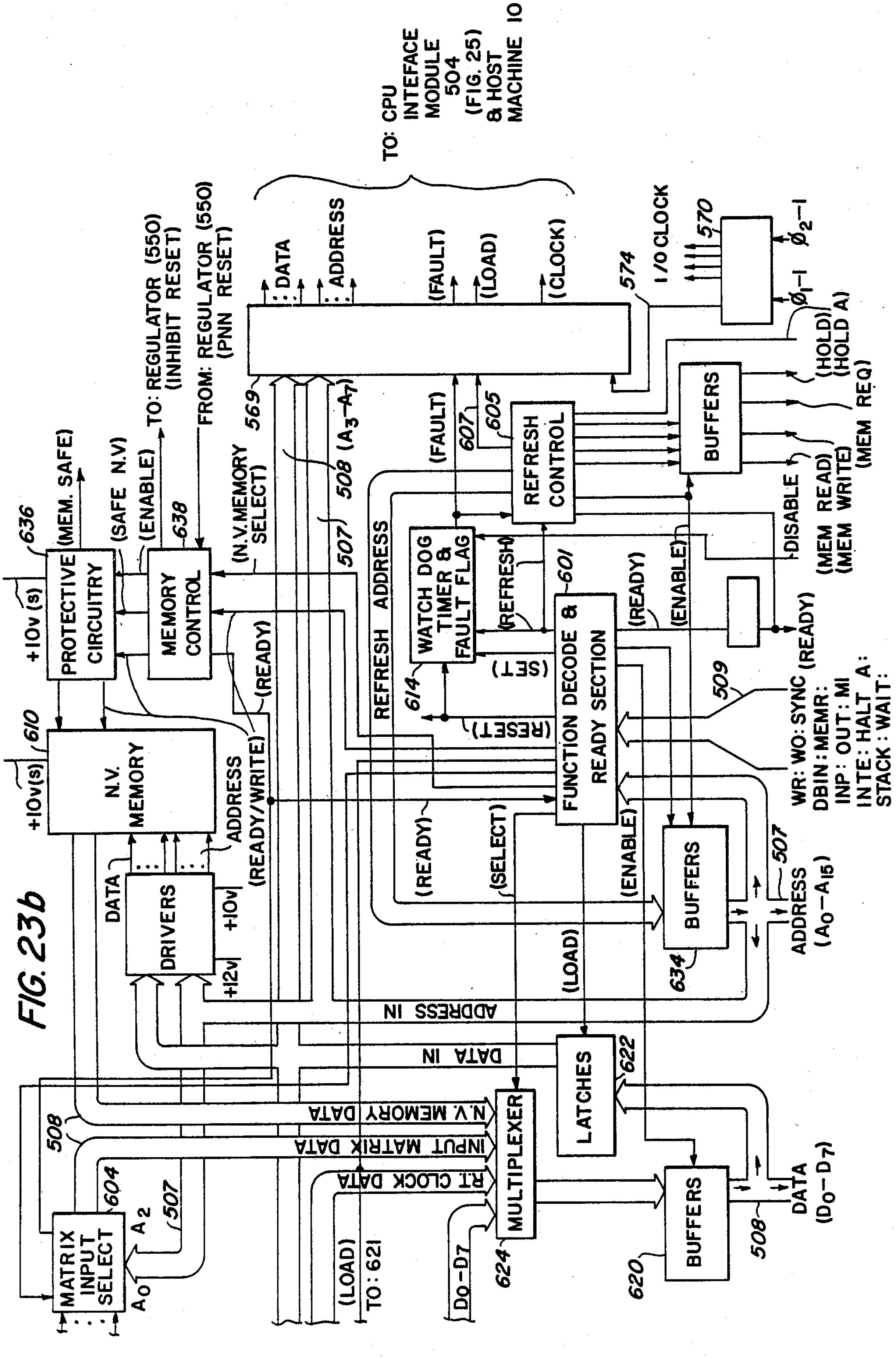

Referring to FIG. 23, I/O Module 502 interfaces with CPU module 500 through bi-directional Address, Data and Control buses 507, 508, 509. I/O Module 502 appears to CPU module 500 as a memory portion. Data transfers between CPU and I/O modules 500, 502, and commands to I/O module 502 except for output refresh are controlled by memory reference instructions executed by CPU module 500. Output refresh which is initiated by one of several uniquely decoded memory reference commands, enables Direct Memory access (DMA) by I/O module 502 to RAM section 546.

I/O module 502 includes Matrix Input select 604 (through which inputs from the host machine 10, are received), Refresh Control 605, Nonvolatile (NV) memory 610, Interrupt Control 612, Watch dog Timer and failure Flag 614 and clock 570.

A Function Decode Section 601 receives and interprets commands from CPU section 500 by decoding information on address bus 507 along with control signals from processor 542 on control bus 509. On command, decode section 601 generates control signals to perform the function indicated. These functions include (a) controlling tri-state buffers 620 to establish the direction of data flow in Data bus 508; (b) strobing data from Data bus 508 into buffer latches 622; (c) controlling multiplexer 624 to put data from Interrupt Control 512, Real Time clock register 621, Matrix Input Select 604 or N.V. memory 610 onto data bus 508; (d) actuating refresh control 605 to initiate a DMA operation; (e) actuating buffers 634 to enable address bits Ao–A 7 to be sent to the host machine 10 for input matrix read operations; (f) commanding operation of Matrix Input Select 604; (g) initiating read or write operation of N.V. memory 610 through Memory Control 638; (h) loading Real Time clock register 621 from data bus 508; and (i) resetting the Watch Dog timer or setting the Fault Failure flag 614. In addition, section 601 includes logic to control and synchronize the READY control line to CPU module 500, the READY line being used to advise module 500 when data placed on the Data bus by I/O module 502 is valid.

Watch dog timer and failure flag 614, which serves to detect certain hardwired and software malfunctions, comprises a free running counter which under normal circumstances is periodically reset by an output refresh command (REFRESH) from Function Decode Section 601. If an output refresh command is not received within a present time interval, (i.e. 25 m sec) a fault flip flop is set and a signal (FAULT) sent to the host machine. The signal (FAULT) also raises the HOLD line to disable CPU Module 500. Clearing of the fault flip flop may be by cycling power or generating a signal (RESET). A selector (not shown) may be provided to disable (DISABLE) the watch dog timer when desired. The fault flip flop may also be set by a command from the CPU Module to indicate that the operating program detected a fault.

Matrix Input select 604 has capacity to read up to 32 groups of 8 discrete inputs from host machine 10. Lines $A_3$ through $A_7$ of Address bus 507 are routed to host machine 10 via CPU Interface Module 504 to select the desired group of 8 inputs. The selected inputs from machine 10 are received via Input Matrix Module 524 (FIG. 28) and are placed by matrix 604 onto data bus 508 and sent to CPU Module 500 via multiplexer 624. Bit selection is effected by lines $A_0$ through $A_2$ of Address bus 507.

Output refresh control 605, when initiated, transfers either 16 or 32 sequential words from RAM memory output buffer 546' to host machine 10 at the predetermined clock rate in line 574. Direct Memory access (DMA) is used to facilitate transfer of the data at a relatively high rate. On a Refresh signal from Function Decode Section 601, Refresh Control 605 generates a HOLD signal to processor 542. On acknowledgement (HOLD A) processor 542 enters a hold condition. In this mode, CPU Module 500 releases address and data buses 507, 508 to the high impedance state giving I/O module 502 control thereover. I/O module 502 then sequentially accesses the 32 memory words from output buffer 546' (REFRESH ADDRESS) and transfers the contents to the host machine 10. CPU Module 500 is dormant during this period.

A control signal (LOAD) in line 607 along with the predetermined clock rate determined by the clock signal (CLOCK) in line 574 is utilized to generate eight 32 bit serial words which are transmitted serially via CPU Interface Module 504 to the host machine remote locations where serial to parallel transformation is performed. Alternatively, the data may be stored in addressable latches and distributed in parallel directly to the required destinations.

N.V. memory 610 comprises a predetermined number of bits of non-volatile memory stored in I/O module 502 under Memory Control 638. N.V. memory 610 appears to CPU module 500 as part of the CPU module memory complement and therefore may be accessed by the standard CPU memory reference instruction set. Referring particularly to FIG. 24, to sustain the contents of N.V. memory 610 should system power be interrupted, one or more rechargeable batteries 635 are provided exterior to I/O module 502. CMOS protective circuitry 636 couples batteries 635 to memory 610 to preserve memory 610 on a failure of the system power. A logic signal (INHIBIT RESET) prevents the CPU Module 500 from being reset during the N.V. memory write cycle interval so that any write operation in progress will be completed before the system is shut down.

For tasks that require frequent servicing, high speed response to external events, or synchronization with the operation of host machine 10, a multiple interrupt system is provided. These comprise machine based interrupts, herein referred to as Pitch Reset interrupt and the Machine interrupt, as well as a third clock driven interrupt, the Real Time interrupt.

Referring particularly to FIGS. 23(*a*) and 34; the highest priority interrupt signal, Pitch reset signal 640, is generated by the signal output of pitch reset clock 138. The clock signal is fed via optical isolator 645 and digital filter 646 to edge trigger flip flop 647.

The second highest priority interrupt signal, machine clock signal 641, is sent directly from machine clock 202 through isolation transformer 648 to a phase locked loop 649. Loop 649, which serves a bandpath filter and signal conditioner, sends a square wave signal to edge trigger flip flop 651. The second signal output (LOCK) serves to indicate whether loop 649 is locked onto a valid signal input or not.

The lowest priority interrupt signal, Real Time Clock signal 643, is generated by register 621. Register 621 which is loaded and stored by memory reference instructions from CPU module 500 is decremented by a clock signal in line 643 which may be derived from I/O Module clock 570. On the register count reaching zero, register 621 sends an interrupt signal to edge trigger flip flop 656. A spare interrupt 642 is also provided.

Setting of one of more of the edge trigger flip flops 647, 651, 654, 656 by the interrupt signals 640, 641, 642, 643 generates a signal (INT) via priority chip 659 to processor 542 of CPU Module 500. On acknowledgement, processor 542, issues a signal (INTA) transferring the status of the edge trigger flip flops 647, 651, 654, 656 to a four bit latch 660 to generate an interrupt instruction code (RESTART) onto the data bus 508.

Each interrupt is assigned a unique RESTART instruction code. Should an interrupt of higher priority be triggered, a new interrupt signal (INT) and RESTART instruction code are generated resulting in a nesting of interrupt software routines whenever the interrupt recognition circuitry is enabled within the CPU 500.

Priority chip 659 serves to establish a handling priority in the event of simultaneous interrupt signals in accordance with the priority schedule described.

Once triggered, the edge trigger flip flop 647, 651, 654 or 656 must be reset in order to capture the next occurrence of the interrupt associated therewith. Each interrupt subroutine serves, in addition to performing the functions programmed, to reset the flip flops (through the writing of a coded byte in a uniquely selected address) and to re-enable the interrupt (through execution of a re-enabling instruction). Until re-enabled, initiation of a second interrupt is precluded while the first interrupt is in progress.

Lines 658 permit interrupt status to be interrogated by CPU module 500 on a memory reference instruction.

I/O Module 502 includes a suitable pulse generator or clock 570 for generating the various timing signals required by module 502. Clock 570 is driven by the pulse-like output $\phi_{1-1}$, $\phi_{2-1}$ of processor clock 552 (FIG. 19*a*). As described, clock 570 provides a reference clock pulse (in line 574) for synchronizing the output refresh data and is the source of clock pulses (in line 643) for driving Real Time register 621.

CPU interface module 504 interfaces I/O module 502 with the host machine 10 and transmits operating data stored in RAM section 546 to the machine. Referring particularly to FIG. 25 and 26, data and address information are inputted to module 504 through suitable means such as optical type couplers 700 which convert the information to single ended logic levels. Data in bus 508 on a signal from Refresh Control 605 in line 607 (LOAD), is clocked into module 546 at the reference clock rate in line 574 parallel by bit, serial by byte for a preset byte length, with each data bit of each successive byte being clocked into a separate data channel D0–D7. As best seen in FIG. 25, each data channel D0–D7 has an assigned output function with data channel D0 being used for operating the front panel lamps 830 in the digital display, (see FIg. 32), data channel D1 for special circuits module 522, and remaining data channels D2–D7 allocated to the host machine operating sections 530, 532, 534, 536, 538 and 540. Portions of data channels D1–D7 have bits reserved for front panel lamps and digital display.

Since the bit capacity of the data channels D2–D7 is limited, a bit buffer 703 is preferably provided to catch any bit overflow in data channels D2–D7.

Inasmuch as the machine output sections 530, 532, 534, 536, 538 and 540 are electrically a long distance away, i.e. remote, from CPU interface module 504, and the environment is electrically "noisy", the data stream in channels D2–D7 is transmitted to remote sections 530, 532, 534, 536, 538 and 540 via a shielded twisted pair 704. By this arrangement, induced noise appears as a differential input to both lines and is rejected. The associated clock signal for the data is also transmitted over line 704 with the line shielded carrying the return signal currents for both data and clock signals.

Data in channel $D_1$ destined for special circuits module 522 is inputted to shift register type storage circuitry 705 for transmittal to module 522. Data is also inputted to main panel interface module 526. Address information in bus 507 is converted to single ended output by couplers 700 and transmitted to Input Matrix Module 524 to address host machine inputs.

CPU interface module 504 includes fault detector circuitry 706 for monitoring both faults occurring in host machine 10 and faults or failures along the buses, the latter normally comprising a low voltage level or failure in one of the system power lines. Machine faults may comprise a fault in CPU module 500, a belt mistrack signal sensor 27 (see FIG. 2), opening one of the machine doors or covers as responded to by conventional cover interlock sensors (not shown), a fuser over temperature as detected by sensor 175, etc. In the event of a bus fault, a reset signal (RESET) is generated automatically in line 709 to CPU module 500 (see FIGS. 17 and 18) until the fault is removed. In the event of a machine fault, a signal is generated by the CPU in the line 710 to actuate a suitable relay (not shown) controlling power to all or a portion of host machine 10. A load disabling signal (LOAD DISBL) is inputted to optical couplers 700 via line 708 in the event of a fault in CPU module 500 to terminate input of data to host machine 10. Other fault conditions are monitored by the software background program. In the event of a fault, a signal is generated in line 711 to the digital display on control console 800 (via main panel interface module 526) signifying a fault.

Referring particularly to FIGS. 25 and 27, special circuits module 522 comprises a collection of relatively independent circuits for either monitoring operation of and/or driving various elements of host machine 10. Module 522 incorporates suitable circuitry 712 for amplifying the output of sensors 225, 226, 227, 228 and 280, 281, 282 of sorter 14 and document handler 16 respectively; circuitry 713 for operating fuser release clutch 159; and circuitry 714 for operating main and auxiliary paper tray feed roll clutches 130, 131 and document handler feed clutch 244.

Additionally, fuser detection circuitry 715 monitors temperature conditions of fuser 150 as responded to by sensor 174. On overheating of fuser 150, a signal (FUS-OT) is generated to turn heater 163 off, actuate clutch 159 to separate fusing and pressure rolls 160, 161; trigger trap solenoid 158 to prevent entrance of the next copy sheet into fuser 150, and initiate a shutdown of host machine 10. Circuitry 715 also cycles fuser heater 163 to maintain fuser 150 at proper operating temperatures and signals (FUS-RDUT) host machine 10 when fuser 150 is ready for operation.

Circuitry 716 provides closed loop control over sensor 98 which responds to the presence of a copy sheet 3 on belt 20. On a signal from sensor 98, solenoid 97 is triggered to bring deflector 96 into intercepting position adjacent belt 20. At the same time, a backup timer (not shown) is actuated. If the sheet is lifted from the belt 20 by deflector 96 within the time allotted, a signal from sensor 99 disables the timer and a misstrip type jam condition of host machine 10 is declared and the machine is stopped. If the signal from sensor 99 is not received within the allotted time, a sheet on selenium (SOS) type jam is declared and an immediate machine stop is effected.

Circuitry 718 controls the position (and hence the image reduction effected) by the various optical elements that comprise main lens 41 in response to the reduction mode selected by the operator and the signal inputs from lens position responsive sensors 116, 117, 118. The signal output of circuitry 718 serves to operate lens drive motor 43 as required to place the optical elements of lens 41 in proper position to effect the image reduction programmed by the operator.

Referring to FIG. 28, input matrix module 524 provides analog gates 719 for receiving data from the various host machine sensors and inputs (i.e. sheet sensors 135, 136; pressure sensor 157; etc), module 524 serving to convert the signal input to a byte oriented output for transmital to I/O module 502 under control of Input Matrix Select 604. The byte output to module 524 is selected by address information inputted on bus 507 and decoded on module 524. Conversion matrix 720, which may comprise a diode array, converts the input logic signals of "0" to logic "1" true. Data from input matrix module 524 is transmitted via optical isolators 721 and Input Matrix Select 604 of I/O module 502 to CPU Module 500.

Referring particularly to FIG. 29, main panel interface module 526 serves as interface between CPU interface module 504 and operator control console 800 for display purposes and as interface between input matrix module 524 and the console switches. As described, data channels D0–D7 have data bits in each channel associated with the control console digital display or lamps. This data is clocked into buffer circuitry 723 and from there, for digital display, data in channels D1–D7 is inputted to multiplexer 724. Multiplexer 724 selectively multiplexes the data to HEX to 7 segment converter 725. Software controlled output drivers 726 are provided for each digit which enable the proper display digit in response to the data output of converter 725. This also provides blanking control for leading zero suppression or inter digit suppression.

Buffer circuitry 723 also enables through anode logic 728 the common digit anode drive. The signal (LOAD) to latch and lamp driver control circuit 729 regulates the length of the display cycle.

For console lamps 830, data in channel DO is clocked to shift register 727 whose output is connected by drivers to the console lamps. Access by input matrix module 524 to the console switches and keyboard is through main panel interface module 526.

The machine output sections 530, 532, 534, 536, 538, 540 are interfaced with I/O module 502 by CPU interface module 504. At each interrupt/refresh cycle, data is outputted to sections 530, 532, 534, 536, 538, 540 at the clock signal rate in line 574 over data channels D2, D3, D4, D5, D6, D7 respectively.

Referring to FIG. 30, wherein a typical output section i.e. document handler section 530 is shown, data inputted to section 530 is stored in shift register/latch circuit combination 740, 741 pending output to the individual drivers 742 associated with each machine component. Preferably d.c. isolation between the output sections is maintained by the use of transformer coupled differential outputs and inputs for both data and clock signals and a shielded twisted conductor pair. Due to transformer coupling, the data must be restored to a d.c. waveform. For this purpose, control recovery circuitry 744, which may comprise an inverting/non-inverting digital comparator pair and output latch is provided.

The LOAD signal serves to lockout input of data to latches 741 while new data is being clocked into shift register 740. Removal of the LOAD signal enables commutation of the fresh data to latches 741. The LOAD signal also serves to start timer 745 which imposes a maximum time limit within which a refresh period (initiated by Refresh Control 605) must occur. If refresh does not occur within the prescribed time limit, timer 745 generates a signal (RESET) which sets shift register 740 to zero.

With the exception of sorter section 534 discussed below, output sections 532, 536, 538 and 540 are substantially identical to document handler section 530.

Referring to FIG. 31 wherein like numbers refer to like parts, to provide capacity for driving the sorter deflector solenoids 221, a decode matrix arrangement consisting of a Prom encoder 750 controlling a pair of decoders 751, 752 is provided. The output of decoders 751, 752 drive the sorter solenoids 221 of upper and lower bin arrays 210, 211 respectively. Data is inputted to encoder 750 by means of shift register 754.

Referring now to FIG. 32, control console 800 serves to enable the operator to program host machine 10 to perform the copy run or runs desired. At the same time, various indicators on console 800 reflect the operational condition of machine 10. Console 800 includes a bezel housing 802 suitably supported on host machine 10 at a convenient point with decorative front or face panel 803 on which the various machine programming buttons and indicators appear. Programming buttons include power on/off buttons 804, start print (PRINT) buttons 805, stop print (STOP) button 806 and keyboard copy quantity selector 808. A series of feature select buttons consisting of auxiliary paper tray button 810, two sided copy button 811, copy lighter button 814, and copy darker button 815, are provided.

Additionally, image size selector buttons 818, 819, 820; multiple or single document select buttons 822, 823 for operation of document handler 16; and sorter sets or stacks buttons 825, 826 are provided. An on/off service selector 828 is also provided for activation during machine servicing.

Indicators comprise program display lamps 830 and displays such as READY, WAIT, SIDE 1, SIDE 2, ADD PAPER, CHECK STATUS PANEL, PRESS FAULT CODE, QUANTITY COMPLETED, CHECK DOORS, UNLOAD AUX TRAY, CHECK DOCUMENT PATH, CHECK PAPER PATH, JOB INCOMPLETE and UNLOAD SORTER. Other dispaly information may be envisioned.

MACHINE OPERATION

As will appear, host machine 10 is conveniently divided into a number of operational states. The machine control program is divided into background routines and Foreground routines with operational control normally residing in the Background routine or routines appropriate to the particular machine state then in effect. The output buffer 546' of RAM memory section 546 is used to transfer/refresh control data to the various remote locations in host machine 10, control data from both Background and Foreground routines being inputted to buffer 546' for subsequent transmittal to host machine 10. Transmittal/refresh of control data presently in output buffer 546' is effected through Direct Memory access (DMA) under the aegis of a Machine Clock interrupt routine.

Foreground routine control data which includes a Run Event Table built in response to the particular copy run or runs programmed, is transferred to output buffer 546' by means of a multiple prioritized interrupt system wherein the Background routine in process is temporarily interrupted while fresh Foreground routine control data is inputted to buffer 546' following which the interrupted Background routine is resumed.

The operating program for host machine 10 is divided into a collection of foreground tasks, some of which are driven by the several interrupt routines and background or non-interrupt routines. Foreground tasks are tasks that generally require frequent servicing, high speed response, or synchronization with the host machine 10. Background routines are related to the state of host machine 10, different background routines being performed with different machine states. A single background software control program (STCK) composed of specific sub-programs associated with the principal operating states of host machine 10 is provided. A byte called STATE contains a number indicative of the current operating state of host machine 10. The machine STATES are as follows:

| STATE NO. | MACHINE STATE | CONTROL SUBR. |
|---|---|---|
| 0 | Software Initialize | INIT |
| 1 | System Not Ready | NRDY |
| 2 | System Ready | RDY |
| 3 | Print | PRINT |
| 4 | System Running, Not Print | RUNNPRT |
| 5 | Service | TECHREP |

Referring to FIG. 33, each STATE is normally divided into PROLOGUE, LOOP and EPILOGUE sections. As will be evident from the exemplary program STCK reproduced in TABLE I, entry into a given STATE (PROLOGUE) normally causes a group of operations to be performed, these consisting of operations that are performed once only at the entry into the STATE. For complex operations, a CALL is made to an applications subroutine therefor. Relatively simpler operations (i.e. turning devices on or off, clearing memory, presetting memory, etc.) are done directly.

Once the STATE PROLOGUE is completed, the main body (LOOP) is entered. The program (STCK) remains in this LOOP until a change of STATE request is received and honored. On a change of STATE request, the STATE EPILOGUE is entered wherein a group of operations are performed, following which the STATE moves into the PROLOGUE of the next STATE to be entered.

Referring to FIG. 34 and the exemplary program (STCK) in TABLE I. On actuation of the machine POWER-ON button 804, the software Initialize STATE (INIT) is entered. In this STATE, the controller is initialized and a software controlled self test subroutine is entered. If the self test of the controller is successfully passed, the System Not Ready STATE (NRDY) is entered. If not, a fault condition is signaled.

In the System Not Ready STATE (NRDY), background subroutines are entered. These include setting of Ready flags, control registers, timers, and the like; turning on power supplies, the fuser, etc., initializing the Fault Handler, checking for paper jams (left over from a previous run), door and cover interlocks, fuser temperatures, etc. During this period, the WAIT lamp on console 800 is lit and operation of host machine 10 precluded.

When all ready conditions have been checked and found acceptable, the controller moves to the system ready state (RDY). The READY lamp on console 800 is lit and final ready checks made. Host Machine 10 is now ready for operation upon completion of input of a copy run program, loading of one or more originals 2 into document handler 16 (if selected by the operator), and actuation of START PRINT button 805. As will appear hereinafter, the next state is PRINT wherein the particular copy run programmed is carried out.

While the machine is completing a copy run, the controller normally enters the Run Not Print state (RUNNPRT) where the controller calculates the number of copies delivered, resets various flags, stores certain machine event information in the memory, as well as generally conditioning the machine for another copy run, if desired. The controller then returns to the System Not Ready state (NRDY) to recheck for ready conditions prepatory for another copy run, with the same state sequence being repeated until the machine is turned off by actuation of POWER OFF button 804 or a malfunction inspired shutdown is triggered. The last state (TECH REP) is a machine servicing state wherein certain service routines are made available to the machine/repair personnel, i.e. Tech Reps.

Referring particularly to FIG. 32 and Tables II, III, IV, V, VI and VII, the machine operator uses control console 800 to program the machine for the copy run desired. Programming may be done during either the System Not Ready (NRDY) or System Ready (RDY) states, although the machine will not operate during the System Not ready state should START PRINT button 805 be pushed. The copy run includes selecting (using keyboard 808) the number of copies to be made, and such other ancillary program features as may be desired, i.e. use of auxiliary paper tray 102, (push button 810), image size selection (push buttons 818, 819, 820), document handler/sorter selection (push buttons 822, 823, 825, 826), copy density (push buttons 814, 815), duplex or two sided copy button 811, etc. On completion of the copy run program, START PRINT button 805 is actuated to start the copy run programmed (presuming the READY lamp is on and an original or originals 2 have been placed in tray 233 of document handler 16 if the document handler has been selected).

With programming of the copy run instructions, controller 18 enters a Digit Input routine in which the program information is transferred to RAM section 546. The copy run program data passes via Main Panel Interface Module 526 to Input Matrix Module 524 and from there is addressed through Matrix Input Select 604, Multiplexer 624, and Buffers 620 of I/O Module 502 to RAM section 546 of CPU Module 500.

On entering PRINT STATE, a Run Event Table (FIG. 35) comprised of Foreground tasks is built for operating in cooperation with the background tasks the various components of host machine 10 in an integrated manner to produce the copies programmed. The run Event Table is formed by controller 18 through merger of a Fixed Pitch Event Table (TABLE II) (stored in ROM 545 and Non Volatile Memory 610) and a Variable Pitch Event Table (TABLE III) in a fashion appropriate to the parameters of the job selected.

The Fixed Pitch Event Table (TABLE II) is comprised of machine events whose operational timing is fixed during each pitch cycle such as the timing of bias to transfer roll 75, (TRN 2 CURR), actuating toner concentration sensor 65 (ADC ACT), loading roll 161 of fuser 150 (FUS*LOAD), and so forth, irrespective of the particular copy run programmed. The Variable Pitch Table (TABLE III) is comprised of machine events whose operational timing varies with the individual copy run programmed, i.e. timing of pitch fadeout lamp 44 (FO*ONBSE) and timing of flash illumination lamps 37 (FLSH BSE). The variable Pitch Table is built by the Pitch Table Builder (TABLE IV) from the copy run information programmed in by controller 18 (using the machine control program stored in ROM section 545 and Non-Volatile Memory 610), coupled with event address information from ROM section 545, sorted by absolute clock count (via the routine shown in TABLE V), and stored in RAM section 546 (via the routine shown in TABLE VI). The Fixed Pitch Event Table and Variable Pitch Table are merged with the relative clock count differences between Pitch events calculated to form a Run Event Table (TABLE VII).

Referring particularly to FIG. 35, the Run Event Table consists of successive groups of individual events 851. Each event 851 is comprised of four data blocks, data block 852 containing the number of clock pulses (from machine clock 202) to the next scheduled pitch event (REL DIFF), data block 853 containing the shift register position associated with the event (REL SR), and data blocks 854, 855 (EVENT LO) (EVENT HI) containing the address of the event subroutine.

In machine states other than PRINT, data blocks 852, 853 (REL DIFF) (REL SR) are set to zero. Data blocks 854, 855 hold the address information for the Non-Print state event.

Control Data in the Run Event Table represents a portion of the foreground tasks and is transferred to the output buffer 546' of RAM memory section 546 by the Pitch Reset and Machine Clock interrupt routines. Other control data, representing foreground tasks not in the Run Event Table is transferred to RAM output buffer 546' by the Real Time Clock interrupt routine. Transfer of the remainder of the control data to output buffer 546' is by means of background (non-interrupt) routines.

Transfer of control data from output buffer 546' of RAM memory section 546 to the various locations in host machine 10 is through output Refresh via Direct Memory access (DMA) in response to machine clock interrupt signals as will appear. The interrupt routines are initiated by the respective interrupt signals.

Referring particularly to FIG. 23 and 35–37 and TABLES VII, VIII the interrupt having the highest priority, the Pitch Reset interrupt (signal 640), is operable only during the PRINT state, and occurs once each revolution of sheet register fingers 141 as responded to by sensor 146 of pitch reset clock 138. At each pitch reset interrupt signal, after a determination of priority by Priority Chip 659 in the event of multiple interrupt signals, an interrupt signal (INT) is generated. The acknowledgement signal (INTA) from processor 542 initiates the pitch reset interrupt routine.

On entering the pitch reset routine, the interrupt is re-enabled and the contents of the program working registers stored. A check is made to determine if building of the Run Event Table is finished. Also checks are made to insure that a new shift register schedules have been built and at least 910 clock counts since the last pitch reset have elapsed. If not, an immediate machine shutdown is initiated.

Presuming that the above checks are satisfactory, the shift register pointer (SR PTR), which is the byte variable containing the address of a pre-selected shift register position (SR O), is decremented by one and adjusted for overflow and the shift register contents are updated with a byte variable (SR+VALUV) containing the new shift register value to be shifted in following the pitch reset interrupt. The event pointer (EV*PTR), a two byte variable containing the full address of the next scheduled event, is reset to Event #1. The count in the C register equals the time to the first event.

Machine Cycle Down, Normal Down, and Side One Delay checks are made, and if negative, the count on a cycle up counter (CYC UP CT) is checked. If the count is less than a predetermined control count (i.e. 5), the counter (CYC UP CT) is incremented by one. When the count on the cycle up counter equals the control count, an Image Made Flag is set.

If a Normal Down, Cycle Down, or Side One Delay has been initiated, the cycle up counter (CYC UP CT) is reset to a preset starting count (i.e. 2). The pitch reset interrupt routine is exited with restoration of the working registers and resetting of pitch reset flip flop 647.

The Machine Clock Interrupt routine, which is second in priority, is operative in all operational states of host machine 10. Although nominally driven by machine clock 202, which is operative only during Print state when processor main drive motor 34 is energized, machine clock pulses are also provided by phase locked loop 649 when motor 34 is stopped.

Referring particularly to FIG. 38 and TABLE IX, entry to the Machine Clock interrupt routine there shown is by a signal (INTA) from processor 542 following a machine clock interrupt signal 642 as described earlier. On entry, the event control register (C REG) is obtained and the working register contents stored. The C REG is decremented by one, the register having been previously set to a count corresponding to the next event in the Event Run Table.

The control register (C REG) is checked for zero. If the count is not zero and is an odd number, an output refresh cycle is initiated to effect transfer/refresh of data in RAM output buffer 546' to host machine 10. If the number is even, or following an output refresh, the interrupt system is re-enabled, the machine clock interrupt flip flop 651 is reset and the working registers are restored. Return is then made to the interrupted routine.

If the control register (C REG) count is zero, the Event Pointer (EV*PTR), which identifies the clock count (in data block 852) for the next scheduled event (REL DIFF), is loaded and the control register (C REG) reset to a new count equal to the time to the next event. The Event Pointer (EV*PTR) is incremented to the relative shift register address for the event (REL SR, data block 853), and the shift register address information is set in appropriate shift registers (B, D, E, A registers).

The event Pointer (EV*PTR) is incremented successively to the event subroutine address information (EVENT LO) (EVENT HI) in the Event Run Table, and the address information therefrom loaded into a register pair (D & E registers). The Event Pointer (EV PTR) is incremented to the first data block (REL DIFF) of the next succeeding event in the Run Event Table, saved, and the register pair (H & L registers) that comprise the Event Pointer are loaded with the event subroutine address from the register pair (D & E registers) holding the information. The register pair (D & E registers) are set to the return address for the Event Subroutine. Using the address information, the Event Subroutine is called and the subroutine data transferred to RAM output buffer 546' for transfer to the host machine on the next Output Refresh.

Following this, the Machine Clock interrupt routine is exited as described earlier.

The Output Refresh cycle alluded to earlier functions, when entered, to transfer/refresh data from the output buffer of 546' RAM section 546 to host machine 10. Direct Memory Access (DMA) is used to insure a high data transfer rate.

On a refresh, Refresh Control 605 (See FIG. 23) raises the HOLD line to processor 542, which on completion of the operation then in progress, acknowledges by a HOLD A signal. With processor 542 in a hold mode and Address and Data buses 507, 508 released to I/O Module 502 (through operation of tri-state buffers 510, 511, 563, 570), the I/O module then sequentially accesses the output buffer 546' of RAM section 546 and transfers the contents thereof to host machine 10. Data previously transferred is refreshed.

The Real Time Interrupt, which carries the lowest priority, is active in all machine states. Primarily, the interrupt acts as an interval timer by decrementing a series of timers which in turn serve to control initiation of specialized subroutines used for control and error checking purposes.

Referring particularly to FIG. 39 and TABLE X, the Real Time interrupt routine is entered in the same manner as the interrupt routines previously described, entry being in response to a specific RESTART instruction code assigned to the Real Time interrupt. On entry, the interrupt is re-enabled and the register contents stored. The timer pointer (PNTR) for the first class of timers (i.e. 10 msec TIMERS) is loaded, and a loop counter identifying the number of timers of this class (i.e. 10 msec TIMERS) preset. A control register (E REG) is loaded and a timer decrementing loop is entered for the first timer. The loop decrements the particular timer, increments the timer pointer (PNTR) to the location of the next timer in this class, checks the timer count, and decrements the loop counter. The decrementing loop routine is repeated for each timer in the class (i.e. 10 msec TIMERS) following which a control counter (CNTR) for the second group of timers (i.e. 100 msec TIMERS) is decremented by one and the count checked.

The control counter (CNTR) is initially set to a count equal to the number of times the first timer interval is divisible into the second timer interval. For example, if the first class of timers are 10 msec timers and the second timer class are 100 msec timers, the control counter (CNTR) is set at 10 initially and decremented on each Real Time interrupt by one down to zero.

If the count on the control counter (CNTR) is not zero, the registers are restored, Real Time interrupt flip flop 856 reset, and the routine exited. If the count on the control counter is zero, the counter is reloaded to the original maximum count (i.e. 10) and a loop is entered decrementing individually the second group of timers (i.e. 100 msec TIMERS). On completion, the routine is exited as described previously.

In the following TABLES:

"@"—is used to indicate flags, counters and subroutine names.

"#"—is used to indicate input signals.

"$"—is used to indicate output signals.

":"—is used to indicate macro instructions, system subroutines, system flags, and data, etc.

For further explanation of the mnemonics and particular instructions utilized by the following routines, the reader is directed to Intel Corporation's Programming Manual for the 8080 Microcomputer System.

TABLE I

```
                                 *NAR
                                 *
                                 *      I N I T I A L I Z E   S T A T E
                                 *
                                 *      INIT: SUBROUTINE
                                 *
                                 *      INITIALIZE STATE. EXECUTED AFTER EACH START OR RESTART.  SETS
                                 *      ALL POINTERS, FLAGS, AND DATA TO INITIAL VALUES REQUIRED TO
                                 *      START EXECUTION OF ANY CONTROL ALGORITHIMS.  ALWAYS EXITS TO
                                 *      'NOT READY' STATE.

                                 *      EPILOG

05 00000   3E0A     A   INIT:   MVI     A,10
05 00002   3252FD   N           STA     DIVD:10
05 00005   32B5FC   N           STA     SLOWTOGL           INITIALIZE TO 10
05 00008   211907   N           LXI     H,EVOSTBY:         INITIALIZE TO 10
05 0000B   2264FD   N           SHLD    EV@PTR:            H&L= ADDR OF STBY EVENT TABLE
05 0000E   21FFFF   A           LXI     H,X'FFFF'          SAVE FOR MACH CLK ROUTINE
05 00011   2272FB   N           SHLD    INS@PTRR           INIT INSTRUMENTATION REMOTE
05 00014   21FFFF   N           LXI     H,ADH@RAMT-1         ADDR PNTR TO END OF RAM
05 00017   2278FB   N           SHLD    TAB@STRT           SET PNTR TO RAM CNTRL TABLE
05 0001A   3E7F     A           MVI     A,X'7F'            SAVE PNTR
05 0001C   328DFC   N           STA     JAM@BYPS           INIT TO UN-BYPASS
                                *                                 ALL JAM SWS
                                *       TIMER INITIALIZATION
                                *       MUST BE DONE BEFORE ANY TIMERS CAN BE USED
                                *
05 0001F   211FF9   A           LXI     H,AVAIL!**8+X'1F'  SET H&L TO END OF AVAIL! TABLE
05 00022   36FF     A           MVI     H,X'FF'            STORE X'FF' IN LAST TABLE ADDR
05 00024   3E1F     A           MVI     A,31               SET A-REG TO VALUE TO BE STORED
                                REPEAT
05 00026   2D       A               DCR     L              STEP TO NEXT TABLE LOCATION
05 00027   77       A               MOV     M,A            STORE INITIALIZATION VALUE
05 00028   3D       A               DCR     A              STEP TO NEXT VALUE
05 00029   C22600   N           UNTIL:  CC,Z,S             IS INITIALIZATION COMPLETE
05 0002C   2120FE   A           LXI     H,ADR(DATA,TIME:OUT)  TO INITIALIZE TIME:OUT TABLE
```

TABLE I—Continued

```
05 0002F   225FFD  N          SHLD      INPTR:                          SET IN/OUT POINTERS TO
05 00032   2261FD  N          SHLD      OUTPTR:                         BEGINNING OF TIME:OUT TABLE
                         *
                         *    INITIALIZE SPOOL
                         *    POINTERS
                         *
05 00035   2140FE  A          LXI       H,ADR(DATA,SPL:TBL)             SET PNTRS
05 00038   226AFD  N          SHLD      SPL:IN                                     TO START
05 00038   226CFD  N          SHLD      SPL:OUT                                         OF TABLE
                         *
                         *    CHECK IF PAPER WAS PRESENT WHEN POWER WENT DOWN
                         *
05 0003E   3AC9E2  A          RNVNIB    NV@JAM@N                        A = JAM INFO FROM POWER DOWN
05 00041   OF      A          RRC                                       SET CARRY TO FOR JAM INFO
05 00042   D25A00  N          IF:       CC,C,S                          WAS THERE PAPER IN FOR AREA
05 00045   47      A             MOV       B,A                          YES, SAVE JAM INFO
05 00046   213CFD  A             SFBIT,P   FDR@AJAM,FDR@MJAM            SET FEEDER JAMS
05 00049   3E0C    A
05 0004B   B6      A
05 0004C   77      A
05 0004D   2121F9  A             SFBIT,P   ON@X02,ON@X03                SIGNAL TRANSPT CL'RANCE REQ'D
05 00050   3E03    A
05 00052   B6      A
05 00053   77      A
05 00054   3E80    A             SFLG      CLP@REQD                     TELL FLT HNDLR CLEARANCE REQD
05 00056   3267F4  A
05 00059   78      A             MOV       A,B                          RESTORE THE A-REG
                              ENDIF
05 0005A   OF      A          RRC                                       SET CARRY TO IMED@ON:
05 0005B   D27100  N          IF:       CC,C,S                          WAS THERE AN IMED@ON:
                         *
                                 MVI       L,MSK(FBIT,L@PR@FLT,JAM2@FLT,JAM3@FLT,JAM4@FLT,;
05 0005E   2EFF    A                       JAM5@FLT,JAM6@FLT,RET1@FLT,RET2@FLT)
                         *                                              SETS ALL JAM FBITS IN REG-L
05 00060   2603    A             MVI       H,MSK(FBIT,SOS@JAM,MISSTRIP)
                         *                                              SETS ADDITIONAL FBITS IN H
05 00062   2238FD  A             SHLD      ADR(FBYT,PAP:1)              MOVE FBITS INTO FBYTES
05 00065   3E80    A             SFLG      CLR@REQD                     TELL FLT HNDLR CLEARANCE REQD
05 00067   3267F4  A
05 0006A   2120F9  A             SFBIT,P   TS@FUS,TS@X02                TURN ON UNDEDICATED MAP LAMPS
05 0006D   3E21    A
05 0006F   B6      A
05 00070   77      A
                              ENDIF
                              IF:       XBYT,A,AND,;                    IS EITHER SRT JAM FLAG SET
05 00071   E60C    A                    MSK(NVBIT,NV@LOW@J,NV@UP@J),NZ  'IN NVNIB
05 00073   CA8A00  N
                                 IF:       XBYT,A,EQ,;                  YES, ARE BOTH SET
05 00076   FE0C    A                       MSK(NVBIT,NV@LOW@J,NV@UP@J)
05 00078   C28300  N
05 0007B   3E80    A                SFLG      TWO@ACT                   TELL SRT THAT THERE WAS A JAM
05 0007D   3261F4  A
05 00080   C38700  N             ELSE:
05 00083   OF      A                RRC                                 GET NV@LOW@J TO SIGN BIT &
                                    ID:READ   NV@LOW@J
05 00084   3237F4  A                MODFLG    LOW@MOD                   TELL SRT IF UP OR LOW JAM
                                 ENDIF
05 00087   CD0000  N             CALL      JAM@SET                      LET SRT SET JAM FLAGS & LAMPS
                              ENDIF
05 0008A   3E80    A          SFLG      SRT@RDY                         SIGNAL SRT NOT IN USE (READY)
05 0008C   328CF7  A
05 0008F   3287F7  A          MODFLG    PROG@RDY                        SET PROG ROUTINE READY
05 00092   3268F4  A          MODFLG    2SD@ENAB                        ALLOW SELECTION OF DUPLEX MODE
05 00095   3EF2    A          MVI       A,X'F2'                         RE-ENABLE
05 00097   3200E6  A          STA       RSINTFF:                                  INTERRUPT
05 0009A   FB      A          EI                                                         SYSTEM
05 0009B   CD0000  N          SOBIT,S   NPFO$ON,24V$SPL                 PFO OFF (INVT'D) & 24V ON
05 0009E   02      A
05 0009F   E480    A
05 000A1   EE80    A
05 000A3   CD0000  N          STIMR     FLT@DLY,25000,FLT@CHK           START LENS FAULT TIMER
05 000A6   12      A
05 000A7   FA      A
05 000A8   0000    N
05 000AA   CD0000  N          CALL      DOC@CLR                         INITIALIZE DOC@NUM TO 1      (1)
05 000AD   327AFC  N          STA       QF@DIGIT                        ENABLE '0' IN QTY FLASHED    (2)
05 000B0   3E08    A          MVI       A,MSK(FBIT,POP@RS)              TELL FLT ASSUME
05 000B2   3286FC  N          STA       XP@PREV                                        BRUSH HOUSE OPN
05 000B5   3E02    A          MVI       A,:NRDY__                       INIT STCK
05 000B7   3254FD  N          STA       :STATE:                             SYNCRONIZED BACKGROUND
05 000BA   3253FD  N          STA       STATE:                                          CONTROL LOOP
05 000BD   CD3702  N          CALL      NRDY:PRL                        INIT CONTROL TO NOT-READY STATE
                         ************************************************************************
                         *                                                                      *
                         *   S Y C R O N I Z E D   B A C K G R O U N D   C O N T R O L   L O O P S   *
                         *                                                                      *
                         ************************************************************************

                         *    PRIORTIES:
                         *              FIRST     10MS TIME OUT REQUESTS
                         *              SECOND    10MS CALLS
                         *              THIRD     SPOOLED CALLS
                         *              FOURTH    20MS CALLS
                         *              FIFTH     100MS CALLS
                         *              SIXTH     100MS TIME OUT REQUESTS

05 000C0   2151FD  A          LXI       H,ADR(DATA,SB:RQST)             SET MEM PNTR TO SB BYTE
                              REPEAT                                    LOOP-3 FROM HLT ON ALL INTER'S
                                 REPEAT                                 LOOP-2 BACK AFTER EACH 100MS
                                    REPEAT                              LOOP-1 BACK AFTER EACH 20MS
```

TABLE I—Continued

```
05 000C3   7E      A         MOV        A,M               A* SYNC BKGND REQUESTS FROM RTC
                             ID:READ    SB:RQST
05 000C4   07      A         RLC                          TEST FOR 10MS
05 000C5   D2F700  N         IF:        CC,C,S                        SB REQUEST
                     *
                     *                                    TIMER SERVICE REQUESTS
                     *                                    CALLS TIMED OUT TIMER SUBRS
                     *                                    USING WRAP AROUND TABLE AND
                     *                                    IN/OUT PNTRS - RTCI SETS
                     *                                    INPTR: & ENTERS CALL ADDR
                     *
05 000C8   3A5FFD  N              WHILE:    XBYT,INPTR:,NE,OUTPTR: ARE PNTRS AT SAME TABL
05 000CB   2161FD  N
05 000CE   BE      A
05 000CF   CAE500  N
05 000D2   6E      A                   MOV      L,M       SET L-REG TO ADDR(L) IN TABLE
05 000D3   26FE    A                   MVI      H,HADR(DATA,TIME:OUT) MEM PNTR NOW SET TO
05 000D5   5E      A                   MOV      E,M            MOVE CALL ADDR(L) TO E
05 000D6   23      A                   INX      H              STEP TO NEXT TABLE BYTE
05 000D7   56      A                   MOV      D,M            MOVE CALL ADDR(H) TO D
05 000D8   23      A                   INX      H              STEP TO NEXT TABLE BYTE
05 000D9   7D      A                   MOV      A,L       PREPARE TO UPDATE PNTR
                                       ID:READ  TIME:OUT  DYNAMIC TABLE CONTAINING ADDRS
                                       MODBYT   A,AND,:   ADJUST FOR END OF TABLE
05 000DA   E62F    A                            TIME:MSK
05 000DC   3261FD  A                   STA      ADR(DATA,OUTPTR:) PNTR TO ADDR OF LAST SE
05 000DF   CD0000  N                   CALL     DE:IND    DO TIMEOUT CALL
05 000E2   C3C800  N              ENDWHILE                YES, ALL TIME OUTS SERVICED
                     *                                    END TIMER SECTION
05 000E5   2A55FD  N              LHLD      10:CALLS      GET PROPER 10MS CALL TABLE
05 000E8   CD0000  N              CALL      HL:IND        DO 10MS CALLS
05 000EB   2151FD  A              LXI       H,ADR(DATA,SB:RQST) SET MEM PNTR TO SB BYTE
05 000EE   F3      A              DI
05 000EF   7E      A              MODBYT    H,AND, 10:RQST REMOVE 10MS REQUEST
05 000F0   E67F    A
05 000F2   77      A
                                  ID:ALTR   SB:RQST
05 000F3   FB      A              EI                      (WATCH OUT FOR UNPRINTABLE NOT)
05 000F4   C31501  N         ELSE:                        DO ANY SPOOLED ROUTINES
05 000F7   3A6AFD  N              IF:       XBYT,SPL:IN,NE,SPL:OUT
05 000FA   216CFD  N
05 000FD   BE      A
05 000FE   CA1101  N
05 00101   6E      A                   MOV      L,M
05 00102   26FE    A                   MVI      H,HADR(DATA,SPL:TBL)
05 00104   5E      A                   MOV      E,M
05 00105   23      A                   INX      H
05 00106   56      A                   MOV      D,M
05 00107   23      A                   INX      H
05 00108   7D      A                   MOV      A,L
05 00109   E64F    A                   MODBYT   A,AND,SPL:MSK
05 0010B   326CFD  A                   STA      ADR(DATA,SPL:OUT)
05 0010E   CD0000  N                   CALL     DE:IND
                                  ENDIF
05 00111   2151FD  A              LXI       H,ADR(DATA,SB:RQST)
05 00114   7E      A              MOV       A,M
                             ENDIF
                             ID:READ    SB:RQST
05 00115   07      A         RLC
05 00116   07      A         RLC                          TEST FOR 20MS
05 00117   D24201  N         IF:        CC,C,S                       SB REQUEST
05 0011A   2A59FD  N              LHLD      20PNTR        SET MEM PTR TO CALL IN 20MS TAB
05 0011D   5E      A              MOV       E,M           MOVE CALL ADDR(L) TO E
05 0011E   23      A              INX       H             STEP MEM PTR TO ADDR(H)
05 0011F   7E      A              IF:       XBYT,M,EQ,X'FF' IS POINTER AT END OF TABLE
05 00120   FEFF    A
05 00122   C23701  N
05 00125   2A57FD  N                   LHLD     20:PNTR   YES, SET MOVING POINTER
05 00128   2259FD  N                   SHLD     20PNTR         BACK TO BEGINNING OF TABLE
05 0012B   2151FD  A                   LXI      H,ADR(DATA,SB:RQST)      SET MEM PNTR TO
05 0012E   F3      A                   DI
05 0012F   7E      A                   MODBYT   H,AND, 20:RQST REMOVE 20MS REQUEST
05 00130   E6BF    A
05 00132   77      A
                                       ID:ALTR  SB:RQST
05 00133   FB      A                   EI
05 00134   C34201  N              ELSE:
05 00137   56      A                   MOV      D,M       NO, MOVE CALL ADDR(H) TO D
05 00138   23      A                   INX      H              STEP TO NEXT CALL IN TABLE
05 00139   2259FD  N                   SHLD     20PNTR         SAVE FOR NEXT LOOP-1
05 0013C   CD0000  N                   CALL     DE:IND
05 0013F   2151FD  A                   LXI      H,ADR(DATA,SB:RQST) SET MEM PNTR TO SB BY
                                  ENDIF
                             ENDIF
05 00142   7E      A    UNTIL:    XBYT,M,AND,20:RQST,Z  MORE 20MS CALLS TO DO  (LOOP-1)
05 00143   E640    A
05 00145   C2C300  N
                        ID:READ   SB:RQST
05 00148   7E      A    IF:       XBYT,M,AND,100:RQST,NZ TEST FOR 100MS SB REQUEST
05 00149   E620    A
05 0014B   CA9E01  N
                             ID:READ    SB:RQST
05 0014E   2A5DFD  N         LHLD       100PNTR           SET MEM PNTR TO CALL IN 100 TAB
05 00151   5E      A         MOV        E,M               MOVE CALL ADDR(L) TO E
05 00152   23      A         INX        H                 STEP MEM PNTR TO ADDR(H)
05 00153   7E      A         IF:        XBYT,M,EQ,X'FF'   IS PNTR AT END OF TABLE
05 00154   FEFF    A
05 00156   C29301  N
```

TABLE I —Continued

```
05 00159  2A58FD  N                 LHLD    100IPNTR      YES, SET MOVING PNTR BACK
05 0015C  225DFD  N                 SHLD    100PNTR         TO BEGINNING OF TABLE
                      *
                      *                                   100MS TIMER SERVICE
                      *                                   DECREMENTS TIMERS AND CALLS
                      *                                   SUBROUTINE REQUESTED WHEN
                      *                                   TIMER TIMES OUT
                      *                                   USES 3 TABLES ON 3 CONSECUTIVE
                      *                                   RAM PAGES -100ICNT W/TIMER
                      *                                             -100ILS W/ADDR(L)
                      *                                             -100ILS W/ADDR(H)
                      *                                   ADDR IS FOR REQSTED SUBR
05 0015F  2130FA  N                 LXI     H,100ICNT     STARTING ADDR OF 100MS TIMERS
05 00162  1614    A                 MVI     D,100ITMAX    D-REG SET TO QTY OF 100MS THRS
                      *                                   CONDITIONAL HOLD OF 100MS THRS
05 00164  3A45FD  A                 IF:     FBIT,STDBOPN,T IS STAND-BY RELAY OPEN
05 00167  E640    A
05 00169  CA6E01  N
                                      MVI     D,100ITMAX) YES, HOLD SPECIFIED NUMBER
05 0016C  1611    A                           -HOLDTMRS           OF TIMERS
                                    ENDIF
                      *
                                    REPEAT                LOOP TO DECR & SERVICE TIMEOUTS
05 0016E  7E      A                   IF:     VBYT,M,NZ IS TIMER ACTIVE
05 0016F  A7      A
05 00170  CA8201  N
05 00173  35      A                     DCR     M       DECR TIMER
05 00174  C28201  N                     IF:     CC,Z,S HAS TIMER TIMED OUT
05 00177  D5      A                       PUSH    D       SAVE # TIMERS TO SERVICE
05 00178  E5      A                       PUSH    H       SAVE ADDR OF CURRENT TIMER
05 00179  24      A                       INR     H       STEP TO NEXT RAM PAGE
05 0017A  5E      A                       MOV     E,M     MOVE CALL ADDR(L) TO E
05 0017B  24      A                       INR     H       STEP TO NEXT RAM PAGE
05 0017C  56      A                       MOV     D,M     MOVE CALL ADDR(H) TO D
05 0017D  CD0000  N                       CALL    DE:IND
05 00180  E1      A                       POP     H       RECALL ADDR OF CURRENT THR
05 00181  D1      A                       POP     D       RECALL NUMBER OF TIMERS
                      *                                     YET TO BE SERVICED
                                        ENDIF
                                      ENDIF
05 00182  23      A                   INX     H           STEP TO NEXT TIMER ADDR
05 00183  15      A                   DCR     D           DECR NUMBER OF 100MS TIMERS
05 00184  C26E01  N                 UNTIL:  CC,Z,S        HAVE ALL TIMERS BEEN SERVICED
                      *                                   END 100MS TIMER SECTION
05 00187  2151FD  A                 LXI     H,ADR(DATA,SB:RQST) SET MEM PNTR TO SB BYTE
05 0018A  F3      A                 DI
05 0018B  7E      A                 MODBYT  M,AND, 100IRQST REMOVE 100MS REQUEST
05 0018C  E6DF    A
05 0018E  77      A
                                    IO:ALTR  SB:RQST
05 0018F  FB      A                 EI
05 00190  C39E01  N               ELSE:
05 00193  56      A                 MOV     D,M           NO, MOVE CALL ADDR(H) TO D
05 00194  23      A                 INX     H                 STEP PNTR TO NEXT CALL
05 00195  225DFD  N                 SHLD    100PNTR           SAVE FOR NEXT LOOP-2
05 00198  CD0000  N                 CALL    DE:IND
05 0019B  2151FD  A                 LXI     H,ADR(DATA,SB:RQST) SET MEM PNTR TO SB BYTE
                                  ENDIF
                                ENDIF
05 0019E  7E      A             UNTIL:  VBYT,M,Z          MORE SB CALLS TO DO  (LOOP-2)
05 0019F  A7      A
05 001A0  C2C300  N
                                IO:READ  SB:RQST
05 001A3  76      A             HLT                       COOL IT UNTIL INTERRUPT RESTART
05 001A4  CAC300  N           UNTIL:  CC,Z,C              WAS INTERRUPT RTC  (LOOP-3)
05 001A7  F3      A           DI                          ONLY KIDDING BEFORE, BUT THIS
05 001A8  76      A           HLT                          TIME REALLY STOP (ABORT)
                      *
                      *       SUBR TO SET CALL TABLE POINTERS
                      *       CALLED BY EACH STATE PROLOG
                      *
                      *       POSITION SB:TABLE POINTER
                      *
05 001A9  3A53FD  N   SB:PNTRS LDA    STATE:              WHAT STATE IS WANTED
05 001AC  110600  A           LXI     D,X'06'             LOAD D&E WITH SKIP NUMBER
05 001AF  21D501  N           LXI     H,SB:TABLE-X'06'    H&L=6'<' TABLE ADDR
                              REPEAT
05 001B2  19      A             DAD     D                 SKIP THREE WORDS
05 001B3  3D      A             DCR     A                 DECR STATE LOOP COUNTER
05 001B4  F2B201  N           UNTIL:  CC,S,S              IS POINTER AT CORRECT STATE
                      *
                      *       TRANSFER ADDRS TO VARIABLE SB POINTERS
                      *
05 001B7  1155FD  N           LXI     D,10:CALLS          SET D&E TO FIRST OF SB PNTRS
05 001BA  0602    A           MVI     B,2                 LOAD 10:CALLS
05 001BC  CDCE01  N           CALL    MV:WORDS                      & 20:PNTR
05 001BF  2B      A           DCX     H                   ADJUST 'FROM' PNTR
05 001C0  2B      A           DCX     H                              BACK 1 WORD
05 001C1  0602    A           MVI     B,2                 LOAD 20PNTR
05 001C3  CDCE01  N           CALL    MV:WORDS                      & 100:PNTR
05 001C6  2B      A           DCX     H                   ADJUST 'FROM' PNTR
05 001C7  2B      A           DCX     H                              BACK 1 WORD
05 001C8  CDCC01  N           CALL    MV:WORD             LOAD 100PNTR
                              IO:ALTR  10:CALLS,20:PNTR,20PNTR,:  DATA WORDS MODIFIED
                                       100:PNTR,100PNTR            BY THIS SUBR
05 001CB  C9      A           RET
                      *NAR
                      *
```

TABLE I—Continued

```
                                   *           MV!WORD/MV!WORDS SUBROUTINES
                                   *
                                   *           SUBR TO TRANSFER WORDS (2BYTES) FROM MEMORY POINTED TO BY <H&L>
                                   *            TO MEMORY POINTED TO BY <D&E>. CALL MV!WORD FOR 1 TRANSFER,
                                   *            AND CALL MV!WORDS (WITH B-REG # WORDS TO TRANSFER) FOR
                                   *            MULTIPLE TRANSFERS. USES ALL BUT C-REG.
                                   *
05 001CC    0601      A    MV!WORD  MVI        B,1                       B= # WORDS TO BE MOVED
                           MV!WORDS REPEAT
05 001CE    7E        A                 MOV     A,M                      A= 1ST 'FROM' BYTE
05 001CF    12        A                 STAX    D                        STORE IN 1ST 'TO' LOCATION
05 001D0    23        A                 INX     H                        ADVANCE 'FROM'
05 001D1    13        A                 INX     D                                  AND 'TO' PNTRS
05 001D2    7E        A                 MOV     A,M                      A= 2ND 'FROM' BYTE
05 001D3    12        A                 STAX    D                        STORE IN 2ND 'TO' LOCATION
05 001D4    23        A                 INX     H                        ADVANCE 'FROM'
05 001D5    13        A                 INX     D                                  AND 'TO' PNTRS
05 001D6    05        A                 DCR     B                        DECRM # OF WORDS CNTR
05 001D7    C2CE01    N            UNTIL!   CC,Z,S                       LOOP UNTIL ALL WORDS TRANSFERRD
05 001DA    C9        A            RET
                                   *
                                   *           TABLE OF SB CALL POINTERS
                                   *           FOR EACH STATE
                                   *
05 001DB    0906      N    SB!TABLE DW         COMP10
05 001DD    0A06      N             DW         COMP20
05 001DF    1206      N             DW         COMP100
05 001E1    B105      N             DW         TREP10
05 001E3    B505      N             DW         TREP20
05 001E5    C305      N             DW         TREP100
05 001E7    4202      N             DW         NRDY10
05 001E9    4602      N             DW         NRDY20
05 001EB    52C2      N             DW         NRDY100
05 001ED    AF02      N             DW         RDY10
05 001EF    B302      N             DW         RDY20
05 001F1    BF02      N             DW         RDY100
05 001F3    AB03      N             DW         PRNT10
05 001F5    B203      N             DW         PRNT20
05 001F7    C803      N             DW         PRNT100
05 001F9    1905      N             DW         RUNN10
05 001FB    1D05      N             DW         RUNN20
05 001FD    2F05      N             DW         RUNN100

                                   *
                                   *           SUBR TO DO EPILOGS & PROLOGS LAST CALL IN EVERY 100MS TABLE
                                   *
05 001FF    2153FD    A    STAT!CHG LXI        H,ADR(DATA,STATE!)        A= PRESENT STATE # IF UNCHANGED
05 00202    7E        A             MOV        A,M                        OR NEXT STATE IF CHANGED
05 00203    23        A             INX        H                         H&L= ADDR 'FORMER STATE' GLOBAL
05 00204    BE        A             IF!        XBYT,A,NE,M               HAS THERE BEEN A STATE CHANGE
05 00205    CA3602    N
                                        ID!READ  STATE!,!STATE!
05 00208    46        A                 MOV      B,M                     YES, B= FORMER STATE
05 00209    77        A                 MOV      M,A                     UPDATE 'FORMER' TO 'PRESENT'
                                        ID!ALTR  !STATE!
05 0020A    78        A                 CASE!    VBYT,B                  DO EPILOG FOR FORMER STATE
05 0020B    111F02    N
05 0020E    FE06      A
05 00210    CD0000    N
05 00213    1806      N                    C,0       COMP!EPL            COMPONENT CONTROL STATE
05 00215    DB05      N                    C,1       TREP!EPL            TECH REP STATE
05 00217    7A02      N                    C,2       NRDY!EPL            NOT-READY STATE
05 00219    E302      N                    C,3       RDY!EPL             READY STATE
05 0021B    E603      N                    C,4       PRNT!EPL            PRINT STATE
05 0021D    4105      N                    C,5       RUNN!EPL            SYSTEM RUNNING, NOT PRINT STATE
                                        ENDCASE
05 0021F    3A53FD    N                 CASE!    VBYT,STATE!             DO PROLOG FOR PRESENT STATE
05 00222    113602    N
05 00225    FE06      A
05 00227    CD0000    N
05 0022A    FF05      N                    C,0       COMP!PRL            COMPONENT CONTROL STATE
05 0022C    A505      N                    C,1       TREP!PRL            TECH REP STATE
05 0022E    3702      N                    C,2       NRDY!PRL            NOT-READY STATE
05 00230    A602      N                    C,3       RDY!PRL             READY STATE
05 00232    1603      N                    C,4       PRNT!PRL            PRINT STATE
05 00234    0805      N                    C,5       RUNN!PRL            SYSTEM RUNNING, NOT PRINT STATE
                                        ENDCASE
                                   ENDIF
05 00236    C9        A            RET                                   RETURN TO 100 MSEC SYNC BKGND
                                   *NAR
                                   *
                                   *           N O T    R E A D Y    S T A T E
                                   *
                                   *           NOT READY STATE- EXECUTES AFTER INITIALIZE UNTIL ALL READY CONDITIONS
                                   *           ARE MET.  THIS STATE CAN ALSO BE ENTERED FROM 'RUN NOT PRINT','READY'
                                   *           AND 'TECH REP'.  CONTROL EXITS TO EITHER 'READY' OR 'TECH REP' STATES.

                                   *           PROLOG

05 00237    CDA901    N    NRDY!PRL CALL       SB!PNTRS                  SYNC BKG PNTRS TO NEW STATE
05 0023A    CD0000    N             STIMR      INST@TMR,1000,NEXT@FLT    UPDATES INST FLT CODE IN STBY
05 0023D    49        A
05 0023E    64        A
05 0023F    0000      N
05 00241    C9        A             RET

                                   *           CALLS FOR NOT READY 10 MS SYN BACKGROUND

05 00242    CD0000    N    NRDY10   CALL       ADH@CTRL
05 00245    C9        A             RET
```

TABLE I —Continued

```
                                     *       CALLS FOR NOT READY 20 MS SYN BACKGROUND

05 00246    0000     N    NRDY20     DW           NRDY@SWS
05 00248    0000     N               DW           HN@ELV@S
05 0024A    0000     N               DW           DSPL@CTL
05 0024C    0000     N               DW           LMP@CTRL
05 0024E    0000     N               DW           INSTRU
05 00250    FFFF     A               DW           X'FFFF'                 END OF TABLE

                                     *       CALLS FOR NOT READY 100 MS SYN BACKGROUND

05 00252    0000     N    NRDY100    DW           NRILK@CK
05 00254    0000     N               DW           REO@BGND
05 00256    0000     N               DW           DVL@DUMP
05 00258    0000     N               DW           RECAPER
05 0025A    0000     N               DW           BIN@CHK                 1
05 0025C    0000     N               DW           MINIPHS1                2
05 0025E    0000     N               DW           BIL@JMP@
05 00260    0000     N               DW           FUS@ROUT
05 00262    0000     N               DW           FLT@100                 1
05 00264    0000     N               DW           FLT@CTRL                2
05 00266    0000     N               DW           FLT@CLRN                3
05 00268    0000     N               DW           PROG2SJM
05 0026A    0000     N               DW           2SD@STPY
05 0026C    0000     N               DW           XMM@STPY
05 0026E    0000     N               DW           JAM@RST
05 00270    0000     N               DW           KEY@CNTR
05 00272    0000     N               DW           TST@LP4
05 00274    8402     N               DW           NRDY:CHG                TEST IF OK TO
05 00276    FF01     N               DW           STAT:CHG                         LEAVE NOT READY
05 00278    FFFF     A               DW           X'FFFF'                 END OF TABLE

                                     *       EPILOG

05 0027A    CDC000   N    NRDY:EPL   C@BIT,S      WAIT@                   INSURE WAIT OFF AT NRDY EXIT
05 0027D    E9FE     A
05 0027F    AF       A               CFLG         STRT:PRT                DIS-ABLE TRANSFER TO 'PRINT'
05 00280    325BF4   A
05 00283    C9       A               RET

                                     *
                                     *       SUBR FOR 'NOT-READY' 100MS SYNC BKGND
                                     *        TESTS FOR CHANGE TO 'READY' OR 'TREP REP'
                                     *
05 00284    CDDF05   N    NRDY:CHG   CALL         TREP:CHG                TEST FOR STATE CHANGE TO :TREP
05 00287    7E       A               IF:          XBYT,M,ME,:TREP         DID IT CHANGE TO :TREP STATE
05 00288    FE01     A
05 0028A    CA9302   N
                                           ID:READ     STATE:
05 0028D    CD9402   N                     CALL        RDYTEST:           TEST ALL 'READY' FLAGS
05 00290    CD0B03   N                     CALL        NRDY:RDY           MOVE TO EITHER :NRDY OR :RDY
                                     ENDIF
05 00293    C9       A               RET

                                     *
                                     *       SUBR TO TEST ALL 'READY' FLAGS IN A LOOP
                                     *
05 00294    2184F7   A    RDYTEST:   LXI          H,RDYFLGS:              H&L= START ADDR OF READY FLAGS
05 00297    0609     A               MVI          B,RDYFNUM:              B= # OF READY FLAGS TO CHK
                                     REPEAT
05 00299    7E       A                     MOV         A,M                A= <PRESENT READY FLAG>
05 0029A    07       A                     RLC                            SET C IF FLAG SET (READY)
05 0029B    DAA002   N                     IF:         CC,C,C             IS PRESENT FLAG INDICATING RDY
05 0029E    0601     A                           MVI        B,1           NO, DON'T TEST ANY FURTHER
                                           ENDIF
05 002A0    23       A                     INX         H                  MOVE TO NEXT FLAG LOCATION
05 002A1    05       A                     DCR         B                  DECRM LOOP CNTR (# READY FLAGS)
05 002A2    C29902   N               UNTIL:      CC,Z,S                   LOOP UNTIL ALL FLAGS CHKED
                                     ID:READ     LENS@RDY,ELV@RDY,FUS@RDY,:   FLAGS READ
                                                 PROG@RDY,ILCK@RDY,XMM@RDY,:
                                                 FLT@RDY,ADH@MOV,SRT@RDY
05 002A5    C9       A               RET                                  RETURN
                                     *NAR
                                     *
                                     *       R E A D Y    S T A T E
                                     *
                                     *       READY STATE- EXECUTES WHEN MACHINE IS READY TO GO INTO PRINT STATE.
                                     *       CONTROL CAN GO BACK TO 'NOT READY' OR GO TO 'TECH REP' IF REQUIRED.

                                     *       PROLOG

05 002A6    CD0000   N    RDY:PRL    S@BIT,S      READY@
05 002A9    E701     A
05 002AB    CDA901   N               CALL         SB:PNTRS                SYNC BKG PNTRS TO NEW STATE
05 002AE    C9       A               RET

                                     *       CALLS FOR READY 10MS SYN BACKGROUND

05 002AF    CD0000   N    RDY10      CALL         ADH@CTRL
05 002B2    C9       A               RET

                                     *       CALLS FOR READY 20MS SYN BACKGROUND

05 002B3    0000     N    RDY20      DW           RDY@SWS
05 002B5    0000     N               DW           HN@ELV@S
05 002B7    0000     N               DW           DSPL@CTL
05 002B9    0000     N               DW           LMP@CTRL
05 002BB    0000     N               DW           INSTRU
05 002BD    FFFF     A               DW           X'FFFF'                 END OF TABLE
```

TABLE I—Continued

```
                                 *        CALLS FOR READY 100MS SYN BACKGROUND

05 002BF    0000     N   RDY100   DW        BIN@CHK                         1
05 002C1    0000     N            DW        MINIPHST                        2
05 002C3    0000     N            DW        BIL@JMP@
05 002C5    0000     N            DW        DVL@DUMP
05 002C7    0000     N            DW        RECAPER
05 002C9    0000     N            DW        FUS@RDUT
05 002CB    0000     N            DW        FLT@100                         1
05 002CD    0000     N            DW        FLT@CTRL                        2
05 002CF    0000     N            DW        NRILKACK
05 002D1    0000     N            DW        RED@BGND
05 002D3    0000     N            DW        2SD@STPY
05 002D5    0000     N            DW        XMM@STPY
05 002D7    0000     N            DW        JAM@RST
05 002D9    0000     N            DW        KEY@CNTR
05 002DB    0000     N            DW        TST@LP4
05 002DD    E9C2     N            DW        RDY!CHG                         TEST IF OK TO
05 002DF    FFC1     N            DW        STAT!CHG                                LEAVE READY
05 002E1    FFFF     A            DW        X'FFFF'                         END OF TABLE

                                 *        EPILOG

05 002E3    CD0000   N   RDY!EPL  COBIT,S   READY$
05 002E6    E7FE     A
05 002E8    C9       A            RET

                                 *        CHANGE OF STATE ROUTINES

                                 *

                                 *        SUBR FOR 'READY' 100MS SYNC BKGND
                                 *         TESTS FOR CHANGE TO 'NOT-READY' OR 'TECH REP'
                                 *
05 002E9    CDDF05   N   RDY!CHG  CALL      TREP!CHG                        TEST FOR STATE CHANGE TO !TREP
05 002EC    7E       A            IF!       XBYT,M,NE,!TREP                 DID IT CHANGE TO !TREP STATE
05 002ED    FE01     A
05 002EF    CA0A03   N
                                       ID!READ   STATE!
05 002F2    CD9402   N                 CALL      RDYTEST!                   TEST ALL 'READY' FLAGS
05 002F5    CD0B03   N                 CALL      NRDY!RDY                   MOVE TO EITHER !NRDY OR !RDY
05 002F8    3A5BF4   A                 IF!       FLG,STRT!PRT,T             IS START PRINT REQUESTED
05 002FB    07       A
05 002FC    D20A03   N
05 002FF    2153FD   A                     LXI       H,ADR(DATA,STATE!)     SET MEM PNTR
05 00302    7E       A                     IF!       XBYT,M,EQ,!RDY         OK TO GO TO PRINT
05 00303    FE03     A
05 00305    C20A03   N
                                               ID!READ   STATE!
05 00308    3604     A                         MVI       M,!PRNT            CHG TO PRT STATE
                                               ID!ALTR   STATE!
                                           ENDIF
                                       ENDIF
                                  ENDIF
05 0030A    C9       A            RET

                                 *
                                 *        SUBR TO USE INFO FROM 'RDYTEST' AND EXECUTE THE PROPER CHANGE OF STATE
                                 *
05 0030B    2153FD   A   NRDY!RDY LXI       H,ADR(DATA,STATE!)              SET MEM PNTR
05 0030E    3603     A            MVI       M,!RDY                          ASSUME GOING TO 'READY' STATE
                                  ID!ALTR   STATE!
05 00310    DA1503   N            IF!       CC,C,C                          ARE ALL 'READY' FLAGS SET
05 00313    3602     A                MVI       M,!NRDY                     NO, MOVE TO 'NOT-READY' STATE
                                      ID!ALTR   STATE!
                                  ENDIF
05 00315    C9       A            RET
                                 *NAR
                                 *
                                 *        P R I N T    S T A T E
                                 *
                                 *        PRINT STATE- EXECUTES WHILE MACHINE IS PRODUCING COPIES.
                                 *        ENTERED FROM 'READY' AND EXITS TO 'RUN NOT PRINT'.

                                 *        PROLOG

05 00316    2160FE   N   PRNT!PRL CLR!MEM   16,SHIFTREG                     CLEAR SHIFT REGISTER
05 00319    0610     A
05 0031B    CD0000   N
05 0031E    3E60     A            MVI       A,LADR(DATA,SHIFTREG)           FORCE SHIFT REG TO START AT
05 00320    3263FD   A            STA       ADR(DATA,SR@PTR!)                BEGINNING OF SHIFTREG TABLE
                                  CLR!MEM   SD1@DLY-TIME@DN!+1,;            CLEAR THE FOLLOWING FLAGS
05 00323    21A7F4   A                      ADR(FLG,TIME@DN!)
05 00326    0609     A
05 00328    CD0000   N
                                  ID!CLR    TIME@DN!,IMED@DN!,;
                                            CYCL@DN!,NORM@DN!,QWIK!OUT,;
                                            IMGMADE!,SD1@TIM@,SD1@DLY
05 0032B    3E80     A            SFLG      910@DONE                        ALLOW FIRST PITCH RESET
05 0032D    326FF4   A
05 00330    AF       A            XRA       A
05 00331    3266FD   N            STA       CYCUPCT!                        INIT CYCLE-UP CNTR TO 0
05 00334    3269FD   N            STA       SR@VALU!                        INIT 'NEW SR VALUE' TO 0
05 00337    325DFA   N            STA       PLL@INFO                        INIT PLL SHUTDOWN CONTROL TO 0
05 0033A    3268FD   N            STA       SMPL@CT!                        INIT SAMPLE COPY CNTR TO 0
05 0033D    3E03     A            MVI       A,3
05 0033F    3267FD   N            STA       NO!IMGCT!                       INIT 'NO IMAGE CNTR' TO 3
05 00342    CD0000   N            CALL      SRSK                            SHIFT REG SCHEDULER (INIT SR#0)
05 00345    CD0000   N            CALL      TIM@MOD                         CALC SHIFTED IMAGE VALUES   (1)
05 00348    CD0000   N            STIMR     935!THR,810,RETURN!             SET 'OVER-RUN EVENT' TIMER  (2)
```

TABLE I—Continued

```
05 0034B    22        A
05 0034C    51        A
05 0034D    0000      N
05 0034F    CD0000    N             CALL       TBLD8PPT                       BUILD NEW PITCH TABLE        (3)
05 00352    CD0000    N             S8BIT,S    PRNT$RLY,PR$C00L               PRINT RELAY & COOLING FAN ON
05 00355    02        A
05 00356    EA08      A
05 00358    F608      A
05 0035A    AF        A             CTIMR      PR8C00L                        CLEAR COOLING FAN TIMER
05 0035B    3232FA    N
05 0035E    CD0000    N             C0BIT,S    NPF0$0N                        TURN OFF PF0 (INVERTED DRIVER)
05 00361    E47F      A
05 00363    3A80F4    A             IF!        FLG,ADH8SELC,T
05 00366    07        A
05 00367    D27003    N
05 0036A    CD0000    N                CALL       ADH8M0TN
05 0036D    C37503    N             ELSE!
05 00370    3E80      A                SFLG       ADH8WTEN
05 00372    320CF4    A
                                    ENDIF
05 00375    CD0000    N             CALL       TRN8080
05 00378    CD0000    N             CALL       PAP$SIZE                       CHK PAPER WIDTH F0R FUSER    (1)
05 0037B    CD0000    N             CALL       EDGE&FA                        CHK WHICH EDGE FADE OUT      (2)
05 0037E    CD0000    N             CALL       PAP8PRL3
05 00381    CD0000    N             CALL       PR0G&UP                        PR0G INITIALIZATI0N SUBR
05 00384    CD0000    N             CALL       PR0G&UP1
05 00387    CDC000    N             CALL       FDR&PRT                        CHECK FEEDER SELECTI0N
05 0038A    CD0000    N             CALL       BLG&BKPT                       READ BILLING BREAK-P0INTS
05 0038D    CD0000    N             CALL       D08ELV                         CAUSE ELV T0 EXECUTE
05 00390    3A54F4    A             IF!        FLG,SRT&SEL,T                  IS S0RTER BEING USED
05 00393    07        A
05 00394    D29F03    N
05 00397    CD0000    N                CALL       SRT$INIT                    INITIALIZE S0RTER JAM DETECT
                                       MVI        A,MSK(NVBIT,NV8FJAM,)       SETS ALL 4 JAM C0NDITI0NS
05 0039A    3E0F      A                           NV8IMED,NV8L0W8J,NV8UP8J)
05 0039C    C3A403    N             ELSE!
05 0039F    3AC9E2    A                RNVNIB     NV8JAM8N                    READ SAVED PREVI0US SRT JAMS
                                       M0DBYT     A,0R,MSK(NVBIT,)            & SET IMED 0N X F0R JAM
05 003A2    F603      A                           NV8FJAM,NV8IMED)
                                    ENDIF
05 003A4    32C9E2    A             WNVNIB     NV8JAM8N                       ST0RE IN CASE 0F PWR 0N
                                    I0!ALTR    NV8FJAM,NV8IMED,NV8L0W8J,)     SEE AB0VE IF!/ELSE!
                                               NV8UP8J
05 003A7    CDA901    N             CALL       SB!PNTRS                       SYNC BKG PNTRS T0 NEW STATE
05 003AA    C9        A             RET

                           *        CALLS F0R PRINT 10 MS SYN BACKGR0UND

05 003AB    CD0000    N    PRNT10   CALL       ADH8CTRL
05 003AE    CDC004    N             CALL       PRT!IMD
05 003B1    C9        A             RET

                           *        CALLS F0R PRINT 20 MS SYN BACKGR0UND

05 003B2    0000      N    PRNT20   DW         PRT8SWS
05 003B4    0000      N             DW         T0N8DIS
05 003B6    0000      N             DW         PAP8TGL3
05 003B8    0000      N             DW         LMP8CTRL
05 003BA    0000      N             DW         FDR8BKFD
05 003BC    0000      N             DW         S0RTER8
05 003BE    0000      N             DW         FLV8PRNT
05 003C0    0000      N             DW         S0S8JMDT
05 003C2    0000      N             DW         DSPL8CTL
05 003C4    0000      N             DW         INSTRU
05 003C6    FFFF      A             DW         X'FFFF'                        END 0F TABLE

                           *        CALLS F0R PRINT 100 MS SYN BACKGR0UND

05 003C8    0000      N    PRNT100  DW         RILK&CK
05 003CA    0000      N             DW         2SD8RUN
05 003CC    0000      N             DW         LITE80FF
05 003CE    0000      N             DW         XMH8PRNT
05 003D0    0000      N             DW         FUS8R0UT
05 003D2    0000      N             DW         READY8CK
05 003D4    0000      N             DW         JAM8RST
05 003D6    0000      N             DW         MINIPHS8
05 003D8    4F06      N             DW         SMPL8CPY
05 003DA    0000      N             DW         RXCYCLDN                       STUB IN US IMG
05 003DC    0000      N             DW         KEY8CNTR
05 003DE    0000      N             DW         TST8LP4
05 003E0    2C04      N             DW         PRT!CHG                        TEST IF 0K T0
05 003E2    FF01      N             DW         STAT!CHG                                 LEAVE PRINT
05 003E4    FFFF      A             DW         X'FFFF'                        END 0F TABLE

                           *        EPIL0G

05 003E6    CD0000    N    PRNT!EPL CALL       AX8EPTY                        (1)
05 003E9    CD0000    N             CALL       FDM8EPL3                       (2)
05 003EC    CD0000    N             CALL       FDA8EPL3                       (3)
05 003EF    CD0000    N             CALL       TRN8EPL3
05 003F2    CD0000    N             CALL       DVL8NRDY
                                    C0BIT,S    FUS$C00L,FUS$L0AD,ILLM$SPL,)
05 003F5    CD0000    N                        EF0$11,EF0$12$5,SMPL$CPY,READY$
05 003F8    07        A
05 003F9    E6F7      A
05 003FB    EDFD      A
05 003FD    F2F7      A
05 003FF    ECF7      A
05 00401    EBF7      A
05 00403    E2FE      A
05 00405    E7FE      A
```

TABLE I—Continued

```
05 00407  CD0000  N           SOBIT,S   NPFO$ON                TURN OFF PFO (INVERTED DRIVER)
05 0040A  E480    A
05 0040C  AF      A           CFLG      ELV$AUTO               DISABLE AUTO-TRAY SWITCHING
05 0040D  3222F4  A
05 00410  CD0000  N           CALL      PAP$EPL3
05 00413  CD1704  N           CALL      ABORT
05 00416  C9      A           RET

                      *
                      *       SUBROUTINE
                      *

05 00417  F3      A   ABORT   DI                               TURN OFF INTERRUPT SYSTEM
05 00418  AF      A           CFLG      TBLD$FIN               SIGNAL NEW PITCH TABLE REQ'D
05 00419  3250F4  A
05 0041C  211907  N           LXI       H,EV$STBY:             ADDR OF STBY EVENT TABLE
05 0041F  2264FD  N           SHLD      EV$PTR:                SAVE FOR MACH CLK ROUTINE
05 00422  CD0000  N           CSBIT,S   BTR$LOAD,PRNT$RLY      UN-LOAD BTR & DROP PRINT RELAY
05 00425  02      A
05 00426  E17F    A
05 00428  EAF7    A
05 0042A  FB      A           EI
05 0042B  C9      A           RET
05 0042C  3A66FD  N   PRT:CHG IF:       XBYT,CYCUPCT:,EQ,2     CHECK FOR PROLOG 2 OR CYCLE OUT
05 0042F  FEC2    A
05 00431  C23C04  N
05 00434  3E80    A             SFLG      PRT$PRO2             YES, SET 'PRINT PROLOG 2' FLAG
05 00436  3271F4  A
05 00439  C37004  N           ORIF:     XBYT,A,EQ,3            NO, IS CYCLE UP CNTR=3
05 0043C  FEC3    A
05 0043E  C27004  N
05 00441  3A71F4  A           ANDIF:    FLG,PRT$PRO2,T         YES, AND IS PROLOG 2 FLAG SET
05 00444  07      A
05 00445  D27004  N
05 00448  AF      A             CFLG      PRT$PRO2             YES, DO PROLOG 2 AND CLR FLAG
05 00449  3271F4  A
                      *
                      *       PRINT STATE BACKGROUND- PROLOG 2
                      *
05 0044C  CD0000  N             CALL      PAP$PRL2             RETN XPORT OFF IF NOT SIDE 1
05 0044F  CD0000  N             CALL      PROG$UP2
05 00452  3AADF4  A             IF:       FLG,IMGMADE1,T       HAS 1ST IMAGE BEEN MADE
05 00455  07      A
05 00456  D25C04  N
05 00459  CD0000  N               CALL      PROG$UP            YES, CALL PROG INITIALIZATION
                                ENDIF
05 0045C  3A57FA  N             IF:       VBYT,MINIBYTE,NZ     IS MINI-PHYSICAL ACTIVE
05 0045F  A7      A
05 00460  CA7004  N
05 00463  AF      A               CFLG      DSPL$1ST           YES, ENABLE DISPLAY UPDATE
05 00464  329AF4  A
05 00467  3C      A               INR       A                  DISPLAY QUANTITY
05 00468  3250FA  N               STA       DSPL$ST1           COMPLETE
05 0046B  3EC6    A               MVI       A,6                SET DOCUMENT TOTAL TO
05 0046D  326FFA  N               STA       DOC$TOTL           6 FOR ADH DOCUMENT CHECK
                                ENDIF
                              ENDIF

                      *       END PROLOG2

                      *
                      *       BUILD FLAG BYTE
                      *
05 00470  0608    A           MVI       B,8                    NUMBER OF FLAGS REQ'D
05 00472  AF      A           XRA       A                      CLEAR A-REG
05 00473  57      A           MOV       D,A                    CLEAR D-REG
05 00474  21A9F4  A           LXI       H,ADR(FLG,IMED$DN1)    STARTING ADDR OF PRT:CHG FLAGS
                              REPEAT
05 00477  7E      A             MOV       A,M                  LOAD A W/CONTENTS OF FLAG ADDR
05 00478  07      A             RLC                            ROTATE FLAG(D7) INTO CARRY
05 00479  7A      A             MOV       A,D                  LOAD A W/FLAGS BILT INTO BYTE
05 0047A  17      A             RAL                            PUT FLAG IN D0 & SHIFT LEFT
05 0047B  57      A             MOV       D,A                  SAVE RESULT IN D-REG
05 0047C  23      A             INX       H                    STEP TO NEXT FLAG
05 0047D  05      A             DCR       B                    DECR NUMBER OF FLAGS REQ'D
05 0047E  C27704  N           UNTIL:    CC,Z,S                 LOOP UNTIL ALL FLAGS IN BYTE
                              ID:READ   IMED$DN1,CYCL$DN1,NORM$DN1,; FLAGS READ
                                        QWIK:OUT,IMGMADE1,SD1$TIMO,;
                                        SD1$DLY,ADH$SELC
                      *
                      *       TEST FOR STATE CHANGE TO :RUNN
                      *
05 00481  3A67FD  N           LDA       NO:MGCT:               MOV CURRENT NO IMAGE COUNTER
05 00484  5F      A           MOV       E,A                    TO THE E-REG
05 00485  060E    A           MVI       B,14                   LOOP CNTR FOR STATE CHG TESTS
05 00487  21E104  N           LXI       H,CYC:OUT              TABLE ADDR OF PRT:CHG TESTS
                              REPEAT
05 0048A  7A      A             MOV       A,D                  MOV FLAG BYTE TO THE A-REG
05 0048B  A6      A             MODBYT    A,AND,M              MASK FOR DESIRED FLAGS
05 0048C  23      A             INX       H                    STEP TO STATUS TEST
05 0048D  AE      A             MODBYT    A,XOR,M              TEST FLAG STATUS
05 0048E  C29F04  N             IF:       CC,Z,S               DID TEST PASS
05 00491  23      A               INX       H                  YES, STEP TO NO:MGCT: TEST
05 00492  7B      A               IF:       XBYT,E,GE,M        IS NO:MGCT: AT CORRECT VALUE
05 00493  BE      A
05 00494  DA9E04  N
05 00497  3E05    A                 MVI       A,:RUNN          YES, CHANGE STATE
05 00499  3253FD  N                 STA       STATE:           TO RUN NOT PRINT
05 0049C  0601    A                 MVI       B,1              FORCE END OF TESTS (EARLY OUT).
                                  ENDIF
```

TABLE I—Continued

```
05 0049E   28      A                  DCX      H                      ADJ PNTR BACK TO NO IMG TEST
                                    ENDIF
05 0049F   23      A                  INX      H                      STEP OVER NO IMG TEST
05 004A0   23      A                  INX      H                      STEP TO MASK FOR NEXT TEST
05 004A1   05      A                  DCR      B                      DECR LOOP COUNTER
05 004A2   C28A04  N                UNTIL!   CC,Z,S                   ALL TESTS COMPLETE OR STATE CHG

05 004A5   7A      A                MOV      A,D                      MOV FLAG BYTE TO A-REG
05 004A6   E662    A                MODBYT   A,AND,D6!D5!D1           MASK AND TEST FOR FLAGS TRUE
                                    ID!READ  NORMODN!,CYCLODN!,SD1ODLY FROM ABOVE BYTE BUILD
05 004A8   CAPF04  N                IF!      CC,Z,C                   ARE ANY FLAGS TRUE
05 004AB   2166FD  A                  LXI      H,ADR(DATA,CYCUPCT!)   PREPARE TO TEST OR MODIFY
05 004AE   7E      A                  IF!      XBYT,M,GF,3            HAS PROG PUSHED IT TO 0
05 004AF   FE03    A
05 004B1   DAB604  N
                                        ID!READ  CYCUPCT!
05 004B4   3602    A                    MVI      M,2                  NO, FORCE CYCLE-UP MODE AGAIN
                                        ID!ALTR  CYCUPCT!
                                      ENDIF
05 004B6   CD0000  N                  COBIT,S  ILLM*SPL               ILLM SPL OFF DURING DEAD CYCLE
05 004B9   F2F7    A
05 004BB   AF      A                  CFLG     SMPLOFLG               CANCEL SAMPLE COPY SEQUENCE
05 004BC   324CF4  A
                                    ENDIF
05 004BF   C9      A                RET


                           PRT!IMD  IF!      FLGS,IMEDODN!,AND,!      IS IMEDIATE DOWN REQUESTED
05 004C0   3AA9F4  A                         TBLD!FIN,T               AND HAS PROB BEEN DETECTED
05 004C3   2150F4  A
05 004C6   A6      A
05 004C7   F2D004  N
05 004CA   CD1704  N                  CALL     ABORT
05 004CD   C3E004  N                ORIF!    FLG,TIMEDDN!,T           IF TIMED DWN REQ'D DROP OUT
05 004D0   3AA7F4  A
05 004D3   07      A
05 004D4   D2E004  N
05 004D7   21E1FF  A                  COBIT    BTR*LOAD               BIAS TRANS ROLL (ASAP)
05 004DA   3E7F    A
05 004DC   F3      A
05 004DD   A6      A
05 004DE   77      A
05 004DF   F8      A
                                    ENDIF
05 004E0   C9      A                RET
                           *
                           *                                          D7 6 5 4 3 2 1 0 (X=DON'T CARE)
                           *
                           *              TABLE OF FLAG STATUS TESTS  I C N O I S S A   N C
                           *               AND NO IMAGE COUNTER VALUES M Y O W M D D D   O O
                           *               USED TO DETERMINE IF STATE E C R I G 1 1 H     U   T N
                           *               SHOULD CHANGE FROM PRINT TO D L M K M O O O   I N   E U
                           *               RUN NOT PRINT              O O O ! A T D S   M T   S M
                           *                                          D D D O D I L E   A E   T B
                           *                                          N N N U E M Y L   G R     E
                           *                                          ! ! ! T ! O   C   E       R
                           *
05 004E1   48      A       CYC!OUT  DB       D6!D3                    X 1 X X 0 X X X   00      1
05 004E2   40      A                DB       D6
05 004E3   00      A                DB       0
05 004E4   5C      A                DB       D6!D4!D3!D2              X 1 X 0 1 1 X X   16      2
05 004E5   4C      A                DB       D6!D3!D2
05 004E6   10      A                DB       16
05 004E7   5C      A                DB       D6!D4!D3!D2              X 1 X 0 1 0 X X   11      3
05 004E8   48      A                DB       D6!D3
05 004E9   0B      A                DB       11
05 004EA   68      A                DB       D6!D5!D3                 X 0 1 X 0 X X X   00      4
05 004EB   20      A                DB       D5
05 004EC   00      A                DB       0
05 004ED   75      A                DB       D6!D5!D4!D2!D0           X 0 0 0 X 1 X 0   36      5
05 004EE   04      A                DB       D2
05 004EF   24      A                DB       36
05 004F0   75      A                DB       D6!D5!D4!D2!D0           X 0 0 0 X 1 X 1   20      6
05 004F1   05      A                DB       D2!D0
05 004F2   14      A                DB       20
05 004F3   7D      A                DB       D6!D5!D4!D3!D2!D0        X 0 1 0 1 1 X 0   36      7
05 004F4   2C      A                DB       D5!D3!D2
05 004F5   24      A                DB       36
05 004F6   7D      A                DB       D6!D5!D4!D3!D2!D0        X 0 1 0 1 1 X 1   20      8
05 004F7   2D      A                DB       D5!D3!D2!D0
05 004F8   14      A                DB       20
05 004F9   75      A                DB       D6!D5!D4!D2!D0           X 0 0 0 X 0 X 0   21      9
05 004FA   00      A                DB       0
05 004FB   15      A                DB       21
05 004FC   7D      A                DB       D6!D5!D4!D3!D2!D0        X 0 1 0 1 0 X 0   21      10
05 004FD   28      A                DB       D5!D3
05 004FE   15      A                DB       21
05 004FF   75      A                DB       D6!D5!D4!D2!D0           X 0 0 0 X 0 X 1   13      11
05 00500   01      A                DB       D0
05 00501   0D      A                DB       13
05 00502   7D      A                DB       D6!D5!D4!D3!D2!D0        X 0 1 0 1 0 X 1   13      12
05 00503   29      A                DB       D5!D3!D0
05 00504   0D      A                DB       13
05 00505   10      A                CB       D4                       X X X 1 X X X X   11      13
05 00506   10      A                DB       D4
05 00507   0B      A                CB       11
05 00508   80      A                DB       D7                       1 X X X X X X X   00      14
05 00509   80      A                DB       D7
05 0050A   00      A                DB       0
```

TABLE I—Continued

```
                              *NAR
                              *
                              *       R U N   N O T   P R I N T   S T A T E
                              *
                              *       RUN NOT PRINT- EXECUTES WHILE MACHINE IS COMPLETING A COPY RUN.
                              *       ENTERED FROM 'PRINT' AND EXITS TO 'NOT READY'.

                              *       PROLOG

05 0050B    CD0000   N  RUNN:PRL CALL    DO8ELV                       CAUSE ELV TO EXECUTE
05 0050E    CD0000   N           STIMR   RUNN:TMR,2500,RUNNOCHG       STAY IN RUNN 2.5 SEC
05 00511    2F       A
05 00512    FA       A
05 00513    7505     N
05 00515    CDA901   N           CALL    SB:PNTRS                     SYNC BKG PNTRS TO NEW STATE
05 00518    C9       A           RET

                              *       CALLS FOR RUN NOT PRINT 10 MS SYN BACKGROUND

05 00519    CD0000   N  RUNN10   CALL    ADHOCTRL
05 0051C    C9       A           RET

                              *       CALLS FOR RUN NOT PRINT 20 MS SYN BACKGROUND

05 0051D    0000     N  RUNN20   DW      RUNNOSWS
05 0051F    0000     N           DW      SORTERS
05 00521    0000     N           DW      SOSOJMOT
05 00523    0000     N           DW      FLVOPRNT
05 00525    0000     N           DW      LMPOCTRL
05 00527    0000     N           DW      PAPOTGL4
05 00529    0000     N           DW      DSPLOCTL
05 0052B    0000     N           DW      INSTRU
05 0052D    FFFF     A           DW      X'FFFF'                      END OF TABLE

                              *       CALLS FOR RUN NOT PRINT 100 MS SYN BACKGROUND

05 0052F    0000     N  RUNN100  DW      JAMORST
05 00531    0000     N           DW      RILKOCK
05 00533    0000     N           DW      FUSORDUT
05 00535    0000     N           DW      2SDORUN
05 00537    0000     N           DW      XMHOPRNT
05 00539    0000     N           DW      LITEOOFF
05 0053B    0000     N           DW      TSTOLP4
05 0053D    FF01     N           DW      STAT:CHG                     TEST IF OK TO LEAVE RUN NOT PRT
05 0053F    FFFF     A           DW      X'FFFF'                      END OF TABLE

05 00541    CD0000   N  RUNN:EPL CALL    DELOCK                       CALC COPIES DELIVERED
05 00544    CD0000   N           CALL    PAPOEPL4                     'RUNNPRT' PAPER PATH MOP UP SUB
05 00547    CD0000   N           CALL    MOTOOFF                      TURN OFF SORTER MOTORS
05 0054A    CD0000   N           CALL    DO8ELV                       CAUSE ELV TO EXECUTE
05 0054D    AF       A           CFLG    AXFDOFLT                     RESET FOR USE DURING NEXT RUN
05 0054E    323FF4   A
05 00551    2123FC   A           CFBIT,P TFOXMHO                      STOP BLINKING OF XMH 'OTHER'
05 00554    3EFE     A
05 00556    A6       A
05 00557    77       A
05 00558    CD0000   N           COBIT,S SOS*SMPL
05 0055B    ECFD     A
05 0055D    CD7805   N           CALL    NVOJAM
05 00560    CD0000   N           CALL    RCPOSTRE                     STORE RECAP DATA IN RAM
05 00563    CD0000   N           CALL    ADHOMOTF
05 00566    3E08     A           MVI     A,8
05 00568    3285FA   N           STA     COOLCNT                      SET COUNTER FOR 7 TIMEOUTS
05 0056B    CD0000   N           CALL    PROFAN
05 0056E    CD0000   N           CALL    FLTOEPL5                     (1)
05 00571    CD0000   N           CALL    HISTOFLE                     (2) LOG HISTORY DATA FOR RUN
05 00574    C9       A           RET                                  (3)

05 00575    2153FD   N  RUNNOCHG LXI     H,STATE:                     SET H&L TO ADDR OF STATE:
05 00578    3602     A           MVI     M,INRDY                      CHANGE STATE: TO NOT READY
                                 IDIALTR STATE:
05 0057A    C9       A           RET
05 0057B    3A66F4   A  NVOJAM   RFLG    UPOJAM                       LOAD A WITH SRT UPPER JAM FLAG
05 0057E    07       A
                              *                                       & SAVE IT IN THE CARRY BIT
05 0057F    3A36F4   A           LDAFLG  LOWOJAM                      LOAD A WITH SRT LOWER JAM FLAG
05 00582    17       A           RAL                                  & MOVE CARRY &
05 00583    17       A           RAL                                  LOWOJAM INTO THEIR POSITIONS
05 00584    07       A           RLC
05 00585    07       A           RLC
                                 MODBYT  A,AND,MSK(NVBIT,;            MASK FOR DESIRED BITS
05 00586    E60C     A                   NVOLOWOJ,NVOUPOJ)
05 00588    47       A           MOV     B,A                          & SAVE IT IN THE B-REG
05 00589    3AA9F4   A           IF:     FLG,IMFDODN:,T               WAS THERE AN IMED DN CONDITION
05 0058C    07       A
05 0058D    D29605   N
05 00590    78       A              MOV     A,B                       YES,RESTORE A-REG
                                    MODBYT  A,OR,MSK(NVBIT,NVOFJAM,;  & SET NV JAM BITS
05 00591    F603     A                      NVOIMED)
05 00593    C3A105   N           ELSE:
05 00596    3A3CFD   A              IF:     FBITS,FDROAJAM,OR,FDROMJAM,T IS EITHER JAM CONDITION TRUE
05 00599    E60C     A
05 0059B    CA9F05   N
05 0059E    37       A                 STC                            YES,SET CARRY
                                    ENDIF
05 0059F    17       A              RAL                               ROTATE INTO DO
05 005A0    B0       A              MODBYT  A,OR,B                    'OR' IN SRT JAM BITS
                                 ENDIF
05 005A1    32C9E2   A           WNVNIB  NVOJAMON
                                 IDIALTR NVOFJAM,NVOIMED,NVOLOWOJ,NVOUPOJ
05 005A4    C9       A           RET                                  RETURN TO STATE CHECKER
```

TABLE I — Continued

```
                                   *NAR
                                   *
                                   *      T E C H    R E P    S T A T E
                                   *
                                   *      THE TECH REP STATE IS ENTERED WHEN THE SERVICE KEY IS ON IN
                                   *      'NOT READY' & 'READY' STATES. THIS ALLOWS THE TECH REP TO PERFORM SUCH
                                   *      TASKS AS ACCESS NON-VOLATILE MEMORY & COMPONENT CONTROL.

                                   *
                                   *      PROLOG
                                   *
05 005A5   CD0000   N   TREP:PRL  COBIT,S      WAIT$                INSURE WAIT OFF AT TREP ENTRANC
05 005A8   E9FE     A
05 005AA   CD0000   N             CALL         DGN@PRL              DIAGNOSTIC PROLOG
05 005AD   CDA901   N             CALL         SB:PNTRS             SYNC BKG PNTRS TO NEW STATE
05 005B0   C9       A             RET

                                   *      CALLS FOR TECH REP 10MS SYN BACKGROUND

05 005B1   CD0000   N   TREP10    CALL         ADH@CTRL
05 005B4   C9       A             RET

                                   *      CALLS FOR TECH REP 20MS SYN BACKGROUND

05 005B5   0000     N   TREP20    DW           TREP@SWS
05 005B7   0000     N             DW           MN@ELVRS
05 005B9   0000     N             DW           LMP@CTRL
05 005BB   0000     N             DW           DSPL@CTL
05 005BD   0000     N             DW           DGN@BKG
05 005BF   0000     N             DW           INSTRU
05 005C1   FFFF     A             DW           X'FFFF'              END OF TABLE

                                   *      CALLS FOR TECH REP 100MS SYN BACKGROUND

05 005C3   0000     N   TREP100   DW           NRILK@CK
05 005C5   0000     N             DW           2SD@STPY
05 005C7   0000     N             DW           XMM@STPY
05 005C9   0000     N             DW           RED@BGND
05 005CB   0000     N             DW           RIN@CHK
05 005CD   0000     N             DW           JAM@RST
05 005CF   0000     N             DW           DVL@DUMP
05 005D1   0000     N             DW           FUS@RDUT
05 005D3   0000     N             DW           TST@LP4
05 005D5   DF05     N             DW           TREP:CHG             TEST IF OK TO
05 005D7   FF01     N             DW           STAT:CHG                       LEAVE TREP REP
05 005D9   FFFF     A             DW           X'FFFF'              END OF TABLE
                                   *
                                   *      EPILOG  (TECH REP STATE)
                                   *
05 005DB   CD0000   N   TREP:EPL  CALL         DGN@EPL              DIAGNOSTIC EPILOG
05 005DE   C9       A             RET

                                   *      CHANGE OF STATE CHECK

05 005DF   2153FD   A   TREP:CHG  LXI          H,ADR(DATA,STATE:)   PREPARE FOR POSSIBLE STATE CHG
05 005E2   7E       A             IF:          XBYT,M,NE,:COMP      DO NOT CHG STATE IF IN COMP
05 005E3   FE00     A
05 005E5   CAFE05   N
05 005E8   3A49F4   A                IF:          FLG,SER@ACT,T        IF SERVICE KEY IS ON AND IF
05 005EB   07       A
05 005EC   D2FC05   N
05 005EF   3A20FC   A                ANDIF:       FBIT,DGN@PRT@,F       IN DIAG PRINT PROGRAM
05 005F2   E6C2     A
05 005F4   C2FC05   N
05 005F7   3601     A                   MVI          M,:TREP           CHG TO TREP STATE
05 005F9   C3FE05   N                ELSE:                             IF KEY IS TURNED OFF
05 005FC   3602     A                   MVI          M,:NRDY           CHG TO NOT READY STATE
                                     ENDIF
                                     ID:ALTR      STATE:
                                  ENDIF
05 005FE   C9       A             RET
```

TABLE II

```
                                   *      FIXED PITCH EVENT TABLE
                                   *
                                   *      EVENTS MUST BE IN SEQUENTIAL ORDER STARTING
                                   *      WITH THE EVENT CLOSES TO PITCH RESET FIRST
                                   *
                                   *      THERE CAN BE NO MORE THAN 256 COUNTS BETWEEN EVENTS
                                   *
                                   *      FORMAT OF EVENTS FOR EVENT TABLE
                                   *
                                   *      EVENT     X,Y,Z
                                   *      WHERE:
                                   *      X = ABSOLUTE COUNTS FROM RESET
                                   *      Y = SHIFT REGISTER NEEDED IN EVENT
                                   *      Z = EVENT NAME
                                   *
                                   *
                                   *      PITCH EVENTS
                                   *
                                          TABLE
05 0001E   0200     A                     EVENT     2,3,TRN2CURR
05 00020   03       A
```

TABLE II —Continued

| | | | | | | |
|---|---|---|---|---|---|---|
| | 05 00021 | 0000 | N | | | |
| 116 | 05 00023 | 0300 | A | EVENT | 3,2,ADC@ACT | |
| | 05 00025 | 02 | A | | | |
| | 05 00026 | 0000 | N | | | |
| 117 | 05 00028 | 0400 | A | EVENT | 4,3,FDR5AFLT | |
| | 05 0002A | 03 | A | | | |
| | 05 0002B | 0000 | N | | | |
| 118 | 05 0002D | 0700 | A | EVENT | 7,0,SPLYS@ØN | |
| | 05 0002F | 00 | A | | | |
| | 05 00030 | 0000 | N | | | |
| 119 | 05 00032 | 0800 | A | EVENT | 8,2,FDR1AXFD | |
| | 05 00034 | 02 | A | | | |
| | 05 00035 | 0000 | N | | | |
| 120 | 05 00037 | 0A00 | A | EVENT | 10,3,FUS@LØAD | |
| | 05 00039 | 03 | A | | | |
| | 05 0003A | 0000 | N | | | |
| 121 | 05 0003C | 3000 | A | EVENT | 48,8,DECG@INV | DECISIØN GATE FØR INVTD CØPIES |
| | 05 0003E | 08 | A | | | |
| | 05 0003F | 0000 | N | | | |
| 122 | 05 00041 | 3600 | A | EVENT | 54,5,FUS@NTLD | FUSER LØADED TEST |
| | 05 00043 | 05 | A | | | |
| | 05 00044 | 0000 | N | | | |
| 123 | 05 00046 | 5500 | A | EVENT | 85,3,FDR6MFLT | |
| | 05 00048 | 03 | A | | | |
| | 05 00049 | 0000 | N | | | |
| 124 | 05 0004B | 5900 | A | EVENT | 89,2,FDR2MNFD | |
| | 05 0004D | 02 | A | | | |
| | 05 0004E | 0000 | N | | | |
| 125 | 05 00050 | 5000 | A | EVENT | 93,8,JAM6@NØN | PAPER PATH JAM SW PITCH EVENT |
| | 05 00052 | 08 | A | | | |
| | 05 00053 | 0000 | N | | | |
| 126 | 05 00055 | 7600 | A | EVENT | 118,9,JAM5@INV | PAPER PATH JAM SW PITCH EVENT |
| | 05 00057 | 09 | A | | | |
| | 05 00058 | 0000 | N | | | |
| 127 | 05 0005A | 7800 | A | EVENT | 120,0,FSH@ØFF | |
| | 05 0005C | 00 | A | | | |
| | 05 0005D | 0000 | N | | | |
| 128 | 05 0005F | 8700 | A | EVENT | 135,0,PRØG@HST | PRØG HISTØRY FILE UPDATE |
| | 05 00061 | 00 | A | | | |
| | 05 00062 | 0000 | N | | | |
| 129 | 05 00064 | 8F00 | A | EVENT | 143,6,JAM4@CHK | PAPER PATH JAM SW PITCH EVENT |
| | 05 00066 | 06 | A | | | |
| | 05 00067 | 0000 | N | | | |
| 130 | 05 00069 | ÀA00 | A | EVENT | 170,10,RET2@CHK | PAPER PATH JAM SW PITCH EVENT |
| | 05 0006B | 0A | A | | | |
| | 05 0006C | 0000 | N | | | |
| 131 | 05 0006E | CF00 | A | EVENT | 207,3,SØS@CLN | |
| | 05 00070 | 03 | A | | | |
| | 05 00071 | 0000 | N | | | |
| 132 | 05 00073 | D100 | A | EVENT | 209,2,TRN5CURR | |
| | 05 00075 | 02 | A | | | |
| | 05 00076 | 0000 | N | | | |
| 133 | 05 00078 | E300 | A | EVENT | 227,5,JAM3@CHK | PAPER PATH JAM SW PITCH EVENT |
| | 05 0007A | 05 | A | | | |
| | 05 0007B | 0000 | N | | | |
| 134 | 05 0007D | 0901 | A | EVENT | 265,2,FDR3AEDG | ENABLE AUX FDR WT SENSØR |
| | 05 0007F | 02 | A | | | |
| | 05 00080 | 0000 | N | | | |
| 135 | 05 00082 | 0801 | A | EVENT | 267,4,JAM2@CHK | PAPER PATH JAM SW PITCH EVENT |
| | 05 00084 | 04 | A | | | |
| | 05 00085 | 0000 | N | | | |
| 136 | 05 00087 | 0E01 | A | EVENT | 270,8,RET1@CHK | PAPER PATH JAM SW PITCH EVENT |
| | 05 00089 | 08 | A | | | |
| | 05 0008A | 0000 | N | | | |
| 137 | 05 0008C | 6901 | A | EVENT | 361,3,TRN3DTCK | |
| | 05 0008E | 03 | A | | | |
| | 05 0008F | 0000 | N | | | |
| 138 | 05 00091 | 6C01 | A | EVEN\ | 364,2,FDR4MEDG | ENABLE MAIN WT SENSØR |
| | 05 00093 | 02 | A | | | |
| | 05 00094 | 0000 | N | | | |
| 139 | 05 00096 | B901 | A | EVENT | 441,9,JAM6@INV | PAPER PATH JAM SW PITCH EVENT |
| | 05 00098 | 09 | A | | | |
| | 05 00099 | 0000 | N | | | |
| 140 | 05 0009B | C201 | A | EVENT | 450,4,FUS@UNLD | |
| | 05 0009D | 04 | A | | | |
| | 05 0009E | 0000 | N | | | |
| 141 | 05 000A0 | C301 | A | EVENT | 451,2,TRN1RØLL | |
| | 05 000A2 | 02 | A | | | |
| | 05 000A3 | 0000 | N | | | |
| 142 | 05 000A5 | F401 | A | EVENT | 500,0,DPM@SMPL | |
| | 05 000A7 | 00 | A | | | |
| | 05 000A8 | 0000 | N | | | |
| 143 | 05 000AA | 0E02 | A | EVENT | 526,3,TRN4DTCK | |
| | 05 000AC | 03 | A | | | |
| | 05 000AD | 0000 | N | | | |
| 144 | 05 000AF | 1802 | A | EVENT | 539,0,DVLV@ØFF | TURN ØFF VAR DENS DEVELØPERS |
| | 05 000B1 | 00 | A | | | |
| | 05 000B2 | 0000 | N | | | |
| 145 | 05 000B4 | 5802 | A | EVENT | 600,0,BIL@PLØP | TEST FØR PLATEN ØPEN (BLG) |
| | 05 000B6 | 00 | A | | | |
| | 05 000B7 | 0000 | N | | | |
| 146 | 05 000B9 | 7602 | A | EVENT | 630,5,INVTRCTL | INVTR GATE & RETURN CØNTRØL |
| | 05 000BB | 05 | A | | | |
| | 05 000BC | 0000 | N | | | |
| 147 | 05 000BE | 8A02 | A | EVENT | 650,6,DECG@NØN | DECISIØN GATE FØR NØN-INVTD |
| | 05 000C0 | 06 | A | | | |
| | 05 000C1 | 0000 | N | | | |
| 148 | 05 000C3 | 9A02 | A | EVENT | 666,0,JAM@DLY | |
| | 05 000C5 | 00 | A | | | |
| | 05 000C6 | 0000 | N | | | |

TABLE II –Continued

```
05 000C8   BC02    A        EVENT    700,7,JAMS@NON        PAPER PATH JAM SW PITCH EVENT
05 000CA   07      A
05 000CB   0000    N
05 000CD   2003    A        EVENT    800,0,PROGMODE
05 000CF   00      A
05 000D0   0000    N
05 000D2   2203    A        EVENT    802,0,FSH@ENB
05 000D4   00      A
05 000D5   0000    N
05 000D7   5003    A        EVENT    848,0,DVB@VAR         TURN ON VARIABLE-BIAS DEVELOPER
05 000D9   00      A
05 000DA   0000    N
05 000DC   5203    A        EVENT    850,4,SRSK@EV         INIT SRSK & SRT MOTOR
05 000DE   04      A
05 000DF   0000    N
05 000E1   5403    A        EVENT    852,0,PECOFFEV        TURN OFF POST EXP. COROTRON
05 000E3   00      A
05 000E4   0000    N
05 000E6   8C03    A        EVENT    908,0,PECONEV         TURN ON POST EXP COROTRON
05 000E8   00      A
05 000E9   0000    N
05 000EB   8E03    A        EVENT    910,0,910@EV
05 000ED   00      A
05 000EE   0000    N
05 000F0   9003    A        EVENT    912,0,DGN@HCNT
05 000F2   00      A
05 000F3   0000    N
05 000F5   A703    A        EVENT    935,0,OVER@RUN
05 000F7   00      A
05 000F8   0000    N
                            ENDTABLE
```

TABLE III

```
                          *
                          *        VARIABLE PITCH EVENT TABLE
                          *
      00000001            FLSH@BSE EQU      1
      00000019            FO@ONBSE EQU      25
      00000064            FO@OFFBS EQU      100
05 00000  0100     A      ROM@FSH  DW       FLSH@BSE
05 00002  00       A               DB       0
05 00003  0000     N               DW       FSH@ON
05 00005  6400     A      ROM@OFF  DW       FO@OFFBS
05 00007  00       A               DB       0
05 00008  0000     N               DW       FO@OFF
05 0000A  1900     A      ROM@ON   DW       FO@ONBSE
05 0000C  00       A               DB       0
05 0000D  0000     N               DW       FO@ON
05 0000F  0100     A      ROM@FSHS DW       FLSH@BSE
05 00011  00       A               DB       0
05 00012  0000     N               DW       FSH@ON@S
05 00014  6400     A      ROM@OFFS DW       FO@OFFBS
05 00016  00       A               DB       0
05 00017  0000     N               DW       FO@OFF@S
05 00019  1900     A      ROM@ONS  DW       FO@ONBSE
05 0001B  00       A               DB       0
05 0001C  0000     N               DW       FO@ON@S
                          *
```

TABLE IV

```
      00000396              BASE@CNT SET      918                 #CLK CNTS/PITCH
      0000038E              SAFE@CNT SET      910                 MIN # CLK CNTS/PITCH
                            *
                            *        PITCH TABLE BUILDER
                            *
                            *        BUILD VARIABLE PITCH EVENT TABLE INTO RAM
                            *        FROM ROM DATA + REDUCTION ADJUST & FO TRIM
                            *
05 000FA   2A0000   N       TBLD@PRT LHLD     ROM@FSH             H&L= BASE CNT OF FLASH
05 000FD   EB       A                XCHG                         D&E= BASE CNT OF FLASH
05 000FE   2A9AFC   N                LHLD     1FLSH@ON            H&L= RED ADJ
05 00101   19       A                DAD      D                   H&L= BASE + ADJ
05 00102   2244FC   N                SHLD     RAM@FSH             RAM@FSH = BASE + ADJ
                            *
05 00105   2A0500   N                LHLD     ROM@OFF             H&L= BASE CNT OF FO OFF
05 00108   EB       A                XCHG                         D&E= BASE CNT OF FO OFF
05 00109   2A9CFC   N                LHLD     1FO@OFF             H&L= RED ADJ + TRIM ADJ
05 0010C   19       A                DAD      D                   H&L= BASE + ADJ
05 0010D   2249FC   N                SHLD     RAM@OFF             RAM@OFF = BASE + ADJ
                            *
05 00110   2A0A00   N                LHLD     ROM@ON              H&L= BASE CNT OF FO ON
05 00113   EB       A                XCHG                         D&E= BASE CNT OF FO ON
05 00114   2A9EFC   N                LHLD     1FO@ON              H&L= RED ADJ + TRIM ADJ
05 00117   19       A                DAD      D                   H&L= BASE + ADJ
05 00118   CDEA02   N                CALL     ON@MOD              CALL MOD ROUTINE TO MOD IF<0
05 0011B   224EFC   N                SHLD     RAM@ON              RAM@ON = RESULTS OF ABOVE
                            *
05 0011E   3A31F4   A                IF1      FLG,IMG@SFT,T       IS THERE IMAGE SHIFT
05 00121   07       A
05 00122   D25601   N
05 00125   3E06     A                    MVI      A,6             YES,# OF VAR EVENTS TO USE = 6
05 00127   47       A                    MOV      B,A             SET UP B-REG FOR LOOP CONTROL
05 00128   3262FA   N                    STA      TBLD@NUM        STORE # OF VAR EVENTS
05 0012B   3D       A                    DCR      A               SET UP # OF TIMES TO GO
05 0012C   3263FA   N                    STA      TBLD@TMP        THRU SORT
```

TABLE IV —Continued

```
                                 *
05 0012F     2A0F00    N              LHLD      ROMOFSHS              UPDATE ROMOFSHS TO
05 00132     EB        A              XCHG                            INCLUDE RED MODE ADJ + SHIFT
05 00133     2AA0FC    N              LHLD      2FLSHOON              ADJ AND SAVE FOR THE
05 00136     19        A              DAD       D                     IMAGE SHIFT
05 00137     2253FC    N              SHLD      RAMOFSHS              FLASH EVENT
                                 *
05 0013A     2A1400    N              LHLD      ROMOOFFS              UPDATE ROMOOFFS TO INCLUDE
05 0013D     EB        A              XCHG                            RED MODE ADJ + TRIM ADJ +
05 0013E     2AA2FC    N              LHLD      2FOOOFF               SHIFT ADJ AND SAVE
05 00141     19        A              DAD       D                     FOR THE IMAGE SHIFT
05 00142     2258FC    N              SHLD      RAMOOFFS              FADE OUT EVENT
                                 *
05 00145     2A1900    N              LHLD      ROMOONS               UPDATE ROMOONS TO INCLUDE
05 00148     EB        A              XCHG                            RED MODE ADJ + TRIM ADJ +
05 00149     2AA4FC    N              LHLD      2FOOON                SHIFT ADJ
05 0014C     19        A              DAD       D
05 0014D     CDEA02    N              CALL      ONOMOD                CALL MOD ROUTINE TO MOD IF <0
05 00150     2250FC    N              SHLD      RAMOONS               SAVE THE RESULTS
                                 *
05 00153     C36001    N         ELSE:
05 00156     3E03      A              MVI       A,3                   IF IMAGE SHIFT NOT SET
05 00158     47        A              MOV       B,A                   #OF VAR EVENTS TO USE = 3
05 00159     3262FA    N              STA       TBLDONUM              SET UP B=REG FOR LOOP CONTROL
05 0015C     3D        A              DCR       A                     STORE # OF VAR EVENTS & SETUP
05 0015D     3263FA    N              STA       TBLDOTMP              #OF TIMES TO GO THRU SORT
                                 ENDIF
                                 *
                                 *
                                 *    SUBROUTINE TO DETERMINE IF MODIFIED FO ON EVENT
                                 *    CLK COUNT IF CLK COUNT RESULTS ARE NEGATIVE OR 0
                                 *
05 002EA     7C        A    ONOMOD    MOV    A,H                      A= MS PART OF ABS CLK COUNT
05 002EB     07        A              RLC                             CARRY= SIGN OF ABS CLK COUNT
05 002EC     D20203    N              IF:    CC,C,S                   IS THE ABS CLK CNT NEG
05 002EF     119603    A                 LXI    D,BASEOCNT            YES,ADD # CLK COUNTS PER PITCH
05 002F2     19        A                 DAD    D                     TO NEG #
05 002F3     118E03    A                 IF:    XWRD,H,GE,SAFEOCNT    IS RESULTS GE SAFE # CLK/PITCH
05 002F6     CD0000    N
05 002F9     DAFF02    N
05 002FC     210100    A                    LXI    H,1                YES,MOVE TO TURN ON LATER
                                         ENDIF
05 002FF     C30E03    N              ORIF:  XWRD,H,EQ,0              IF RESULTS = 0, MOVE LATER IN
05 00302     110000    A
05 00305     CD0000    N
05 00308     C20E03    N
05 0030B     210100    A                 LXI    H,1                   PITCH BECUASE EVENT MUST BE > 0
                                      ENDIF
05 0030E     C9        A              RET
                                      END
CONTROL SECTION SUMMARY: 01 00000   PT 0   02 00000   PT 0   03 00000   PT 0   04 OFF08   PT 2
                         05 0030F   PT 1
* NO UNDEFINED SYMBOLS
*    ERROR SEVERITY LEVEL: 0
* NO ERROR LINES
```

TABLE V

```
                                 *
                                 *    SORTS VARIABLE RAM EVENT TABLE BY
                                 *    ABS CLK COUNT & LOWEST ENDS IN EVORAM
                                 *
                                 *    SORTS ONLY 1ST 3 IF NO IMAGE SHIFT, OTHERWISE SORTS ALL 6
                                 *
05 0017E     2144FC    N         LXI    H,EVORAM                      H&L= ADDR OF TOP OF VAR RAM TBL
05 00181     3A63FA    N         WHILE:  XBYT,TBLDOTMP,NE,0           TIMES TO GO THRU OUTER LOOP
05 00184     FE00      A
05 00186     CAFD01    N
05 00189     3253FA    N              STA     INOLPOCT                INTER LOOP CNT=OUTER LOOP CNT
05 0018C     3E80      A              SFLG    TBLDO1ST                SET 1ST FLAG FOR THIS POSITION
05 0018E     325EF4    A
05 00191     2252FB    N              SHLD    FIXOADDR                ADDR OF POSITION TO FULL
05 00194     B7        A              ORA     A                       CLEAR Z CONDITION BIT
05 00195     CAEF01    N              WHILE:  CC,Z,C
05 00198     5E        A                 MOV     E,M                  E= LS PART OF ABS CLK COUNT
05 00199     23        A                 INX     H
05 0019A     56        A                 MOV     D,M                  D= MS PART OF ABS CLK COUNT
05 0019B     D5        A                 PUSH    D                    STORE ABS CLK CNT OF FILL POS
05 0019C     3A5EF4    A                 IF:     FLG,TBLDO1ST,T       IS IT 1ST TIME FOR THIS POS
05 0019F     07        A
05 001A0     D2AE01    N
05 001A3     AF        A                    CFLG     TBLDO1ST         YES, CLEAR ITS FLAG
05 001A4     325EF4    A
05 001A7     23        A                    INX      H                AND INCREMENT
05 001A8     23        A                    INX      H                POINTER TO LS PART OF
05 001A9     23        A                    INX      H                ABS CLK COUNT OF NEXT
05 001AA     23        A                    INX      H                EVENT
05 001AB     C3B601    N                 ELSE:
05 001AE     2A5CFB    N                    LHLD     VAROADDR         H&L= ADDR
05 001B1     23        A                    INX      H                OF LS PART OF
05 001B2     23        A                    INX      H                ABS CLK COUNT TO
05 001B3     23        A                    INX      H                COMPARE TO FILL
05 001B4     23        A                    INX      H                POSITION
05 001B5     23        A                    INX      H
                                         ENDIF
05 001B6     225CFB    N                 SHLD    VAROADDR             STORE POINTER TO COMPARE EVENT
05 001B9     5E        A                 MOV     E,M                  E= LS PART OF COMPARE ABS CLK
05 001BA     23        A                 INX     H
```

TABLE V—Continued

```
05 001B8  56      A          MOV    D,M             D= MS PART OF COMPARE ABS CLK
05 001BC  E1      A          POP    H               H&L= ABS CLK COUNT OF FILL POS
05 001BD  EB      A          IF!    XWRD,D,LT,H     IS CLK OF COMPARE < FILL
05 001BE  CD0000  N
05 001C1  D2E501  N
05 001C4  2A5CFB  N             LHLD     VAR@ADDR       YES, SWITCH THE 2 EVENTS
05 001C7  EB      A             XCHG                    D&E= ADDR LOWER CLK VALUE
05 001C8  2A52FB  N             LHLD     FIX@ADDR       H&L= ADDR LARGER CLK VALUE
05 001CB  3EFB    A             MVI      A,-5           INITIALIZE LOOP COUNTER TO 5
05 001CD  3265FA  N             STA      TSW@NUM        WHICH = # OF ITEMS TO MOVE
05 001D0  B7      A             ORA      A              CLEAR Z CONDITION BIT
05 001D1  CAE501  N             WHILE!   CC,Z,C
05 001D4  1A      A                LDAX     D           A= CONTAINS OF COMPARE EVENT
05 001D5  46      A                MOV      B,M         B= CONTAINS OF FILL EVENT
05 001D6  77      A                MOV      M,A         UPDATE FILL POS
05 001D7  78      A                MOV      A,B         UPDATE COMPARE POS
05 001D8  12      A                STAX     D           WITH NEW VALUE
05 001D9  13      A                INX      D           MOVE POINTERS TO
05 001DA  23      A                INX      H           NEXT ITEM
05 001DB  3A65FA  N                LDA      TSW@NUM     INC MOVE
05 001DE  3C      A                INR      A           LOOP CONTROL
05 001DF  3265FA  N                STA      TSW@NUM     COUNTER
05 001E2  C3D101  N             ENDWHILE
                             ENDIF
05 001E5  2153FA  N          DECBYT   IN@LP@CT          DECRM INNER LOOP CNTR
05 001E8  35      A
05 001E9  2A52FB  N          LHLD     FIX@ADDR          H&L= ADDR OF FILL POSITION
05 001EC  C39501  N       ENDWHILE
05 001EF  110500  A       LXI      D,5                  MOVE H&L TO LOOK AT NEXT EVENT
05 001F2  19      A       DAD      D                    POSITION TO FILL
05 001F3  3A63FA  N       LDA      TBLD@TMP             DECREMENT # OF EVENTS
05 001F6  3D      A       DCR      A                    TO SORT
05 001F7  3263FA  N       STA      TBLD@TMP
05 001FA  C38101  N    ENDWHILE
```

TABLE VI

```
                            *
                            *   MOVE THE SR# & EVENT ADDR FROM ROM TABLE
                            *   TO RAM TABLE. MOVES ONLY THE FIRST 3 IF
                            *   NO IMAGE SHIFT, OTHERWISE MOVES ALL 6
                            *
05 00160  1144FC  N    LXI      D,RAM@FSH          D&E = ADDR OF RAM TABLE
05 00163  210000  N    LXI      H,ROM@FSH          H&L = ADDR OF ROM TABLE
05 00166  B0      A    ORA      B                  CLEAR Z CONDITION BIT
05 00167  CA7E01  N    WHILE!   CC,Z,C
05 0016A  23      A       INX      H               INCREMENT H&L AND D&E
05 0016B  23      A       INX      H               POINTERS OVER THE
05 0016C  13      A       INX      D               ABS CLK COUNT
05 0016D  13      A       INX      D
05 0016E  7E      A       MOV      A,M             LOAD A WITH SR#
05 0016F  12      A       STAX     D               STORE SR# IN RAM TABLE
05 00170  23      A       INX      H               MOVE POINTERS TO LS
05 00171  13      A       INX      D               ADDR OF EVENT
05 00172  7E      A       MOV      A,M             LOAD A WITH LS ADDR OF EVENT
05 00173  12      A       STAX     D               & STORE IT IN RAM TABLE
05 00174  23      A       INX      H               MOVE POINTERS TO MS
05 00175  13      A       INX      D               ADDR OF EVENT
05 00176  7E      A       MOV      A,M             MOVE MS ADDR OF EVENT
05 00177  12      A       STAX     D               TO RAM
05 00178  23      A       INX      H               MOVES POINTERS TO
05 00179  13      A       INX      D               LS PART OF ABS CLK COUNT
05 0017A  05      A       DCR      B               DECREMENT LOOP COUNTER
05 0017B  C36701  N    ENDWHILE
                            *
```

TABLE VII

```
                            *
                            *   MERGE VARIABLE PITCH EVENT TABLE & FIXED EVENT
                            *   TABLE CALCULATING THE REL DIFFERENCE WITH THE
                            *   RESULTS GOING INTO THE RUN EVENT TABLE
                            *
05 001FD  2A44FC  N    LHLD     EV@RAM             INITIALIZE VAR@CLK TO ABS CLK
05 00200  225EFB  N    SHLD     VAR@CLK            COUNT OF 1ST VAR PITCH EVENT
05 00203  2144FC  N    LXI      H,EV@RAM           INITIALIZE VAR@ADDR TO ADDR OF
05 00206  225CFB  N    SHLD     VAR@ADDR           1ST VAR PITCH EVENT
05 00209  211E00  N    LXI      H,EV@ROM           INITIALIZE FIX@ADDR TO ADDR OF
05 0020C  2252FB  N    SHLD     FIX@ADDR           1ST FIXED PITCH EVENT
05 0020F  3E80    A    SFLG     TBLD@1ST           NOTES 1ST EVENT TO RUN TABLE
05 00211  325EF4  A
05 00214  3E2C    A    MVI      A,TABLENUM         INITIALIZE TSW@NUM TO # OF
05 00216  3265FA  N    STA      TSW@NUM            EVENTS IN FIXED PITCH TABLE
05 00219  2A1E00  N    LHLD     EV@ROM             INITIALIZE D&E WITH ABS CLOCK
05 0021C  EB      A    XCHG                        COUNT OF 1ST FIXED EVENT
05 0021D  AF      A    CFLG     VAR@DONE           FLAG DENOTES VAR EVENTS
05 0021E  3259F4  A
05 00221  3A59F4  A    WHILE!   FLG,VAR@DONE,F     WHILE THERE ARE MORE VAR EVENTS
05 00224  07      A
05 00225  DA6F02  N
05 00228  2A5EFB  N       IF!      XWRD,VAR@CLK,LE,D     IS VAR CLK CNT <= FIXED CLK CNT
05 0022B  CD0000  N
05 0022E  DA3402  N
05 00231  C25902  N
05 00234  2A5CFB  N          LHLD     VAR@ADDR     YES, H&L= VAR EVENT ADDR
05 00237  CD9302  N          CALL     TBLD@UPD     PLACE VAR EVENT AT END RUN TBL
```

TABLE VII —Continued

```
339  05 0023A   3A62FA  N          LDA     TBLD@NUM            DECREMENT # OF
340  05 0023D   3D      A          DCR     A                   VARIABLE EVENTS LEFT
341  05 0023E   3262FA  N          STA     TBLD@NUM            TO MERGE
342  05 00241   C24C02  N          IF:     CC,Z,S              DID TBLD@NUM GO TO 0
343  05 00244   3E80    A             SFLG     VAR@DONE        YES,DENOTE NO MORE VAR EVENTS
     05 00246   3259F4  A
344  05 00249   C35602  N          ELSE:
345  05 0024C   225CFB  N             SHLD     VAR@ADDR        STORE ADDR OF NEXT VAR EVENT
346  05 0024F   5E      A             MOV      E,M             UPDATE VAR@CLK TO
347  05 00250   23      A             INX      H               VALUE OF ABS CLK COUNT
348  05 00251   56      A             MOV      D,M             OF PRESENT VARIABLE
349  05 00252   EB      A             XCHG                     EVENT
350  05 00253   225EFB  N             SHLD     VAR@CLK
351                                ENDIF
352  05 00256   C36602  N       ELSE:                          IF FIXED TABLE CLK COUNT IS
353  05 00259   2A52FB  N          LHLD    FIX@ADDR            LESS THEN VAR TABLE UPDATE THE
354  05 0025C   CD9302  N          CALL    TBLD@UPD            RUN TABLE WITH THAT EVENT
355  05 0025F   2252FB  N          SHLD    FIX@ADDR            UPDATE TO NEXT FIXED EVENT
356  05 00262   2165FA  N          LXI     H,TSW@NUM           DECREMENT # OF FIXED EVENTS
357  05 00265   35      A          DCR     M                   LEFT
358                             ENDIF
359  05 00266   2A52FB  N       LHLD    FIX@ADDR
360  05 00269   5E      A       MOV     E,M                    UPDATE D&L TO =
361  05 0026A   23      A       INX     H                      ABS CLK CNT VALUE
362  05 0026B   56      A       MOV     D,M                    OF PRESENT FIXED TABLE
363  05 0026C   C32102  N    ENDWHILE
364  05 0026F   3EFF    A    MVI     A,X'FF'                   CLEAR Z CONDITION
365  05 00271   B7      A    ORA     A                         BIT FOR LOOP
366  05 00272   2A52FB  N    LHLD    FIX@ADDR                  NO MORE VAR EVENTS, USE FIXED
367  05 00275   CA8402  N    WHILE:  CC,Z,C                    DONE WITH FIXED TABLE
368  05 00278   CD9302  N       CALL    TBLD@UPD
369  05 0027B   EB      A       XCHG
370  05 0027C   2165FA  N       LXI     H,TSW@NUM
371  05 0027F   35      A       DCR     M
372  05 00280   EB      A       XCHG
     05 00281   C37502  N    ENDWHILE
     05 00284   2A58FB  N    LHLD    P@TBL@A
375  05 00287   2B      A    DCX     H
376  05 00288   2B      A    DCX     H
377  05 00289   2B      A    DCX     H
378  05 0028A   2264FD  N    SHLD    EV@PTR:
379  05 0028D   3E80    A    SFLG    TBLD@FIN
     05 0028F   325DF4  A
380  05 00292   C9      A    RET
382                        *
383                        *  SUBROUTINE TO CALCULATE REL DIFFERENCE BETWEEN
384                        *  2 EVENTS & MOVE REST OF TABLE TO RUN TABLE
385                        *
386  05 00293   3A5EF4  A  TBLD@UPD IF:  FLG,TBLD@1ST,T            THIS IS THE FIRST EVENT
     05 00296   07      A
     05 00297   D2AF02  N
387  05 0029A   AF      A          CFLG    TBLD@1ST            YES, CLR FLAG TO KEEP OUT
     05 0029B   325EF4  A
388  05 0029E   7E      A          MOV     A,M                 A= LS OF 1ST EVENT ABS CLK CNT
389  05 0029F   3251FA  N          STA     EV@1@TIM            USED AT PITCH RESET
390  05 002A2   5F      A          MOV     E,A                 E=LS OF 1ST EVENT ABS CLK CNT
391  05 002A3   23      A          INX     H                   H&L=ADDR OF MS ABS CLK CNT
392  05 002A4   56      A          MOV     D,M                 D=MS OF 1ST EVENT ABS CLK CNT
393  05 002A5   EB      A          XCHG                        D&E= ADDR OF MS ABS CLK CNT
394  05 002A6   2256FB  N          SHLD    LCLK@CNT            STORE ABS CLK OF 1ST EVENT
395  05 002A9   21E8FE  N          LXI     H,EV@BASE!          H&L = ADDR OF RUN TABLE
396  05 002AC   C3D802  N       ELSE:
397  05 002AF   5E      A          MOV     E,M                 E=LS CLK CNT OF NEW EVENT
398  05 002B0   23      A          INX     H                   H&L= ADDR OF MS ABS CLK CNT
399  05 002B1   56      A          MOV     D,M                 D=MS CLK CNT OF NEW EVENT
400  05 002B2   E5      A          PUSH    H                   SAVE ADDR OF MS ABS CLK CNT
401  05 002B3   2A56FB  N          IF:     XWRD,LCLK@CNT,GE,D  IS LAST CLK CNT GE NEW CLK CNT
     05 002B6   CD0000  N
     05 002B9   DAC502  N
402  05 002BC   23      A             INX      H               H&L= LAST CLK CNT + 1
403  05 002BD   2256FB  N             SHLD     LCLK@CNT        STORE IT FOR NEXT TIME
404  05 002C0   3E01    A             MVI      A,1             PUT THIS EVENT AT THE NEXT CLK
405  05 002C2   C3CC02  N          ELSE:
406  05 002C5   45      A             MOV      B,L             B=LS CLK CNT OF LAST EVENT
407  05 002C6   EB      A             XCHG                     H&L=ABS CLK CNT OF NEW EVENT
408  05 002C7   2256FB  N             SHLD     LCLK@CNT        STORE IT FOR THE NEXT TIME
409  05 002CA   7D      A             MOV      A,L             A=LS CLK CNT OF NEW EVENT
410  05 002CB   90      A             SUB      B               FIND DIFF (ONLY NEED LS IF CLK
411                                ENDIF                       CNTS BETWEEN EVENTS <256)
412  05 002CC   D1      A          POP     D                   D&E=ADDR OF MS OF CLK OF NEW EV
413  05 002CD   2A58FB  N          LHLD    P@TBL@A             H&L= ADDR OF END OF LAST RUN EV
414  05 002D0   2B      A          DCX     H                   MOVE H&L POINTER
415  05 002D1   2B      A          DCX     H                   TO REL DIFF OF LAST
416  05 002D2   2B      A          DCX     H                   EVENT IN RUN TABLE
417  05 002D3   77      A          MOV     M,A                 MOVE REL DIFF TO RUN TABLE
418  05 002D4   23      A          INX     H                   INCREMENT RUN TABLE
419  05 002D5   23      A          INX     H                   POINTER OVER LAST
420  05 002D6   23      A          INX     H                   EVENT
421  05 002D7   23      A          INX     H
422                             ENDIF
423  05 002D8   23      A       INX     H                      H&L= ADDR OF SR# IN RUN TABLE
424  05 002D9   13      A       INX     D                      D&E= ADDR OF SR#
425  05 002DA   1A      A       LDAX    D                      MOVE SR# FROM TABLE TO
426  05 002DB   77      A       MOV     M,A                    RUN TABLE
427  05 002DC   23      A       INX     H                      MOVE POINTERS TO LS 8 BITS
428  05 002DD   13      A       INX     D                      OF EVENT ADDR
429  05 002DE   1A      A       LDAX    D                      MOVE LS 8 BITS OF ADDR
430  05 002DF   77      A       MOV     M,A
431  05 002E0   23      A       INX     H                      MOVES POINTER TO MS 8 BITS
432  05 002E1   13      A       INX     D                      OF EVENT ADDR
433  05 002E2   1A      A       LDAX    D                      MOVES MS 8 BITS OF ADDR
434  05 002E3   77      A       MOV     M,A
```

TABLE VII—Continued

```
05 002E4    2258FB   N          SHLD      P8TBL8A                         STORE ADDR OF RUN TABLE
05 002E7    13       A          INX       D                               POINTER TO LS 8 BITS OF CLK CNT
05 002E8    EB       A          XCHG                                      H&L= ADDR OF LS 8 BITS OF CLK
05 002E9    C9       A          RET
                       *
                       *        SUBROUTINE TO DETERMINE IF MODIFIED F8 ON EVENT
                       *        CLK COUNT IF CLK COUNT RESULTS ARE NEGATIVE OR 0
                       *
05 002EA    7C       A  ON8M0D  MOV       A,H                             A= MS PART OF ABS CLK COUNT
05 002EB    07       A          RLC                                       CARRY= SIGN OF ABS CLK COUNT
05 002EC    D20203   N          IF:       CC,C,S                          IS THE ABS CLK CNT NEG
05 002EF    119603   A             LXI       D,BASE8CNT                   YES,ADD # CLK COUNTS PER PITCH
05 002F2    19       A             DAD       D                            TO NEG #
05 002F3    118E03   A             IF:       XWRD,H,GE,SAFE8CNT           IS RESULTS GE SAFE # CLK/PITCH
05 002F6    CD0000   N
05 002F9    DAFF02   N
05 002FC    210100   A                LXI       H,1                       YES,MOVE TO TURN ON LATER
                                   ENDIF
05 002FF    C30E03   N          ORIF:     XWRD,H,EQ,0                     IF RESULTS = 0, MOVE LATER IN
05 00302    110000   A
05 00305    CD0000   N
05 00308    C20E03   N
05 0030B    210100   A             LXI       H,1                          PITCH BECUASE FVENT MUST BE > 0
                                ENDIF
05 0030E    C9       A          RET
                                END

CONTROL SECTION SUMMARY: 01 00000   PT 0     02 00000   PT 0     03 00000   PT 0     04 OFFD8   PT 2
                         05 0030F   PT 1
* NO UNDEFINED SYMBOLS
*    ERROR SEVERITY LEVEL: 0
* NO ERROR LINES
```

TABLE VIII

```
                       *
                       * PITCH RESET INTERRUPT HANDLER
                       *

06 000F9    FB       A  RSET:   EI                                        RE-ENABLE INTERRUPTS
06 000FA    F5       A          PUSH      PSW                             SAVE A-REG & CONDITION BITS
06 000FB    3A5DF4   A          IF:       FLG,TBLD8FIN,T                  IS PITCH TABLE BUILD FINISHED
06 000FE    07       A
06 000FF    D26201   N
06 00102    E5       A             PUSH      H                            SAVE H&L
                                   IF:       FLGS,SR8DONE,:               YES, IS THERE A NEW SR VALUE
06 00103    3A4DF4   A                       AND,9108DONE,T               YES, DID 910 EVENT GET DONE
06 00106    216FF4   A
06 00109    A6       A
06 0010A    F25501   N
06 0010D    AF       A                CFLG      9108DONE                  YES, RESET & MACH CLK TIMING OK
06 0010E    326FF4   A
06 00111    324DF4   A                MODFLG    SR8DONE                   CLR FLAG UNTIL NEXT SR EVENT
06 00114    2163FD   A                LXI       H,ADR(DATA,SR8PTR:)       LOAD RELATIVE
06 00117    7E       A                MOV       A,M                              PNTR TO SR #0
06 00118    C60F     A                MODBYT    A,ADD,15                  MOVE PNTR BACK
06 0011A    E66F     A                MODBYT    A,AND,SR8ADJ:                    BY 1 (CIRCULAR)
06 0011C    77       A                MOV       M,A                       SAVE NEW REL SR PNTR IN SR8PTR:
06 0011D    26FE     A                MVI       H,HADR(DATA,SHIFTREG)     H&L= ABS ADDR
06 0011F    6F       A                MOV       L,A                       '      OF SR #0
06 00120    3A69FD   A                LDA       ADR(DATA,SR8VALU:)        A= NEW SR VALUF FROM SRSK
06 00123    77       A                MOV       M,A                       UPDATE CONTENTS OF SR#0
06 00124    3A51FA   A                LDA       ADR(DATA,EV81STIM)        INIT MCLK:CNT
06 00127    326EFD   A                STA       ADR(DATA,MCLK:CNT)               TO 1ST EVENT TIME
06 0012A    21E8FE   A                LXI       H,ADR(DATA,EV8BASE:)      INIT EV8PTR:
06 0012D    2264FD   A                SHLD      ADR(DATA,EV8PTR:)                TO 1ST EVENT ADDR
                                      IF:       FLGS,NORM8ON:,:           IS NORMAL SHUTDOWN REQUESTED
                                                AND,CYCL8DN:,:            NO, IS CYCLE-DOWN REQUESTED
06 00130    3AABF4   A                          AND,SD18DLY,F             NO, IS PROC DEAD CYCLING
06 00133    21AAF4   A
06 00136    B6       A
06 00137    21AFF4   A
06 0013A    B6       A
06 0013B    FA5201   N
06 0013E    2166FD   A                   LXI       H,ADR(DATA,CYCUPCT:) NO, LOAD CYCLE-UP CNTR
06 00141    7E       A                   IF:       XBYT,M,NE,5         IS PROC IN CYCLE-UP MODE
06 00142    FE05     A
06 00144    CA5201   N
06 00147    FE04     A                      IF:       XBYT,A,EQ,4      YES, IS IT RDY TO MAKE 1ST IMG
06 00149    C25101   N
06 0014C    3E80     A                         SFLG      IMGMADE:      YES, SIGNAL 1ST IMAGE MADE
06 0014E    32ADF4   A
                                            ENDIF
06 00151    34       A                      INR       M                INCRM CYCLE-UP CNTR (UNTIL= 5)
                                         ENDIF
                                      ENDIF
06 00152    C36101   N             ELSE:                                  NEW SR VALUE NOT AVAILABLE
06 00155    3E80     A                SFLG      IMED8DN:                  REQUEST AN IMED SHUTDOWN
06 00157    32A9F4   A
06 0015A    2132FD   A                SFBIT,P   E8PR8FLT                  SIGNAL EARLY PITCH RESET FAULT
06 0015D    3E40     A
06 0015F    B6       A
06 00160    77       A
                                   ENDIF
06 00161    E1       A             POP       H                            RESTORE H&L
                                ENDIF
06 00162    3EFE     A          MVI       A,RSETFF:                       RESET PITCH RESET
06 00164    3200E6   A          STA       ADR(EQU,RSINTFF:)                      INT FLIP-FLOP
06 00167    F1       A          POP       PSW                             RESTORE A-REG & CONDITION BITS
06 00168    C9       A          RET                                       RETURN TO INTERRUPTED ROUTINE
```

TABLE IX

```
                                   *
                                   * MACHINE CLOCK INTERRUPT HANDLER
                                   *
      06 0002B                           ORIGIN   X'38'                          INTERRUPT TRAP CELL LOCATION

      06 00038    F5         A   MCLK:   PUSH     PSW                            SAVE A-REG & CONDITION CODES
      06 00039    3A6EFD     A           LDA      ADR(DATA,MCLK:CNT)             IS THERE
      06 0003C    3D         A           DCR      A                                   A PITCH
      06 0003D    C26600     N           IF:      CC,Z,S                                     EVENT TO DO
      06 00040    E5         A              PUSH     H                           YES, SAVE
      06 00041    D5         A              PUSH     D                                 ALL REMAINING
      06 00042    C5         A              PUSH     B                                          REGS
      06 00043    2A64FD     A              LHLD     ADR(DATA,EVOPTR1)           H&L= 1ST LOC OF NEXT PE TO DO
      06 00046    7E         A              MOV      A,M                         SAVE RELATIVE DIFFERENTIAL TO
      06 00047    326EFD     A              STA      ADR(DATA,MCLK:CNT)           NEXT EVENT (# CLOCK COUNTS)
      06 0004A    23         A              INX      H                           MOVE PNTR TO RFL SR IN TABLE
      06 0004B    3A63FD     A              LDA      ADR(DATA,SROPTR1)           LOAD REL POSITION OF SR #0
      06 0004E    86         A              MODBYT   A,ADD,M                     C= LS PORTION OF ADDR OF THE
      06 0004F    E66F       A              MODBYT   A,AND,SROADJ:                REQUESTED SHIFT REGISTER
      06 00051    4F         A              MOV      C,A                          POSITION (FOR USE WITHIN PE)
      06 00052    06FE       A              MVI      B,HADR(SHIFTREG)            B&C= ADDR REQUESTED SR POSITION
      06 00054    0A         A              LDAX     B                           A= <REQUESTED SR POSITION>
      06 00055    23         A              INX      H                           E= LS PORTION OF ADDR OF THE
      06 00056    5E         A              MOV      E,M                          REQUESTED PITCH EVENT
      06 00057    23         A              INX      H                           D= MS PORTION OF ADDR OF THE
      06 00058    56         A              MOV      D,M                          REQUESTED PITCH EVENT
      06 00059    23         A              INX      H                           SAVE PNTR TO
      06 0005A    2264FD     A              SHLD     ADR(DATA,EVOPTR1)                  NEXT PITCH EVENT
      06 0005D    CD0000     N              CALL     DE:IND                      VECTOR TO REQUESTED PITCH EVENT
      06 00060    C1         A              POP      B                           RESTORE
      06 00061    D1         A              POP      D                                  SAVED
      06 00062    E1         A              POP      H                                       REGISTERS
      06 00063    C37000     N           ELSE:
      06 00066    326EFD     A              STA      ADR(DATA,MCLK:CNT)          NO PE, SAVE DECRM'D 'MCLK:CNT'
      06 00069    0F         A              RRC                                  IS IT TIME FOR
      06 0006A    D27000     N              IF:      CC,C,S                                 A REFRESH
      06 0006D    3202E6     A                 REFRESH                           YES, REFRESH REMOTES (1 MSEC)
                                            ENDIF
                                         ENDIF
      06 00070    FB         A           EI                                      RE-ENABLE INTERRUPT SYSTEM
      06 00071    3EFD       A           MVI      A,MCLKFF:                      RESET MCLK
      06 00073    3200E6     A           STA      ADR(EQU,RSINTFF1)                    INTERRUPT FLIP-FLOP
      06 00076    F1         A           POP      PSW                            RESTORE A-REG & CONDITION CODES
      06 00077    C9         A           RET                                     RETURN TO INTERRUPTED ROUTINE
```

TABLE X

```
                                   *
                                   * REAL TIME CLOCK INTERRUPT HANDLER
                                   *
      06 00081    FB         A   RTC:    EI                                      RE-ENABLE INTERRUPTS
      06 00082    F5         A           PUSH     PSW                            SAVE A-REG & CONDITION BITS
      06 00083    3EF7       A           MVI      A,RTCFF:                       RESET RTC
      06 00085    3200E6     A           STA      ADR(EQU,RSINTFF1)                    INTERRUPT FLIP-FLOP
      06 00088    D5         A           PUSH     D                              SAVE D&E REGS
      06 00089    E5         A           PUSH     H                              SAVE H&L REGS
      06 0008A    C5         A           PUSH     B                              SAVE 'B' REGISTER
                                   *
      06 0008B    2150FD     N           DECBYT   GLB:TIMR                       DECREMENT THE CLOCK CELL
      06 0008E    35         A
      06 0008F    7E         A           MOV      A,M                            A = <GLB:TIMR>  ( 0 TO 255 )
      06 00090    23         A           INX      H                              MEM. PTR. TO SR:RQST BYTE
      06 00091    E601       A           IF:      XBYT,A,AND,X'01',NZ            IS IT 20 MSEC TIME YET
      06 00093    CA9D00     N
      06 00096    7E         A              MODBYT   M,OR,10:RQST|20:RQST        YES - BOTH 10 AND 20 BKGD
      06 00097    F6C0       A
      06 00099    77         A
      06 0009A    C3A100     N           ELSE:
      06 0009D    7E         A              MODBYT   M,OR,10:RQST                NO - 10 BKGD ONLY
      06 0009E    F680       A
      06 000A0    77         A
                                         ENDIF
      06 000A1    23         A           INX      H                              MEM. PTR. TO DIVD:10 CNTR
      06 000A2    35         A           DCR      M                              DECREMENT 10 TO 0 COUNTER
      06 000A3    C2AD00     N           IF:      CC,Z,S                         HAS 100 MSEC PASSED
      06 000A6    360A       A              MVI      M,10                        YES - RESET THE 10 TO 0 COUNTER
      06 000A8    2B         A              DCX      H                           MEM. PTR. BACK TO SB:RQST
      06 000A9    7E         A              MODBYT   M,OR,100:RQST               ADD 100 BKGD TO REQUEST BYTE
      06 000AA    F620       A
      06 000AC    77         A
                                         ENDIF
                                         REPEAT:                                 NOW CHECK FOR TIME OUTS
      06 000AD    2150FD     N              LXI      H,GLB:TIMR                  LOAD 'B' WITH QUANTITY TO LOOK
      06 000B0    46         A              MOV      B,M                         FOR (CLOCK CELL VALUE)
      06 000B1    16FB       A              MVI      D,COUNT:                    SET 'D' FOR TABLE TO SEARCH
      06 000B3    CD0000     N              CALL     FIND:LOC                    GO LOOK IN ACTIVE LIST
      06 000B6    CAF000     N              IF:      CC,Z,C                      HAS A MATCH BEEN FOUND
      06 000B9    E5         A                 PUSH     H                        YES - SAVE LOCATION ON STACK
      06 000BA    26FC       A                 MVI      H,ID:                    SEGWAY MEM PTR TO ID: TABLE
      06 000BC    5E         A                 MOV      E,M                      NOW ASSEMBLE
      06 000BD    1600       A                 MVI      D,0                      ADDRESS OF TIMER
      06 000BF    21C8F4     A                 LXI      H,TMR:FLGS               FLAG INTO THE
      06 000C2    19         A                 DAD      D                        MEMORY POINTER
      06 000C3    0600       A                 MVI      B,0                      GET SET TO CLEAR THE FLAG
```

TABLE X -Continued

```
06 000C5   F3       A       DI                    NO INTERRUPTIONS NOW, PLEASE
06 000C6   7E       A       MOV      A,M          GET FLAG
06 000C7   07       A       RLC                   INTO THE CARRY BIT
06 000C8   D2EC00   N       IF!      CC,C,S       IS FLAG SET
06 000CB   70       A         MOV      M,B        YES - FESET AND NOW
06 000CC   FB       A         EI                  EVERYBODY CAN INTERRUPT AGAIN
06 000CD   E1       A         POP      H          LOCATION FROM STACK TO MEM PTR
06 000CE   26FD     A         MVI      H,LS!ADDR  SEGWAY MEM PTR TO LS! TABLE
06 000D0   5E       A         MOV      E,M        GET LS TIME-OUT ADDRESS
06 000D1   24       A         INR      H          SEGWAY MEM PTR TO MS! TABLE
06 000D2   56       A         MOV      D,M        GET MS TIME-OUT ADDRESS
06 000D3   45       A         MOV      B,L        LOCATION TO 'B' TEMPORARILY
06 000D4   2A5FFD   N         LHLD     INPTR!     STUFF TIME-OUT ADDRESS INTO
06 000D7   73       A         MOV      M,E        INTO TABLE OF TIME-OUT
06 000D8   23       A         INX      H          ADDRESSES THAT IS CHECKED
06 000D9   72       A         MOV      M,D        FOR ENTRIES EVERY 10 MSECONDS
06 000DA   23       A         INX      H          BY THE STATE CHECKER
06 000DB   7D       A         MODBYT   L,AND,TIME!MSK  FORCE A CIRCULAR TABLE
06 000DC   E62F     A
06 000DE   6F       A
06 000DF   225FFD   N         SHLD     INPTR!     SAVE NEW ADDRESS LOCATION
06 000E2   58       A         MOV      E,B        LOCATION BACK TO 'E'
06 000E3   CD0000   N         CALL     DEACTIV!   TAKE OUT OF ACTIVE TIMER LIST
06 000E6   CD0000   N         CALL     PUT!       AND MAKE LOCATION AVAILABLE
06 000E9   C3EE00   N       ELSE!                 * * * FLAG IS NOT SET SO
06 000EC   FB       A         EI                    LET INTERRUPTIONS OCCUR
06 000ED   E1       A         POP      H            MAKE THE STACK RIGHT AND
                            ENDIF                   FORCE NON-ZERO CONDITION TO
06 000EE   F601     A       MODBYT   A,OR,1         STAY IN UNTIL LOOP
                          ENDIF                   * * * NO MATCH - RTC COMPLETE
06 000F0   C2AD00   N     UNTIL!   CC,Z,S         WILL FALL THROUGH THIS CRACK
                  *
06 000F3   E1       A     POP      H              RESTORE THE
06 000F4   44       A     MOV      B,H            'B' REGISTER
06 000F5   E1       A     POP      H              RESTORE H&L REGS
06 000F6   D1       A     POP      D              RESTORE D&E REGS
06 000F7   F1       A     POP      PSW            RESTORE A-REG & CONDITION CODES
06 000F8   C9       A     RET                     RETURN TO 'FLOAT' BACKGROUND
                  *
```

TABLE XI

PART I

```
                  ****************************************************************
                  * STAND-BY FRONT PANEL SWITCH SCAN (NOT READY & READY STATES) *
                  ****************************************************************

05 00000   3A57FA   N     IF!      XBYT,MINIBYTE,EQ,0
05 00003   FE00     A
05 00005   C22600   N
05 00008   1E05     A       MVI      E,5             E= # INPUTS TO READ (6 BYTES)
05 0000A   2168FC   N       LXI      H,PREV@IN+6     H&L= 'PRIOR READ' TABLE (+1)
05 0000D   E5       A       PUSH     H               SAVE ADDR ON STACK
                            REPEAT                   LOOP 'UNTIL' 6 BYTES TESTED
05 0000E   7B       A         MOV      A,E           A= 5, 4, 3, 2, 1, OR 0
05 0000F   07       A         RLC                    MULTIPLE
05 00010   07       A         RLC                         A-REG
05 00011   07       A         RLC                           BY 8
05 00012   C607     A         MODBYT   A,ADD,X'07'   A= X'2F TO 07' (LOW INPUT ADDR)
05 00014   6F       A         RIBYT    A             READ PROPER FRONT PANEL IN BYTE
05 00015   CD0000   N
05 00018   E1       A         POP      H             H&L= ADDR OF 'PRIOR READ' BYTE
05 00019   2B       A         DCX      H             MOVE TO NEXT BYTE IN TABLE
05 0001A   E5       A         PUSH     H             SAVE FOR NEXT TIME AROUND LOOP
05 0001B   CD7D00   N         CALL     SWS@SCAN
05 0001E   1D       A         DCR      E             DECRM LOOP CNTR(5 TO-1)
05 0001F   F20E00   N       UNTIL!   CC,S,S
05 00022   E1       A       POP      H
                  **************************************************************
                  * ACTIVE SWITCHES FOR STAND-BY (NOT READY & READY STATES)    *
                  **************************************************************
05 0009E   0000     N                     C,00   DIGIT@IN     DIGIT 1
05 000A0   0000     N                     C,01   DIGIT@IN     DIGIT 2
05 000A2   0000     N                     C,02   DIGIT@IN     DIGIT 3
05 000A4   0000     N                     C,03   DIGIT@IN     DIGIT 4
05 000A6   0000     N                     C,04   DIGIT@IN     DIGIT 5
05 000A8   0000     N                     C,05   DIGIT@IN     DIGIT 6
05 000AA   0000     N                     C,06   DIGIT@IN     DIGIT 7
05 000AC   0000     N                     C,07   DIGIT@IN     DIGIT 8
                  *
05 000AE   0000     N                     C,08   DIGIT@IN     DIGIT 9
05 000B0   0000     N                     C,09   KYBD@O       DIGIT 0
05 000B2   0000     N                     C,10   RECALL@
05 000B4   0000     N                     C,11   @CLEAR       CLEAR
05 000B6   0000     N                     C,12   IMAG@SFT     IMAGE SHIFT
05 000B8   9301     N                     C,13   SPARE
05 000BA   0000     N                     C,14   STRT@PRT     START PRINT
05 000BC   0000     N                     C,15   STOP@PRT     STOP PRINT
                  *
05 000BE   0000     N                     C,16   VAR@DENS     VARIABLE DENSITY
05 000C0   0000     N                     C,17   AX@TRAY      AUX TRAY
05 000C2   9301     N                     C,18   SPARE
05 000C4   9301     N                     C,19   SPARE
05 000C6   9301     N                     C,20   SPARE
```

TABLE X —Continued

```
05 000C8    0000   N                              C,21    PEC@ØN      PASTE UP SUPPRESSIØN
05 000CA    0000   N                              C,22    2SD@CPY     2 SIDED CØPY
05 000CC    9301   N                              C,23    SPARE
                     *
05 000CE    9401   N                              C,24    RX
05 000D0    9401   N                              C,25    RX
05 000D2    9401   N                              C,26    RX
05 000D4    9401   N                              C,27    RX
05 000D6    0000   N                              C,28    98@REDN     98% REDUCTIØN
05 000D8    0000   N                              C,29    74@REDN     74% REDUCTIØN
05 000DA    0000   N                              C,30    65@REDN     65% REDUCTIØN
05 000DC    0000   N                              C,31    RX@ZØØM     RANK ZØØM LENS
                     *
05 000DE    0000   N                              C,32    ADH@JREC    ADH JØB RECØVERY
05 000E0    0000   N                              C,33    ADH@MULT    ADH MULTIPLE FEED
05 000E2    0000   N                              C,34    ADH@SGNL    ADH SINGLE FEED
05 000E4    9401   N                              C,35    RX
05 000E6    0000   N                              C,36    SRT@JØBS    SØRTER JØB SUPPLEMENT
05 000E8    0000   N                              C,37    SRT@SETS    SØRTER SETS
05 000EA    0000   N                              C,38    SRT@STKS    SØRTER STACKS
05 000EC    9301   N                              C,39    SPARE
                     *
05 000EE    9301   N                              C,40    SPARE
05 000F0    9301   N                              C,41    SPARE
05 000F2    9301   N                              C,42    SPARE
05 000F4    9301   N                              C,43    SPARE
05 000F6    0000   N                              C,44    SERVICE     TECH REP KEY SWITCH
05 000F8    0000   N                              C,45    FAULT@CD    DISPLAY FAULT CØDE
05 000FA    0000   N                              C,46    LVDGNPRG    LEAVE DIAGNØSTIC PRØGRAM
05 000FC    9301   N                              C,47    SPARE
```

TABLE XI

PART II

```
                     ************************************
                     * ACTIVE SWITCHES FØR PRINT STATE *
                     ************************************
05 000FE    0000   N                              C,48    RECALL@     RECALL QUANTITY
05 00100    0000   N                              C,49    ADH@PMUL    ADH MULTIPLE FEED
05 00102    0000   N                              C,50    ADH@PSIN    ADH SINGLE FEED
05 00104    9301   N                              C,51    SPARE
05 00106    0000   N                              C,52    SMPL@CPY    SAMPLE CØPY (START PRINT)
05 00108    0000   N                              C,53    PRT@STØP    STØP PRINT
05 0010A    0000   N                              C,54    CNTR@RST    DIAGNØSTIC CØUNTER RESET
05 0010C    0000   N                              C,55    AX@PRNT     AUX TRAY
```

TABLE XI

PART III

```
                     ****************************************
                     * PRINT STATE FRØNT PANEL SWITCH SCAN *
                     ****************************************
         05 00156    PRT@SWS  EQU      $
         05 00156    RUNN@SWS EQU      $
05 00156    3A57FA   N          IF1      XBYT,MINIBYTE,EQ,0
05 00159    FE00     A
05 0015B    C28301   N
05 0015E    2E0C     A            RIBYT     KYBD#BY2-3       READ CLEAR(D7),,STØP PRT,
05 00160    CD0000   N
05 00163    E6A3     A            MØDBYT    A,AND,X'A3'      START PRT, AS A BYTE
05 00165    07       A            RLC
05 00166    5F       A            MØV       E,A              SAVE TEMPØRARILY IN E-REG
05 00167    2E27     A            RIBYT     KYBD#BYT4        READ 'ADH#SNGL' & 'ADH#MULT'
05 00169    CD0000   N
05 0016C    0F       A            RRC                        MERGE WITH
05 0016D    E630     A            MØDBYT    A,AND,X'30'                 1ST BYTE
05 0016F    B3       A            MØDBYT    E,ØR,A                             READ
05 00170    5F       A
05 00171    2E16     A            RIBIT     AX#TRAY          READ 'AX#TRAY' BIT
05 00173    CD0000   N
05 00176    7B       A            MØV       A,E               AND MERGE WITH 2
05 00177    17       A            RAL                         PREVIØUS BYTE READS
05 00178    1EE6     A            SWSPØINT   48
05 0017A    2162FC   N            LXI       H,PREV@IN        H&L= ADDR (PRIØR READ' BYTE
05 0017D    CD7D00   N            CALL      SWS@SCAN         &INPUT SW BYTE DECØDE SUBR
```

TABLE XI —Continued

```
                                  ****************************************************************************
                                  * COMMON SWITCH SCAN SUBR.  ENTER WITH SWITCH BYTE IN A-REG (FROM BIT OR BYTE  *
                                  *   FILTERING SUBROUTINES), ADDR OF PRIOR SWITCH CONDITION BYTE IN MEMORY (H&L *
                                  *   REGS), AND E-REG SET TO SWITCH BYTE (AND 'CASE'' GROUP) NUMBER (5 TO 0).   *
                                  ****************************************************************************

05 0007D  47      A  SWS@SCAN MOV      B,A                        B= LATEST 'READ' DATA
05 0007E  7E      A           MOV      A,M                        A= PRIOR 'READ' DATA
05 0007F  70      A           MOV      M,B                        UPDATE 'PRIOR' TO 'LATEST'
05 00080  A8      A           MODBYT   A,XOR,B                    A= 1 WHERE SWS JUST CHANGED
05 00081  A0      A           IF!      XBYT,A,AND,B,NZ            WERE ANY SWS JUST PUSHED
05 00082  CA5501  N
05 00085  26FF    A              MVI      H,X'FF'                 YES, INIT BIT POSITION CNTR
                                 REPEAT                           LOOP 'UNTIL' NO BITS= 1 IN BYTE
05 00087  24      A                 INR      H                    H= POSITION OF SW (D0 TO D7)
05 00088  17      A                 RAL                           PUT SW INFO INTO 'C' BIT
05 00089  D25101  N                 IF!      CC,C,S               HAS THIS SW JUST BEEN PUSHED
05 0008C  F5      A                    PUSH     PSW               YES, SAVE
05 0008D  D5      A                    PUSH     D                          REGS OVER
05 0008E  E5      A                    PUSH     H                                   'CASE!'
05 0008F  7B      A                    MOV      A,E               RELOAD 'BYTE #' CNTR
05 00090  E61F    A                    ANI      X'1F'             ELLIM.POSS.OF POSITIVE #
05 00092  07      A                    RLC                        MULTIPLE
05 00093  07      A                    RLC                                  A-REG
05 00094  07      A                    RLC                                       BY 8
05 00095  84      A                    CASE!    XBYT,A,ADD,H      USE BYTE # & BIT # AS A PNTR
05 00096  114E01  N
05 00099  FE58    A
05 0009B  CD0000  N
```

TABLE XII

```
                                  ****************************************************************************
                                  * SAMPLE COPY SUBROUTINE (SMPL@CPY) IS CALLED IN PRINT OR SYSTEM RUN NOT PRINT *
                                  * MODES WHEN THE PRINT BUTTON IS DEPRESSED. CALLED BY SWITCH SCAN            *
                                  ****************************************************************************

05 00412  3AE2FF  A  SMPL@CPY IF!      OBIT,SMPL@CPY,T            IS SAMPLE COPY ENABLED
05 00415  E601    A
05 00417  CA2204  N
05 0041A  3E80    A              SFLG     SMPL@FLG                IF YES SET FLAG FOR SRSK
05 0041C  324CF4  A
05 0041F  C37804  N           ORIF!    OBIT,READY$,F              IS MACHINE READY
05 00422  3AE7FF  A
05 00425  E601    A
05 00427  C22D04  N
05 0042A  C37804  N           ORIF!    FLG,JB@INCMP,F             IS JOB COMPLETE
05 0042D  3A32F4  A
05 00430  07      A
05 00431  DA3A04  N
05 00434  CD7904  N              CALL     RESTART                 YES RESTART
05 00437  C37804  N           ORIF!    FLG,FLH@CMP,F              IS FLASHING COMPLETE
05 0043A  3AA1F4  A
05 0043D  07      A
05 0043E  DA7304  N
05 00441  3A9DF4  A              IF!      FLG,AXUP@MEM,T          HAS AUX TRAY BEEN REQUESTED UP
05 00444  07      A
05 00445  D25E04  N
05 00448  3ADDF4  A                 IF!      TIMR,AX@DLY,Z        IS PAT AND SETTLING COMPLETE
05 0044B  07      A
05 0044C  DA5204  N
05 0044F  CD0000  N                    CALL     AX@UPPRO          GET AUX TRAY UP
                                    ENDIF
05 00452  3E80    A                 SFLG     AXUP@REQ
05 00454  329EF4  A
05 00457  AF      A                 CFLG     AXUP@MEM             ACKNOWLEDGE AUX UP REQUESTED
05 00458  329DF4  A
05 0045B  3266FD  N                 STA      CYCUPCT!             FORCE A LONG CYCLE UP FOR AUX
                                 ENDIF
05 0045E  3AAFF4  A              IF!      FLG,SO1@DLY,T           IS MACHINE DELIVERING SIDE 1'S
05 00461  07      A
05 00462  D26D04  N
05 00465  3E80    A                 SFLG     STRT@MEM             YES REMEMBER TO RESTART
05 00467  325AF4  A
05 0046A  C37004  N              ELSE!
05 0046D  CD7904  N                 CALL     RESTART              YES RESTART
                                 ENDIF
05 00470  C37804  N           ELSE!
05 00473  3E80    A              SFLG     STRT@MEM                NO REMEMBER TO RESTART WHEN
05 00475  325AF4  A
                     *                                            DELIVERY IS COMPLETE
                              ENDIF
05 00478  C9      A           RET
                     ****************************************************************************

05 00479  AF      A  RESTART  CFLG     NORM@DN!                   RESTART FLASHING
05 0047A  32ABF4  A
05 0047D  32ACF4  A           MODFLG   QWIK!OUT                   CANCEL QUICK CYCLE OUT
05 00480  2167FD  N           LXI      H,NOIMGCT!                 IF NO IMAGE COUNTER IS GREATER
05 00483  7E      A           MOV      A,M                        THAN 5 SUBTRACT 5 FROM IT TO
05 00484  D605    A           SUI      5                          PREVENT THE MACHINE FROM
05 00486  FA9204  N           IF!      CC,S,C                     STOPPING BEFORE CYCUPCT! GETS
                     *                                            TO 5
```

TABLE XII —Continued

```
530   05 00489   47       A         MOV     B,A                      SAVE A REG
531   05 0048A   3AAFF4   A         IF:     FLG,SD1DDLY,F            IF SIDE 1 DELAY IS FINISHED
      05 0048D   07       A
      05 0048E   DA9204   N
532   05 00491   70       A              MOV     M,B                 PUSH NO IMAGE DOWN BY 5
533                                    ENDIF
534                                 ENDIF
535   05 00492   C9       A         RET
```

TABLE XIII

```
16                            *         SHIFT REGISTER SCHEDULER
17                            *
18                            *         PRINT STATE BACKGROUND
19                            *
20    05 00000   3A4CF4   A   SRSK      IF:     FLG,SMPLOFLG,T               IS IT A SAMPLE COPY
      05 00003   07       A
      05 00004   D27300   N
21    05 00007   2169FD   N                LXI     H,SROVALU:               INITIALIZE H&L AS POINTER
22    05 0000A   3602     A                MVI     M,SRSMPL:                CLR SROVALU: & SET SAMPLE COPY
23    05 0000C   3A4BF4   A                IF:     FLG,SMPLOACT,F           IS IT THE START OF THE SEQ
      05 0000F   07       A
      05 00010   DA3900   N
24    05 00013   3E80     A                   SFLG     SMPLOACT             YES, SET INDICATOR
      05 00015   324BF4   A
25    05 00018   3A54F4   A                   IF:      FLG,SRTOSEL,T        CHECK FOR COPIES BEING INVERTED
      05 0001B   07       A
      05 0001C   D23100   N
26    05 0001F   3A41F4   A                   ANDIF:   FLG,2SDOFLAG,T       IF THEY ARE START SMPLOCT: AT 0
      05 00022   07       A
      05 00023   D23100   N
27    05 00026   3A4AF4   A                   ANDIF:   FLG,SIDEO1,F         TO PUT 2 HOLES IN FRONT OF THE
      05 00029   07       A
      05 0002A   DA3100   N
28    05 0002D   AF       A                      XRA      A                 SAMPLE COPY
29    05 0002E   C33300   N                   ELSE:
30    05 00031   3E01     A                      MVI      A,1               IF NOT INVERTED COPIES START
31                                            ENDIF                         SMPLOCT: AT 1
32    05 00033   3268FD   N                   STA      SMPLOCT:
33    05 00036   C37000   N                ELSE:
34    05 00039   3A68FD   N                   MODBYT   SMPLOCT:,ADD,1       INCREMENT SAMPLE COPY SEQ COUNT
      05 0003C   C601     A
      05 0003E   3268FD   N
35    05 00041   FE02     A                   IF:      XBYT,A,EQ,2          DOES SMPLOCT: = 2
      05 00043   C25E00   N
36    05 00046   CD2301   N                      CALL     IMAGEOCK          YES, CHECK TO SEE IF OK FOR IMG
37    05 00049   7E       A                      IF:      XBYT,M,AND,SRIMG:,Z WAS IMAGE BIT SET
      05 0004A   E601     A
      05 0004C   C25700   N
38    05 0004F   3E01     A                         MVI      A,1            NO
39    05 00051   3268FD   N                         STA      SMPLOCT:       PUSH SAMPLE COPY SEQ BACK TO 1
40    05 00054   C35800   N                      ELSE:
41    05 00057   AF       A                         XRA      A              ZERO NO IMAGE COUNTER BECAUSE
42    05 00058   3267FD   N                         STA      NOIMGCT:       THERE WAS AN IMAGE
43                                               ENDIF
44    05 0005B   C37000   N                   ORIF:    XBYT,A,EQ,3          LOOK FOR END OF SAMPLE COPY SEQ
      05 0005E   FE03     A
      05 00060   C27000   N
45    05 00063   AF       A                      CFLG     SMPLOFLG          IT IS THE END
      05 00064   324CF4   A
46    05 00067   324BF4   A                      MODFLG   SMPLOACT          DENOTE END OF SAMPLE
47    05 0006A   3268FD   N                      STA      SMPLOCT:          O SAMPLE COPY SEQ COUNTER
48    05 0006D   2169FD   N                      LXI      H,SROVALU:        & RESTORE H&L BACK TO RIGHT ADD
49                                            ENDIF
50                                         ENDIF                            END OF SAMPLE COPY
51    05 00070   C39600   N         ELSE:                                   CHECK FOR IMAGE W/O SAMPLE COPY
52    05 00073   2169FD   N            LXI     H,SROVALU:                   INITIALIZE H&L AS POINTER
53    05 00076   AF       A            XRA     A
54    05 00077   77       A            MOV     M,A
55    05 00078   3268FD   N            STA     SMPLOCT:
56    05 0007B   324BF4   A            MODFLG  SMPLOACT
57    05 0007E   CD2301   N            CALL    IMAGEOCK                     CHECKS TO SEE IF IMAGE IS ALLOW
58    05 00081   7E       A            IF:     XBYT,M,AND,SRIMG:,Z          IS IMAGE ALLOW
      05 00082   E601     A
      05 00084   C29200   N
59    05 00087   3A67FD   N               MODBYT   NOIMGCT:,ADD,1           NO, INC #OF NO IMAGES W/O H&L
      05 0008A   C601     A
      05 0008C   3267FD   N
60    05 0008F   C39600   N            ELSE:
61    05 00092   AF       A               XRA      A                        SINCE IMAGE IS ALLOWED
62    05 00093   3267FD   N               STA      NOIMGCT:                 O # OF NO IMAGES
63                                     ENDIF
64                                  ENDIF                                   DONE WITH IMAGE BIT
65    05 00096   3A67FD   N         IF:     XBYT,NOIMGCT:,LT,2              IF THE # OF NO IMAGE LESS THAN
      05 00099   FE02     A
      05 0009B   D2A200   N
66    05 0009E   7E       A            MODBYT   M,OR,SRLOAD:                2 SET LOAD BIT
      05 0009F   F610     A
      05 000A1   77       A
67                                  ENDIF
68    05 000A2   3A54F4   A         IF:     FLG,SRTOSEL,T                   IS SRT SELECTED
      05 000A5   07       A
      05 000A6   D2AD00   N
69    05 000A9   7E       A            MODBYT   M,OR,SRSRT:                 YES, SET 'SORTER' BIT IN SR
      05 000AA   F620     A
      05 000AC   77       A
```

TABLE XIII —Continued

```
                                 ENDIF
05 000AD   3A41F4   A            IF:      FLG,2SD@FLAG,F                IS IT 2 SIDED CØPYING
05 000B0   07       A
05 000B1   DAC600   N
05 000B4   AF       A               CFLG     SD1@TIMØ                   SIGNAL CØPIES NØT GØING TØ AUX
05 000B5   32AEF4   A
05 000B8   3ACDF4   A               IF:      FLG,AX@FLAG,F              SIMPLEX  IS AUX TRAY SELECTED
05 000BB   07       A
05 000BC   DAC300   N
05 000BF   7E       A                  MØDBYT   M,ØR,SRFDR:             NØ, SØ SET 'MAIN FEEDER' BIT
05 000C0   F608     A
05 000C2   77       A
                                    ENDIF
05 000C3   C30A01   N            ØRIF:    FLG,SIDE@1,T                  2 SD CØPY, IS IT SIDE 1
05 000C6   3A4AF4   A
05 000C9   07       A
05 000CA   D2EA00   N
05 000CD   AF       A               CFLG     SD1@TIMØ                   ASSUME CØPIES NØT GØING TØ AUX
05 000CE   32AEF4   A
05 000D1   7E       A               MØDBYT   M,ØR,SRSD1!!SRFDR!         YES, SET SIDE 1 & MAIN FEEDER
05 000D2   F60C     A
05 000D4   77       A
05 000D5   3A23F4   A               IF:      FLG,ØDD@LAST,F             IS IT ØDD LAST
05 000D8   07       A
05 000D9   DAE700   N
05 000DC   3E80     A                  SFLG     SD1@TIMØ                NØ, CØPIES GØING TØ AUX TRAY
05 000DE   32AEF4   A
05 000E1   7E       A                  MØV      A,M                     SET INDICATIØN FØR CYCLE DN
05 000E2   F640     A                  MØDBYT   A,ØR,SRINVG:            TIMING & SET INVERT GATE BIT
05 000E4   E6DF     A                  MØDBYT   A,AND,NSRSRT:           && CLEAR SØRTER BIT IN
05 000E6   77       A                  MØV      M,A                     SR@VALU:
                                    ENDIF
05 000E7   C30A01   N            ELSE:                                   DUPLEX SIDE-2
05 000EA   3A4CF4   A               IF:      FLG,SMPL@FLG,T             IS IT A SAMPLE CØPY
05 000ED   07       A
05 000EE   D2F500   N
05 000F1   7E       A                  MØDBYT   M,ØR,SRFDR:             YES,SET FEED FRØM MAIN
05 000F2   F608     A
05 000F4   77       A
                                    ENDIF
05 000F5   7E       A               IF:      XBYT,M,AND,SRIMG:,NZ       IS THERE A IMAGE
05 000F6   E601     A
05 000F8   CAFF00   N
05 000FB   AF       A                  CFLG     SD1@TIMØ                YES, CLEAR SD1 CYCLE DN CØUNT
05 000FC   32AEF4   A
                                    ENDIF
05 000FF   3A54F4   A               IF:      FLG,SRT@SEL,T              IS SRT SELECTED FØR THIS JØB
05 00102   07       A
05 00103   D20A01   N
05 00106   7E       A                  MØDBYT   M,ØR,SRINVG:            YES, SET 'INVERTER GATE' BIT
05 00107   F640     A
05 00109   77       A
                                    ENDIF
                                 ENDIF
05 0010A   3A4CF4   A            IF:      FLG,SMPL@FLG,T                IS THIS IN SAMPLE CØPY SEQUENCE
05 0010D   07       A
05 0010E   D21D01   N
05 00111   3A68FD   N            ANDIF:   XBYT,SMPL@CT:,LT,3             & IS SMPL CPY SEQ # .LT. 3
05 00114   FE03     A
05 00116   D21D01   N
05 00119   7E       A               MØDBYT   M,AND,NSRINVG!&NSRSRT!     YES, CLR 'INVG' & 'SRT' BITS
05 0011A   E69F     A
05 0011C   77       A
                                 ENDIF
05 0011D   3E80     A            SFLG     SR@DØNE                       INDICATE SHIFT REGISTER DØNE
05 0011F   324DF4   A
05 00122   C9       A            RET
                          *
                          *      SUBRØUTINE TØ CHECK IF IMAGE IS TØ BE ALLØW
                          *
05 00123   3A97F4   A     IMAGE@CK IF:    FLG,UP@FLH,F                  IS PITCH FØR ADH MØTØR DØNE
05 00126   07       A
05 00127   DA6501   N
05 0012A   3A66FD   N               IF:      XBYT,CYCUPCT:,GE,4         NØ, IS IT THRU CYCLE UP
05 0012D   FEC4     A
05 0012F   DA6201   N
05 00132   3AAAF4   A               ANDIF:   FLG,CYCL@DN:,F                 IS CLCLE DØWN PENDING
05 00135   07       A
05 00136   DA6201   N
05 00139   3A42F4   A                  IF:      FLG,SRSK@1ST,T          YES, WAS THERE A REQ FØR ØRIG
05 0013C   07       A
05 0013D   D25401   N
05 00140   3A23F4   A                  ANDIF:   FLG,ØDD@LAST,T          YES, IS IT THE ØDD LAST ØRIG
05 00143   07       A
05 00144   D25401   N
05 00147   06C1     A                  ANDIF:   SR,1,SRIMG:,T           YES, HAS THERE BEEN 2 HØLES
05 00149   CDC000   N
05 0014C   E601     A
05 0014E   CA5401   N
05 00151   C35F01   N                  ELSE:                            NØ, DØN'T PUT IN IMAGE
05 00154   2169FD   N                     LXI      H,SR@VALU:           ØTHERWISE RESTØRE H&L
05 00157   7E       A                     MØDBYT   M,ØR,SRIMG:          & SET IMAGE BIT
05 00158   F601     A
05 0015A   77       A
05 0015B   AF       A                     CFLG     SRSK@1ST             & FØRGET REQ ØF ØRIG
05 0015C   3242F4   A
                                       ENDIF
05 0015F   2169FD   N                  LXI      H,SR@VALU:              RESTØRE H&L BECAUSE ØF SR TEST
```

TABLE XIII —Continued

```
                                 ENDIF
05 00162   C36A01   N          ELSE:
05 00165   3E80     A            SFLG      SRSK01ST                  REMEMBER THAT THERE WAS A REQ
05 00167   3242F4   A
                               ENDIF                                 ORIG
05 0016A   C9       A          RET
```

TABLE XIV

```
                    ****************************************************************************
                    * THE DELIVERED INCREMENT SUBROUTINE (DELOINC) IS CALLED BY PAPER PATH OR  *
                    * SORTER WHEN A SHEET IS DELIVERED. THIS ROUTINE CHECKS DELIVERED INFORMATION *
                    * AGAINST PREDICTED DELIVERED INFORMATION AND INCREMENTS ORIGINALS DELIVERED *
                    ****************************************************************************

05 009C7   D5       A  DEL0INC PUSH    D                  SAVE D REG FOR PAPER PATH
05 009C8   11D809   N          CASE:   V0YT,A             GET INFO PASSED FROM PAP PATH
05 009CB   FE04     A
05 009CD   CD0000   N
05 009D0   E409     N             C,0     UP0DEL      FACE UP TRAY
05 009D2   D009     N             C,1     SMP0DEL     SAMPLE COPY DELIVERY
05 009D4   030A     N             C,2     RET0DEL'    RETURN JAM 2
05 009D6   6E0A     N             C,3     SRT0DEL     SORTER
                               ENDCASE
05 009D8   CD0000   N          CALL    MINI0DEL           START NEXT SEQUENCE OF MINI-PHS
05 009DB   D1       A          POP     D                  RESTORE D REG FOR PAPER PATH
05 009DC   C9       A          RET
```

TABLE XV

```
05 009DD   CDF909   N  SMP0DEL CALL    SUP0DEL            INCREMENT HISTORY FILE
05 009E0   CD0000   N          CALL    B0SMPCPY           INCREMENT BILLING
05 009E3   C9       A          RET
```

TABLE XVI

```
                    *
                    *                                                   *
                    *                  BILLING OF                       *
                    *                  SAMPLE COPY                      *
                    *                                                   *
                    *         STATE CALLED: PRINT BACKGROUND            *
                    *                                                   *
                    *         (CALLED BY DEL0INC ROUTINE CASE#1)        *
                    *                                                   *
                    *****************************************************
                    *
06 07F4A   1E01     A  B0SAMPLE MVI    E,1                E REG = 1
06 07F4C   CD387F   N          CALL    CATCH0UP           INS CATCH UP COUNTER
06 07F4F   C9       A          RET                        UP COUNTER
```

TABLE XVII

```
                    *****************************************************
                    *                                                   *
                    *             TRACKING MULTIPLE                     *
                    *             DELIVERED COPIES                      *
                    *                                                   *
                    *         STATE CALLED: PRINT BACKGROUND            *
                    *                                                   *
                    *         (CALLED BY DEL0INC ROUTINE-CASE 3)        *
                    *                                                   *
                    *****************************************************
                    *
06 07F38   3A47FA   N  CATCH0UP LDA    BIL0CHUP           A REG = CATCH UP CNT
06 07F3B   83       A          ADD     E                  ADD EXCES0CT (MULTIPLE
                    *                                     DEL CPYS TO CTCH UP CNT)
06 07F3C   3247FA   N          STA     BIL0CHUP           STORE SUM IN MEMORY
06 07F3F   3AEEF4   A          IF:     TIMR,B0PULLIN,Z    IF BLG CNTR TIMER IS DONE
06 07F42   07       A
06 07F43   DA497F   N
06 07F46   CD207E   N             CALL    BIL0MKUP        CHK FOR COUNTS TO BE MADE UP
                               ENDIF
06 07F49   C9       A          RET
```

TABLE XVIII

```
182                                    *****************************************************************
183                                    *                                                               *
184                                    *                       BILLING MAKE-UP                         *
185                                    *                            WHEN                               *
186                                    *                 DELIVERING TO MULTIPLE OUTPUTS                *
187                                    *                                                               *
188                                    *                    STATE: PRINT BACKGROUND                    *
189                                    *                        SYSTEM RUNNING NOT PRINT               *
190                                    *                                                               *
191                                    *****************************************************************
192                                    *
193   06 07E20   2147FA   N   BIL@MKUP LXI     H,BIL@CHUP             H&L = ADR OF CTCH UP CNTR
194   06 07E23   7E       A            IF:     VBYT,M,NZ              ANY CPYS LEFT TO BE BILLED
      06 07E24   A7       A
      06 07E25   CA2C7E   N
195   06 07E28   35       A                DCR     M                  DEC CATCH UP COUNTER
196   06 07E29   CDA27E   N                CALL    B@AE@INC           CALL MTR A-E INC SUB AND
197                                    ENDIF
198   06 07E2C   C9       A            RET
```

TABLE XIX

```
249                                    *****************************************************************
250                                    *                                                               *
251                                    *                          BILLING COUNTER                      *
252                                    *                    A,B,C,D AND E INCREMENTING                 *
253                                    *                                                               *
254                                    *                 CALLED BY:                                    *
255                                    *                     BILLING CATCH UP SUB-ROUTINE)             *
256                                    *                                                               *
257                                    *****************************************************************
258   06 07EA2   CD0000   N   B@AE@INC SOBIT,S BILLCT$A               INC. DEL. BILLING MTR A
      06 07EA5   ED80     A
259   06 07EA7   CD0000   N            SOBIT,S KEY$CNTR               INCREMENT KEY COUNTER
      06 07EAA   F904     A
260   06 07EAC   CD0000   N            STIMR   B@PULLIN,125,BIL@TNOF  SET PULL IN TIMER
      06 07EAF   26       A
      06 07EB0   0C       A
      06 07EB1   037F     N
261   06 07EB3   2A4AFB   N            IF:     XWRD,B@BKPTCT,LE,BRK@PT@B  IF BRK PNT CNTR IS LE BK PT B
      06 07EB6   EB       A
      06 07EB7   2A46FB   N
      06 07EBA   CD0000   N
      06 07EBD   DAC37E   N
      06 07EC0   C2C87E   N
262   06 07EC3   CD0000   N                SOBIT,S BILLCT$B           INC BILLING METER B
      06 07EC6   EC80     A
263                                    ENDIF
264   06 07EC8   3A4DFA   N            CASE:   VBYT,B@MTR@C           IF MTR C SELECTION EQUALS
      06 07ECB   11D97E   N
      06 07ECE   FE03     A
      06 07ED0   CD0000   N
265   06 07ED3   5A7D     N                C,0     B@ECH@RG            0  CALL BLG FST CPY EACH ORG
266   06 07ED5   6C7D     N                C,1     B@AFTERB            1  CALL BLG AFTER BRK PNT B
267   06 07ED7   927D     N                C,2     B@MAXBLG           MAX ORIG BLG IF BLG BUG REMOVED
268                                    ENDCASE
269   06 07ED9   3A21F4   A            IF:     FLG,DUPX@DEL,T         IF DUPLEX COPY IS DEL
      06 07EDC   07       A
      06 07EDD   D2E97E   N
270   06 07EE0   AF       A                CFLG    DUPX@DEL           CLEAR DUPLEX COPY DEL FLAG
      06 07EE1   3221F4   A
271   06 07EE4   CD0000   N                SOBIT,S BILLCT$D           INC DUPLEX BLG CNTR
      06 07EE7   EA80     A
272                                    ENDIF
273   06 07EE9   C9       A            RET
```

TABLE XX

```
205                                   *
206                                   * SUBR CALLED IN 'PRINT' EPILOG TO TURN OFF SOME PAPER PATH RELATED OUTPUTS
207                                   *
208   05 00115   3E20     A   PAP@EPL3 MVI     A,SRSRT!               TURN OFF GAT$PULL, RET$PULL,
209   05 00117   CDFB02   N            CALL    INVTRCTL                GAT$HOLD, & RET$HOLD
210   05 0011A   CDFB03   N            CALL    FACFUP                 TURN OFF FACE-DN SOLENOID
211   05 0011D   C9       A            RET
```

TABLE XXI

```
05 003FB   AF        A   FACEUP   CFLG     DECGFLIP
05 003FC   3218F4    A
                         *        CALL     DIVERT
                         *        RET
```

TABLE XXII

```
                              *
                              * INVERTER GATE AND RETURN PITCH EVENT- (SR#5 PLUS 550 CLOCK COUNTS).
                              *
05 002FB   47       A   INVTRCTL MOV        B,A                    B= A= <SR #6>
05 002FC   3AE3FF   A            IF!        OBIT,GAT$PULL,T        IS INVTR GATE ON SEQUENCE GOING
05 002FF   E680     A
05 00301   CA1203   N
05 00304   21E3FF   A               COBIT,P   GAT$PULL             YES, END IT (0.5 SEC LATER) BY
05 00307   3E7F     A
05 00309   A6       A
05 0030A   77       A
05 0030B   21E2FF   A               SOBIT,P   GAT$HOLD             TURNING OFF 'PULL' & ON 'HOLD'
05 0030E   3E80     A
05 00310   B6       A
05 00311   77       A
                                 ENDIF
05 00312   78       A            MOV        A,B                    RELOAD <SR #6>
05 00313   E660     A            MODBYT     A,AND,SRINVG!!SRSRT!   A= DESTINATION BITS
05 00315   07       A            RLC                               ROTATE A-REG
05 00316   07       A            RLC                                           3 BITS
05 00317   07       A            RLC                                                  TO LEFT
05 00318   112803   N            CASE:      VBYT,A                 USE DESTINATION BITS AS PNTR
05 0031B   FEC4     A
05 0031D   CD0000   N
05 00320   29C3     N               C,0     INVOFACE               TO FACE-UP (SIMPLEX OR DUP-2)
05 00322   2F03     N               C,1     HOLDSOFF               TO SRT-NON (SIMPLX OR DUP-ODDL)
05 00324   3A03     N               C,2     INVOAUX                TO AUX TRAY (DUP-1)
05 00326   6B03     N               C,3     INVOSRTI               TO SRT-INVTD (DUP-2)
                                 ENDCASE
05 00328   C9       A            RET                               RETURN TO INTERRUPTED ROUTINE
                              *
                              * SUBR TO INITIATE AND MAINTAIN THE NON-INVERTING, NON-RETURN PATH MODE.
                              *   INVERTER GATE OFF (NON-DEFL) AND INVERTER RETURN (DOUGHNUT) OFF (DOWN).
                              *
                              *   IF A SAMPLE COPY IS COMING, ONLY THE GATE IS DROPPED.
                              *   IF COPY IS NON-INVTD TO FACE-UP TRAY, BOTH GATE AND RETURN ARE DROPPED.
                              *
05 00329   78       A   INVOFACE IF!        XBYT,B,AND,SRSMPL!,Z
05 0032A   E602     A
05 0032C   C23403   N

                              *
                              * SUBR TO INITIATE AND MAINTAIN FACE-UP TRAY OR SAMPLE COPY PATH.
                              *
05 0032F   CD0000   N   HOLDSOFF    COBIT,S    INVT$SOL            DROP INVERTER DOUGH-NUT
05 00332   E67F     A
                                 ENDIF

                              *
                              * SUBR TO INITIATE THE SAMPLE COPY PATH- INVERTER GATE (ONLY) OFF.
                              *
05 00334   CD0000   N   GATEOFF  COBIT,S    GAT$HOLD
05 00337   E27F     A
05 00339   C9       A            RET


                              *
                              * SUBR TO INITIATE AND MAINTAIN THE RETURN PATH (INVERTER GATE ON, INVERTER
                              *   RETURN OFF (DOWN), RETURN TRANSPORT MOTOR ON, AND AUX TRAY PATTERS ON).
                              *
05 0033A   78       A   INVOAUX  MOV        A,B                    RELOAD <SHIFT REG #6>
05 0033B   0F       A            RRC                               PUT IMAGE BIT INFO INTO 'C' BIT
05 0033C   D25B03   N            IF!        CC,C,S                 IS THERE A COPY 1 PITCH AWAY
05 0033F   3A87FC   N            ANDIF!     VBYT,JAMPOSN,Z         YES, HAS A JAM BEEN DETECTED
05 00342   A7       A
05 00343   C25B03   N
05 00346   21E6FF   A               COBIT,P   INVT$SOL             NO, DROP INVTR RETN (DOUGHNUT)
05 00349   3E7F     A
05 0034B   A6       A
05 0034C   77       A
05 0034D   21E3FF   A               SOBIT,P   RETX$MOT             TURN ON RETURN XPORT MOTOR
05 00350   3E08     A
05 00352   B6       A
05 00353   77       A
05 00354   21E2FF   A               SOBIT,P   AX$PATT              TURN ON AUX TRAY PATTERS
05 00357   3E08     A
05 00359   B6       A
05 0035A   77       A
                                 ENDIF
05 0035B   3AE2FF   A   GATEON   IF!        OBIT,GAT$HOLD,F        WILL COPIES BE DEFL'D TO INVTR
05 0035E   E680     A
05 00360   C26A03   N
05 00363   21E3FF   A               SOBIT,P   GAT$PULL             NO, INIT INVTR GATE ON SEQUENCE
05 00366   3E80     A
05 00368   B6       A
05 00369   77       A
                                 ENDIF
05 0036A   C9       A            RET
                              *
                              * SUBR TO INITIATE AND MAINTAIN THE INVERTING MODE-  INVERTER GATE ON (DEFL)
                              *   AND INVERTER RETURN (DOUGHNUT) ON (UP).
                              *
05 0036B   21E6FF   A   INVOSRTI SOBIT,P    INVT$SOL               PUT DOUGH-NUT INTO PAPER PATH
05 0036E   3E80     A
05 00370   B6       A
05 00371   77       A
05 00372   CD5B03   N            CALL       GATEON                 DEFLECT COPIES INTO INVTR
05 00375   C9       A            RET                               RETURN TO INTERRUPTED ROUTINE
```

Referring particularly to the timing chart shown in FIG. 40, an exemplary copy run wherein three copies of each of two simplex or one-sided originals in duplex mode is made. Referring to FIG. 32, the appropriate button of copy selector 808 is set for the number of copies desired, i.e. 3 and document handler button 822, sorter select button 825 and two sided (duplex) button 811 depressed. The originals, in this case, two simplex or one-sided originals are loaded into tray 233 of document handler 16 (FIG. 14) and the Print button 805 depressed. On depression of button 805, the host machine 10 enters the PRINT state and the Run Event Table for the exemplary copy run programmed is built by controller 18 and stored in RAM section 546. As described, the Run Event Table together with Background routines serve, via the multiple interrupt system and output refresh (through D.M.A.) to operate the various components of host machine 10 in integrated timed relationship to produce the copies programmed.

During the run, the first original is advanced onto platen 35 by document handler 16 where, as seen in FIG. 41, three exposures (1ST FLASH SIDE 1) are made producing three latent electrostatic images on belt 20 in succession. As described earlier, the images are developed at developing station 28 and transferred to individual copy sheets fed forward (1ST FEED SIDE 1) from main paper tray 100. The sheets bearing the images are carried from the transfer roll/belt nip by vacuum transport 155 to fuser 150 where the images are fixed. Following fusing, the copy sheets are routed by deflector 184 (referred to as an inverter gate in the tables) to return transport 182 and carried to auxiliary tray 102. The image bearing sheets entering tray 102 are aligned by edge pattern 187 in preparation for refeeding thereof.

Following delivery of the last copy sheet to auxiliary tray 102, the document handler 16 is activated to remove the first original from platen 35 and bring the second original into registered position on platen 35. The second original is exposed three times (FLASH SIDE 2), the resulting images being developed on belt 20 at developing station 28 and transferred to the opposite or second side of the previously processed copy sheets which are now advanced (FEED SIDE 2) in timed relationship from auxiliary tray 102. Following transfer, the side two images are fused by fuser 150 and routed, by gate 184 toward stop 190, the latter being raised for this purpose. Abutment of the leading edge of the copy sheet with stop 190 causes the sheet trailing edge to be guided into discharge chute 186, effectively inverting the sheet, now bearing images on both sides. The inverted sheet is fed onto transport 181 and into an output receptacle such as sorter 14 where, in this example, the sheets are placed in successive ones of the first three trays 212 of either the upper of lower arrays 210, 211 respectively depending on the disposition of deflector 220.

It is sometimes desirable during a copy run, to check the quality of the copies being produced by the reproduction machine 10. For this purpose, a sample copy (SMPL CPY) operational mode is provided.

Referring to FIG. 32, operator console 800 includes print/start (PRINT) button 805 and SAMPLE copy lamp 808. Actuation of print/start button 805 while machine 10 is in print (PRINT) or run not print (RUNNPRT) states (Table I) interrupts temporarily the copy run in progress to make a sample copy. At the same time, lamp 808 is lit to indicate to the machine operator that a sample copy is being made. Following completion of the sample copy, the copy run is resumed from the point of interruption.

The sample copy produced is deposited in copy output tray 195 irrespective of whether or not sorter 14 was being used by the interrupted copy run. This permits the operator to view the sample copy immediately without the need to search through or otherwise disturb finished copies from the copy run in sorter 14. It is understood that if output tray 195 is being used by the copy run in progress, the sample copy is deposited on top of the last copy from the copy run that was finished before the run was interrupted to make the sample copy.

Referring particularly to Tables I and XI, and drawing FIG. 41, actuation of print/start (PRINT) button 805 in either print (PRINT) or run not print (RUNN NPRT) states (that is, while machine 10 is producing copies or finishing up after a copy run) activates the sample copy (SMPL CPY) switch shown in the Active Switches For Print State schedule of Table XI, part II.

In the print (PRINT) state of Table I, a background call is made periodically (i.e. every 20 msec.) to the front panel (i.e. console 800) switch scan routine (PRT SWS) of Table XI, part III. The routine (PRT SWS) scans the front panel or console active switches (Table XI, part II), including the sample copy (SMPL CPY) switch as described above. If print/start (PRINT) button 805 has been actuated since the last switch scan, the change is identified and a sample copy (SMPL CPY) bit is set.

In the print (PRINT) state background routines (Table I), a call is made periodically (i.e. every 100 msec.) to sample copy (SMPL CPY) routine of Table XII and FIG. 42. If the sample copy (SMPL CPY) lamp 808 is lit (OBIT, SMPL CPY, T.), the routine is entered.

Entry into the sample copy (SMPL CPY) routine sets a flat (SMPL CPY) for the shift register scheduler (SRSK) routine shown in Table XIII and FIG. 43. The sample copy routine checks the running state of machine 10 at the time print/state (PRINT) button 805 was actuated, i.e. is machine ready, is job complete, is flashing complete, etc. Based on the machine operating state, the sample copy program may reset certain components, i.e. auxiliary paper tray (AUX TRAY) 102, and restarts flashing (RESTART) to produce the sample copy.

The shift register scheduler (SRSK) routine, which is called in Print state background (Table I), serves to set bits in a control shift register (SR) 1000 (drawing FIG. 44) identifying the particular parameters of each image to be produced. The shift register scheduler (SRSK) routine checks to determine if the sample copy flag (FLG SMPL FLG T) is set, and if so the sample copy bit (SR SMPL) is set in the control shift register (SR). Additionally, the sample copy counter (SMPL CT) is set to a number indicating whether the copy run is simplex or duplex, or if the sample copy is already made. If so, the sample copy flag (SMPL FLG) is cleared.

The shift register scheduler (SRSK) routine sets other bits identifying the particular image parameters, i.e. sorter bit (SR SRT), main feeder bit (SR FDR), side 1 bit (SR SD1) and inverter gate bit (SR INVG). A shift register pointer, which is moved or indexed with each pitch reset signal (Table VIII) unloads image data from the shift register (SR) 1000 in timed synchronization with machine 10.

FIG. 44, portions of an exemplary copy run interrupted for a sample copy are there shown on control shift register (SR) 1000. Machine 10 is presumed to be operating in the duplex or two sided copy mode with the first side copies of a document being produced at the time a sample copy request was initiated. For the first side sample copy, the image, sample copy, load, and main feeder (paper tray 100) bits are set. The sample copy produced is routed by gate 198 onto transport 196 and deposited in output tray 195 (see FIG. 12). For this latter, the control routine for gate 198 (FACE UP—Table XXI) is called during the PRINT EPILOG state via the paper path routine PAP EPL3 of Table XX. At the same time, the control routine for inverter gate 184 (INVTRCTL—Table XXII) is called to reset gate 184 to pass the sample copy to transport 181 and 195.

The copy program in progress is then resumed.

As will be understood, the billing rate to the customer for copies made by reproduction machine 10 may be varied depending upon the number of copies made. Normally, the cost for a single copy, or a few copies, is higher than the per copy cost of a large number of copies, and reflecting this, the reproduction machine billing counters are programmed to bill at different rates for different copy quantities. Normally, the highest billing rate is reserved for single or very few copies, with the rate decreasing usually in steps, as the copy quantity increases.

To accord proper billing to a sample copy without comprising the more favorable billing rates that may be in effect due to the copy run in progress, the then in effect billing rate is temporarily abandoned while the sample copy is made. Following completion of the sample copy, the billing rate reverse back to the billing rate in effect at the time the sample copy was initiated.

Referring to Table XIV the copy delivered increment subroutine (DEL INC) checks copy delivered information against predicted delivered information. Included in this routine is a call to sample copy delivery (SMP DEL) Table XV which in turn calls sample copy billing (B SMP CPY) Table XVI to increment the appropriate billing counter for the sample copy made. The billing routine calls the routine for incrementing the copy catch-up counter (CATCH UP—Table XVII which in turn calls billing make-up routine (BIL MKUP) of Table XVIII. The billing make up routine calls the billing routine (B AE INC.—Table XIX) to set the proper billing meters for the sample copy made.

From the above, it will be understood that a sample copy may be run during a copy run. In that case, the copy run in progress is temporarily suspended while the sample copy is made. Following completion of the sample copy, the suspended copy run is resumed.

In an alternate embodiment, where machine 10 is in duplex (2 SIDED COPY) or two-sided copy mode, the document on platen 35 is exposed twice to provide the same image on each side of the sample copy. As in the case of all duplex copies, following the first exposure, the sample image is transferred to the sample copy sheet, fixed by fuser 150, and deposited, via gate 184 and return transport 182, into auxiliary paper tray 102. The sample copy sheet is then re-fed from tray 102 for the second image of the document on planten glass 35, the image being transferred to the opposite side of the sample copy sheet. The second sample copy image is fixed by fuser 150, inverted by means of gate 184, and stop 190 and discharged into paper tray 195.

What is claimed is:

1. In the method of processing a copy run in a reproduction system having an automatic original feeding apparatus, a copy processor adapted for both simplex and duplex modes of operation and a programming means for preselecting the number of copies of each original to be produced whether as simplex or duplex copies, and wherein one or more originals are automatically fed to a copy position from a stack of originals in the apparatus and returned to the stack after imaging thereof by the processor, and while at the copying station copies a preselected number of times while permitting copy quality to be checked automatically during the copy run, the steps which comprise:

a. activating the document feeding apparatus for transporting an original from the stack of originals and into copying position;

b. retaining said original in said copying position while imaging thereof is performed;

c. activating the document feeding apparatus for removing said original from said copying position and returning the same to the stack when imaging thereof is completed preparatory to the feeding of another original to the copying position; and d. repeating steps a, b, and c for succeeding originals until copying of the last original is completed and said copy run processed;

e. selectively interrupting steps a, b, and c to make an extra copy of the original in said copying position as a sample of the copies being produced;

f. resuming steps a, b, and c at the point of interruption to continue said copy run;

g. making copies from one original on one side of copy sheets;

h. refeeding said copy sheets and making copies from a second original on the other side of said copy sheets;

i. repeating steps g and h until said copy run is completed;

j. interrupting steps g and h to make an extra copy of an original on one side of a copy sheet;

k. refeeding said copy sheet and making a copy from the same original on the opposite side of said copy sheet;

l. discharge said copy sheet to check copy quality; and m. resuming steps g and h at the point where said copy run was interrupted.

2. In the method of processing a copy run in a reproduction system having an automatic original feeding apparatus, a copy processor adapted for both simplex and duplex modes of operation and a programming means for preselecting the number of copies of each original to be produced whether as simplex or duplex copies, and wherein one or more originals are automatically fed to a copy position from a stack of originals in the apparatus and returned to the stack after imaging thereof by the processor, and while at the copying station copied a preselected number of times while permitting copy quality to be checked automatically during the copy run, the steps which comprise:

a. activating the document feeding apparatus for transporting an original from the stack of originals and into copying position;

b. retaining said original in said copying position while imaging thereof is performed;

c. activating the document feeding apparatus for removing said original from said copying position and returning the same to the stack when imaging thereof is completed preparatory to the feeding of another original to the copying position; and d. repeating steps a, b, and c for succeeding originals until copying of the last original is completed and said copy run processed;

e. selectively interrupting steps a, b, and c to make an extra copy of the original in said copying position as a sample of the copies being produced;

f. resuming steps a, b, and c at the point of interruption to continue said copy run;

g. providing a first copy billing rate for low copy volumes of at least one copy;

h. providing at least one additional copy billing rate for copy volumes greater than said low copy volumes; and i. billing said extra copy at said first copy billing rate.

* * * * *